United States Patent
Fleizach et al.

(10) Patent No.: US 10,613,739 B2
(45) Date of Patent: Apr. 7, 2020

(54) DEVICE, METHOD, AND GRAPHICAL USER INTERFACE FOR CONTROLLING MULTIPLE DEVICES IN AN ACCESSIBILITY MODE

(71) Applicant: Apple Inc., Cupertino, CA (US)

(72) Inventors: Christopher Brian Fleizach, Gilroy, CA (US); Clare T. Kasemset, Sunnyvale, CA (US); Darren Christopher Minifie, Santa Cruz, CA (US); Gregory F. Hughes, San Jose, CA (US); Ibrahim G. Yusuf, Fremont, CA (US); James Nathan Cartwright, Los Altos, CA (US); James Plowden Craig, San Jose, CA (US); Patti P. Hoa, San Jose, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 15/609,738

(22) Filed: May 31, 2017

(65) Prior Publication Data

US 2017/0357401 A1 Dec. 14, 2017

Related U.S. Application Data

(60) Provisional application No. 62/348,884, filed on Jun. 11, 2016.

(51) Int. Cl.
*G06F 3/0488* (2013.01)
*G06F 3/14* (2006.01)
(Continued)

(52) U.S. Cl.
CPC .......... *G06F 3/0488* (2013.01); *G06F 1/1671* (2013.01); *G06F 3/012* (2013.01);
(Continued)

(58) Field of Classification Search
CPC ...... G06F 3/0488; G06F 1/1671; G06F 3/012; G06F 3/0219; G06F 3/0231;
(Continued)

(56) References Cited

U.S. PATENT DOCUMENTS

| | | | |
|---|---|---|---|
| 8,160,564 B1 * | 4/2012 | Gunasekara | G06F 3/04842 455/419 |
| 8,914,733 B2 * | 12/2014 | Chai | G06F 9/451 715/751 |

(Continued)

*Primary Examiner* — Wing H Chow
(74) *Attorney, Agent, or Firm* — Fernando & Partners, LLP; Prateek Bhatnagar

(57) ABSTRACT

In accordance with some embodiments, a method is performed at a first device with one or more processors, non-transitory memory, and a display. The method includes displaying, on the display, a device control transfer affordance while operating the first device based on user input from an input device that is in communication with the first device. The method includes receiving a device control transfer user input from the input device selecting the device control transfer affordance that is displayed on the display of the first device. In response to receiving the device control transfer user input, the method includes configuring a second device to be operated based on user input from the input device and ceasing to operate the first device based on user input from the input device.

29 Claims, 71 Drawing Sheets

(51) Int. Cl.
  *G06F 3/0482* (2013.01)
  *G06F 3/041* (2006.01)
  *G09B 21/00* (2006.01)
  *G06F 3/0485* (2013.01)
  *G06F 3/0489* (2013.01)
  *G06F 1/16* (2006.01)
  *G06F 3/01* (2006.01)
  *G06F 3/02* (2006.01)
  *G06F 3/023* (2006.01)
  *G09B 5/06* (2006.01)
  *H04M 1/725* (2006.01)

(52) U.S. Cl.
  CPC .......... *G06F 3/0219* (2013.01); *G06F 3/0231* (2013.01); *G06F 3/0416* (2013.01); *G06F 3/0482* (2013.01); *G06F 3/0485* (2013.01); *G06F 3/0489* (2013.01); *G06F 3/04892* (2013.01); *G06F 3/1423* (2013.01); *G06F 3/1454* (2013.01); *G09B 5/06* (2013.01); *G09B 21/00* (2013.01); *H04M 1/72588* (2013.01); *G09G 2354/00* (2013.01); *H04M 1/72533* (2013.01)

(58) Field of Classification Search
  CPC .... G06F 3/0416; G06F 3/0482; G06F 3/0485; G06F 3/0489; G06F 3/04892; G06F 3/1423; G06F 3/1454; G09B 5/06; G09B 21/00; H04M 1/72588; H04M 1/72533; G09G 2354/00
  See application file for complete search history.

(56) References Cited

U.S. PATENT DOCUMENTS

2014/0057621 A1* 2/2014 Ji ...................... H04M 1/72527 455/419
2016/0006800 A1* 1/2016 Summers ............. G06F 9/5055 709/203

* cited by examiner

700

At an first device with one or more processors, non-transitory memory, and a display:

Displaying, on the display, a device control transfer affordance while operating the first device based on user input from an input device that is in communication with the first device — 702

> Operating the first device based on the user input from the input device includes operating the first device in an accessibility mode of operation — 704

> User input from the input device includes switch inputs — 706
>
>> At least one of the switch inputs is generated by a switch device including one or more switches and designed for use by users who are unable to use the standard input device(s) of the first device — 708
>>
>> At least one of the switch inputs is generated by an input device of the first device — 710
>>
>>> At least one of the switch inputs is generated by an touchscreen of the first device — 712
>>>
>>> At least one of the switch inputs is generated by a camera of the first device — 714

> Displaying, on the display, a scan affordance while operating the first device based on the user input from the input device — 716

> Receiving a scan user input from the input device selecting the scan affordance — 718

> Displaying, on the display, one or more device select affordances while operating the first device, the one or more device select affordances including a second device affordance associated with a second device — 720

At an first device with one or more processors, non-transitory memory, and a display:

Displaying, on the display, a device control transfer affordance while operating the first device based on user input from an input device that is in communication with the first device ～702

(A)

| Receiving a device select user input from the input device selecting the second device affordance ～722 |

| Displaying, on the display of the first device, a first transfer confirmation notification indicating that the input device will be used to operate the second device upon selection of the device control transfer affordance ～724 |

| Causing display, on a display of the second device, of a second transfer confirmation notification indicating that the input device will be used to operate the second device upon selection, on the first device, of the device control transfer affordance. ～726 |

Receiving a device control transfer user input from the input device selecting the device control transfer affordance that is displayed on the display of the first device ～728

Configuring the second device to be operated based on user input from the input device and ceasing to operate the first device based on user input from the input device ～730

| Operating the second device based on the user input from the input device includes operating the second device in the same accessibility mode of operation ～732 |

┌─────────────────────────────────────────────────────────────┐
│  Causing display, on a display of the second device, of a device control  ├─ 742
│  return affordance while operating the second device based on user input from │
│  the input device                                                           │
└─────────────────────────────────────────────────────────────┘

┌─────────────────────────────────────────────────────────────┐
│  Receiving a device control return user input from the input device  ├─ 744
│  selecting the device control return affordance                      │
└─────────────────────────────────────────────────────────────┘

┌─────────────────────────────────────────────────────────────┐
│  Operating the first device based on user input from the input device and  ├─ 746
│  ceasing to operate the second device based on user input from the input    │
│  device                                                                     │
└─────────────────────────────────────────────────────────────┘

┌─────────────────────────────────────────────────────────────┐
│  Receiving an escape input from the input device matching an escape  ├─ 748
│  action                                                               │
└─────────────────────────────────────────────────────────────┘

┌─────────────────────────────────────────────────────────────┐
│  Operating the first device based on user input from the input device and  ├─ 750
│  ceasing to operate the second device based on user input from the input    │
│  device                                                                     │
└─────────────────────────────────────────────────────────────┘

┌─────────────────────────────────────────────────────────────┐
│  Displaying, on the display of the first device, an escape settings user  ├─ 752
│  interface including one or more affordances for defining the escape action │
└─────────────────────────────────────────────────────────────┘

```
┌─────────────────────────────────────────────────────────────┐
│    Receiving a continued action user input selecting a continued action    │──780
│  affordance of the one or more alert response affordances                  │
└─────────────────────────────────────────────────────────────┘

┌─────────────────────────────────────────────────────────────┐
│    Operating the second device based on user input from the input device   │──782
│  to respond to the alert                                                    │
└─────────────────────────────────────────────────────────────┘
```

```
┌─────────────────────────────────────────────────────────────┐
│    Receiving a quick action user input selecting a quick action affordance │──784
│  of the one or more alert response affordances                              │
└─────────────────────────────────────────────────────────────┘

┌─────────────────────────────────────────────────────────────┐
│    Dismissing the alert at the first device and continuing to operate the  │──786
│  second device based on user input from the input device                    │
└─────────────────────────────────────────────────────────────┘
```

```
┌─────────────────────────────────────────────────────────────┐
│    Causing display, on a display of the second device, of a third device   │
│  control transfer affordance while operating the second device based on user│──788
│  input from the input device                                                │
└─────────────────────────────────────────────────────────────┘

┌─────────────────────────────────────────────────────────────┐
│    Receiving a third device control transfer user input from the input      │──790
│  device selecting the third device control transfer affordance              │
└─────────────────────────────────────────────────────────────┘

┌─────────────────────────────────────────────────────────────┐
│    Configuring a third device to operate based on user input from the input │
│  device and ceasing to operate the second device based on user input from the│──792
│  input device                                                                │
└─────────────────────────────────────────────────────────────┘
```

Figure 7G

DEVICE, METHOD, AND GRAPHICAL USER INTERFACE FOR CONTROLLING MULTIPLE DEVICES IN AN ACCESSIBILITY MODE

CROSS-REFERENCE TO RELATED-APPLICATIONS

This application claims the benefit of U.S. Provisional Patent App. No. 62/348,884, filed on Jun. 11, 2016, which is incorporated by reference in its entirety.

TECHNICAL FIELD

This relates generally to electronic devices with touch-sensitive surfaces, including but not limited to electronic devices with touch-sensitive surfaces that include a user interface for controlling multiple devices in an accessibility mode.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But people with limited motor skills, such as those with certain finger or hand impairments, may find performing certain gestures difficult and may employ alternative input devices to control an electronic device. However, people with limited motor skills may have multiple electronic devices and only a single easily accessible alternative input device and may have difficulty reconfiguring the input device to control different electronic devices, e.g., by disconnecting the input device from a first device and connecting the input device to a second device.

SUMMARY

Accordingly, there is a need for electronic devices with faster, more efficient methods and interfaces for controlling multiple devices in an accessibility mode. Such methods and interfaces optionally complement or replace conventional methods for controlling multiple devices in an accessibility mode. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, and a display. The method includes: displaying, on the display, a device control transfer affordance while operating the first device based on user input from an input device that is in communication with the first device, receiving a device control transfer user input from the input device selecting the device control transfer affordance that is displayed on the display of the first device, and, in response to receiving the device control transfer user input, configuring a second device to be operated based on user input from the input device and ceasing to operate the first device based on user input from the input device.

In accordance with some embodiments, an electronic device includes a display unit configured to display a user interface, one or more input units configured to receive user inputs, and a processing unit coupled with the display unit and the one or more input units. The processing unit is configured to display, on the display unit, a device control transfer affordance while operating the first device based on user input from an input device that is in communication with the first device, receive a device control transfer user input from the input device selecting the device control transfer affordance that is displayed on the display of the first device, and, in response to receiving the device control transfer user input, configure a second device to be operated based on user input from the input device and ceasing to operate the first device based on user input from the input device.

In accordance with some embodiments, an electronic device includes a display, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, and means for performing or causing performance of the operations of any of the methods described herein. In accordance with some embodiments, an information processing apparatus, for use in an electronic device with a display, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for controlling multiple devices in an accessibility mode, thereby increasing the effectiveness, efficiency, and user satisfaction with such devices. Such methods and interfaces may complement or replace conventional methods for controlling multiple devices in an accessibility mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7G are flow diagrams illustrating a method of controlling multiple devices in an accessibility mode in accordance with some embodiments.

DESCRIPTION OF EMBODIMENTS

The use of electronic devices with touch-based user interfaces (e.g., devices such as the iPhone®, iPod Touch®, and iPad® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. People with limited motor skills, such as those with certain finger or hand impairments, may find applying force or pressure to the touch-sensitive surface difficult, if not impossible, and may employ alternative input devices to control the device. However, people with limited motor skills may have multiple electronic devices and only a single easily accessible alternative input device and may have difficulty reconfiguring the input device to control different electronic devices, e.g., by disconnecting the input device from a first device and connecting the input device to a second device.

Described below are methods and devices that enable users who cannot easily reconfigure an input device to work with a different device to nevertheless operate multiple devices with a single input device. In some embodiments, as described below, an electronic device displays, as part of a user interface, a selectable affordance for transferring control from a first device to a second device (and/or back to the first device or to third device).

Figure 5:
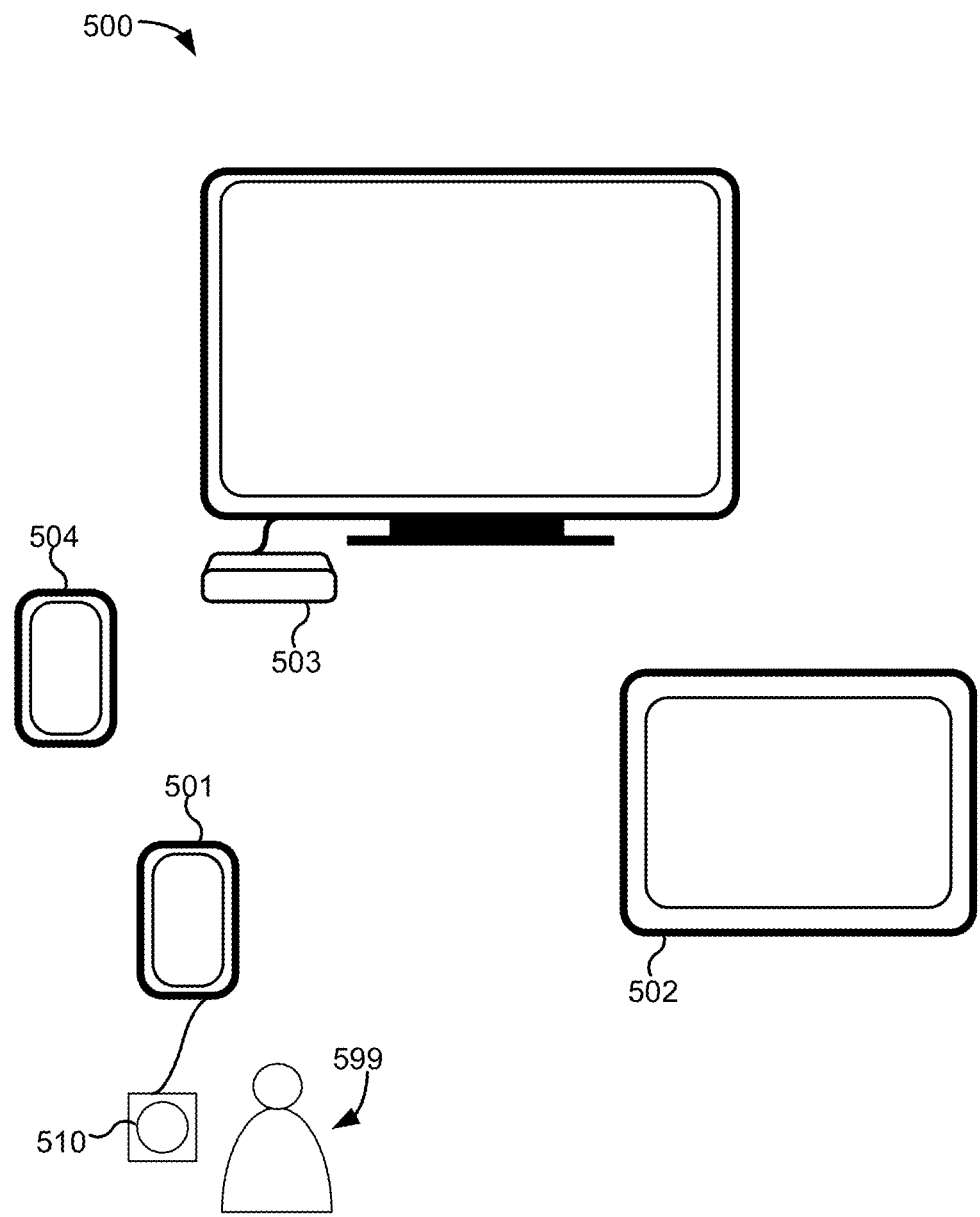
FIG. 5 illustrate an example environment including multiple devices in accordance with some embodiments.
Figure 6A:
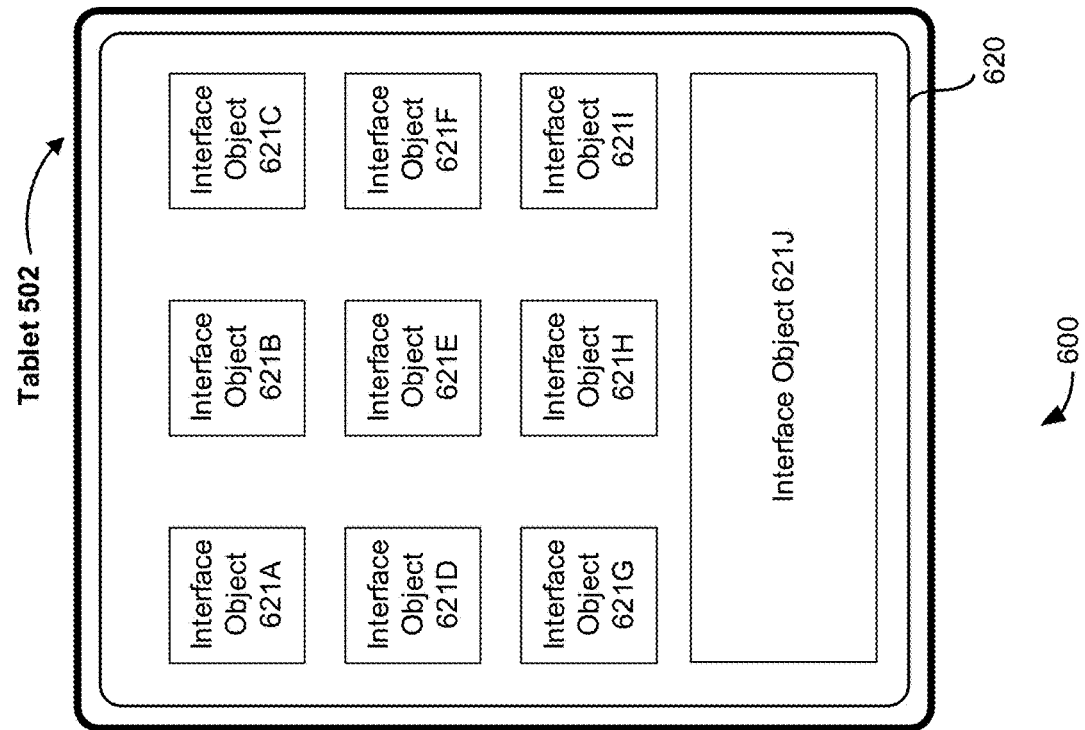
FIGS. 6A-6BD illustrate example user interfaces for controlling multiple devices in an accessibility mode in accordance with some embodiments.
Figure 6A:
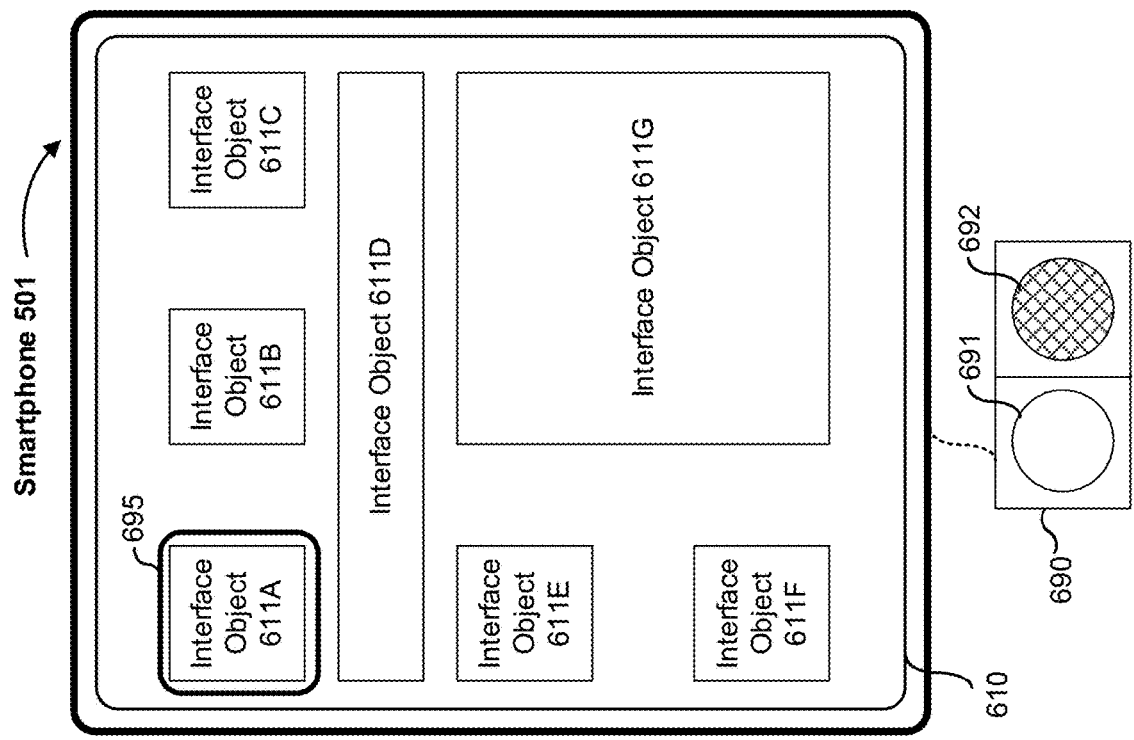
Figure 6B:
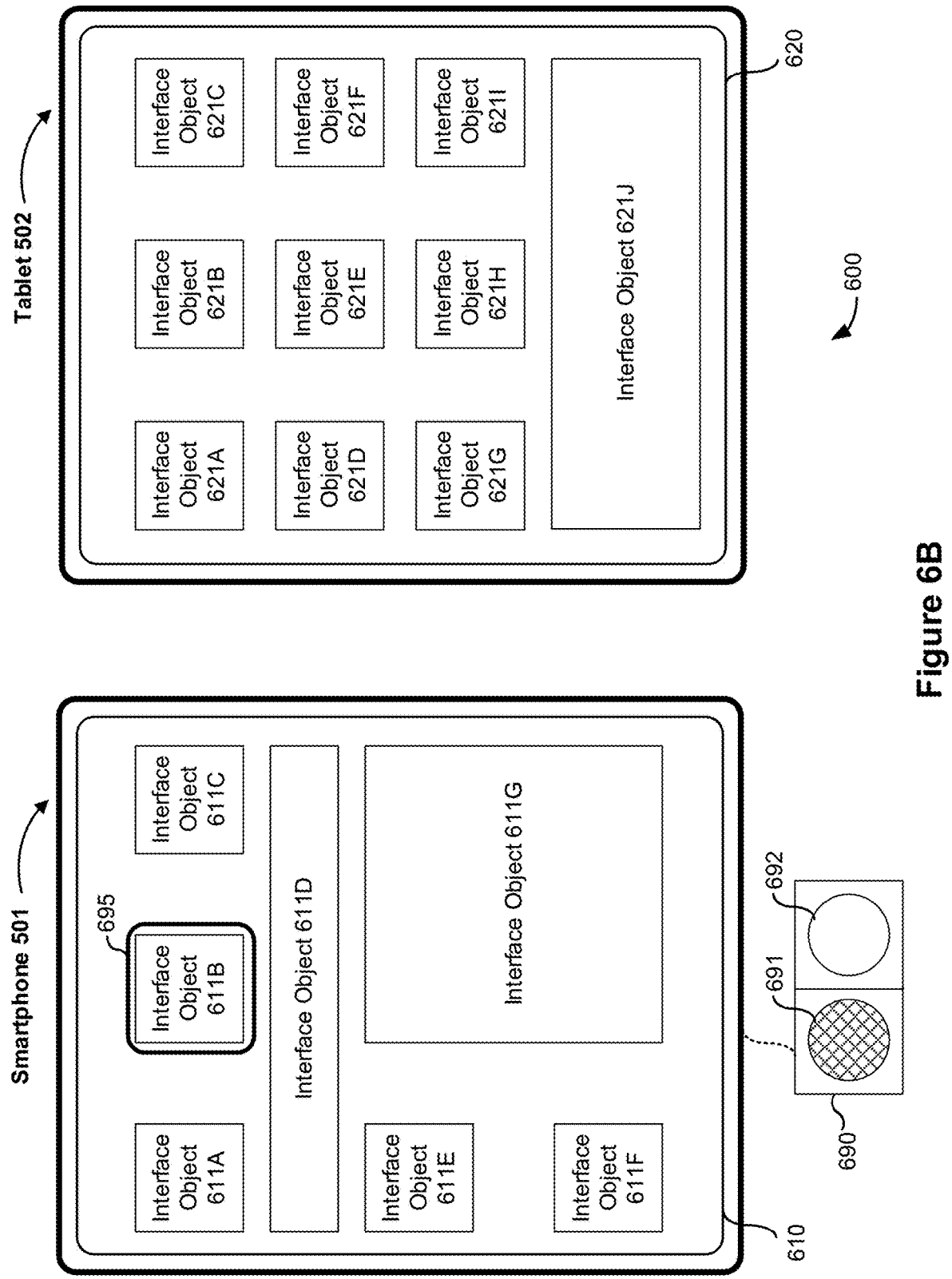

Below, FIGS. 1A-1B, 2, 3, and 4A-4B provide a description of example devices. FIG. 5 illustrates an environment with multiple devices. FIGS. 6A-6BD illustrate example user interfaces for controlling multiple devices in an accessibility mode. FIGS. 7A-7G illustrate a flow diagram of a method of controlling multiple devices in an accessibility mode. The user interfaces in FIGS. 6A-6BD are used to illustrate the processes in FIGS. 7A-7G.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
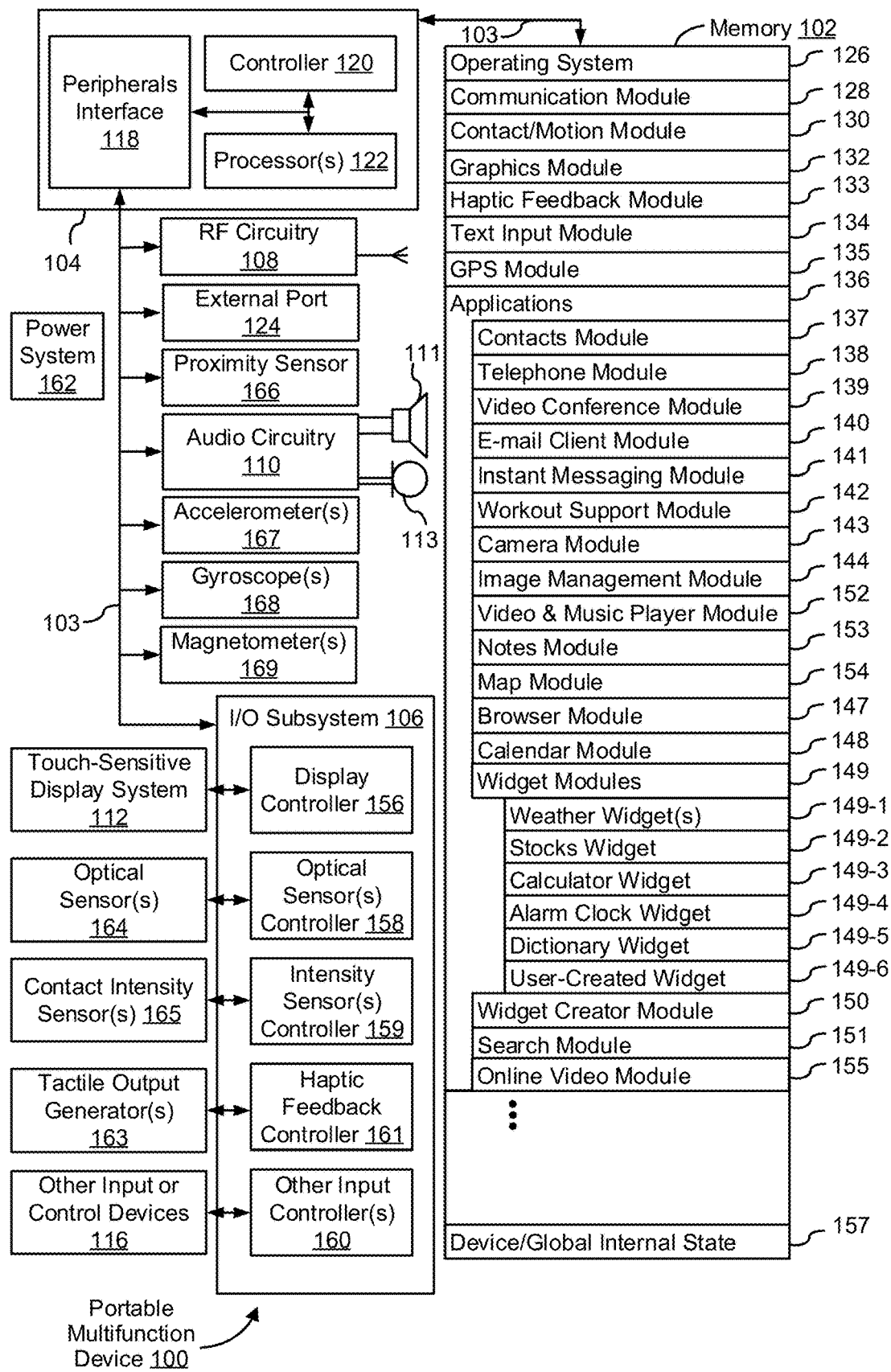
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips. RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoW), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
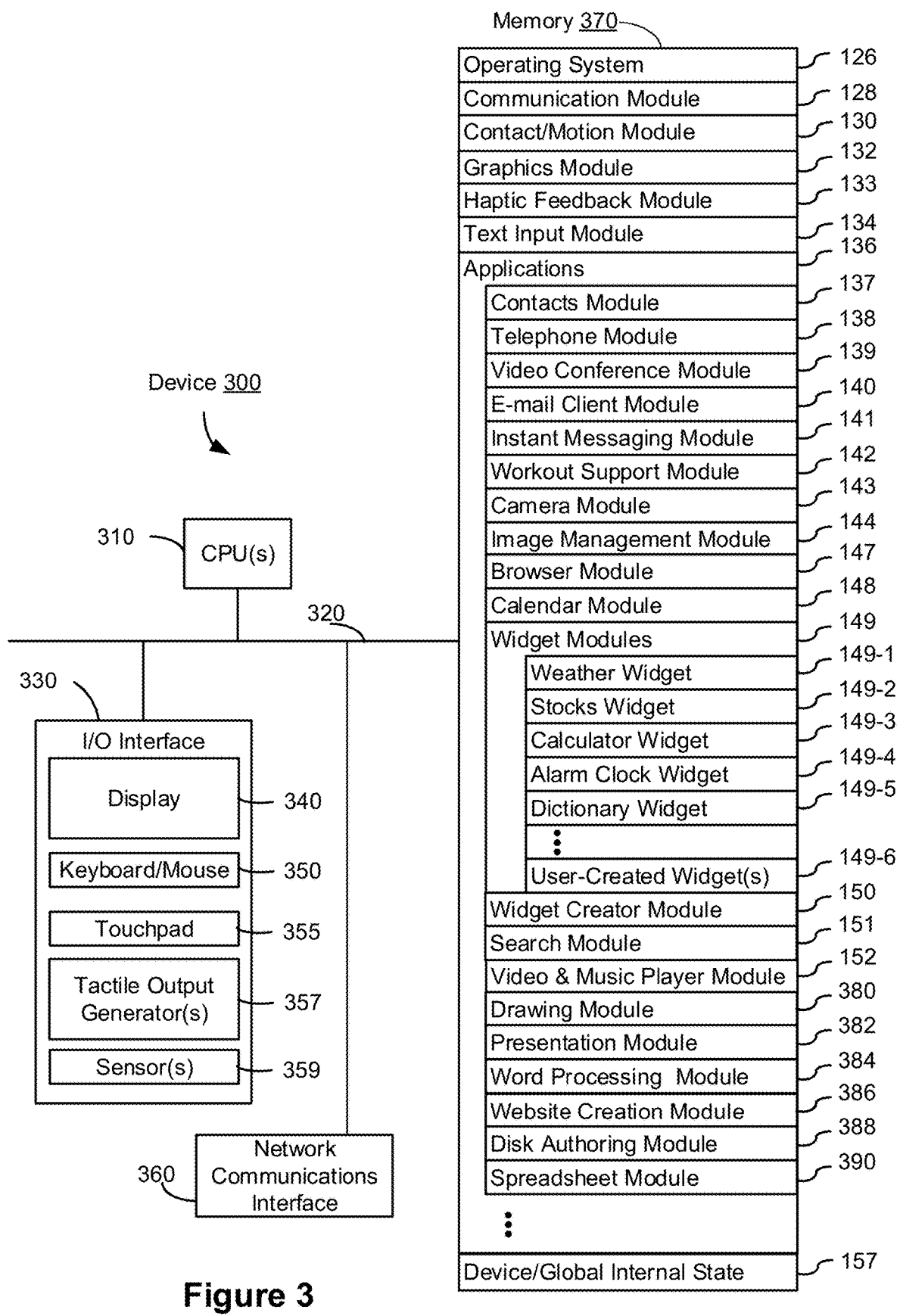
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
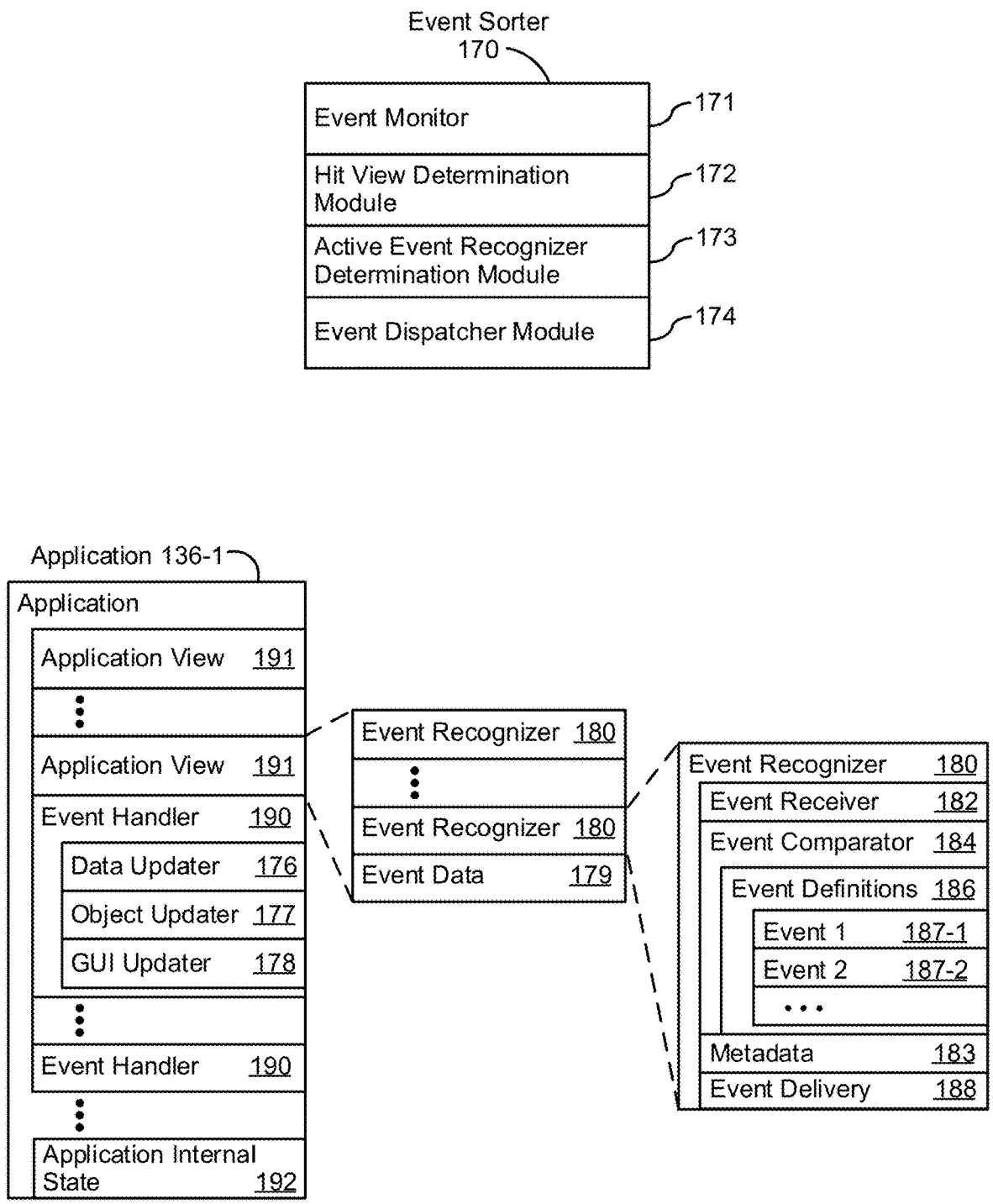
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
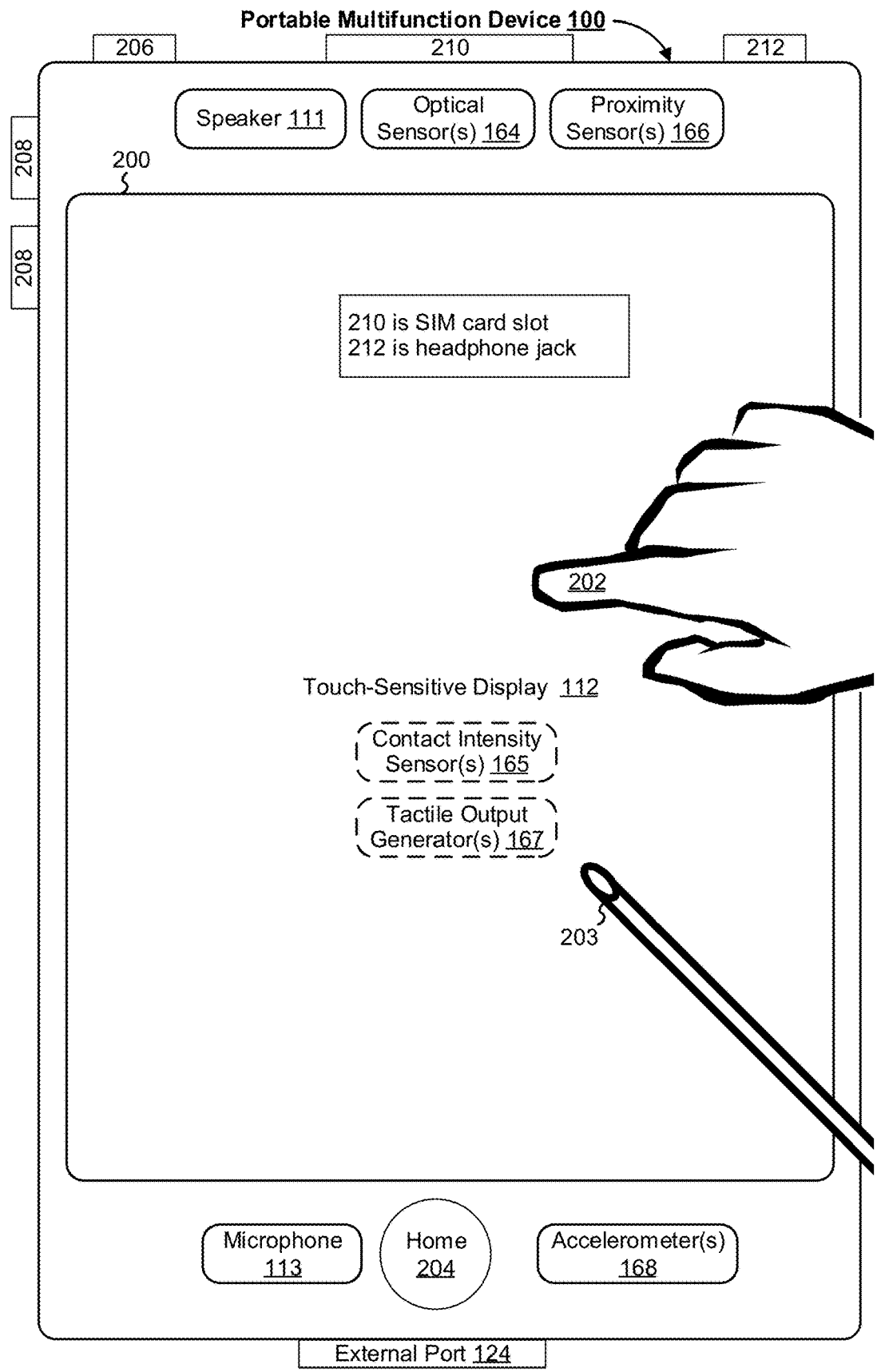
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
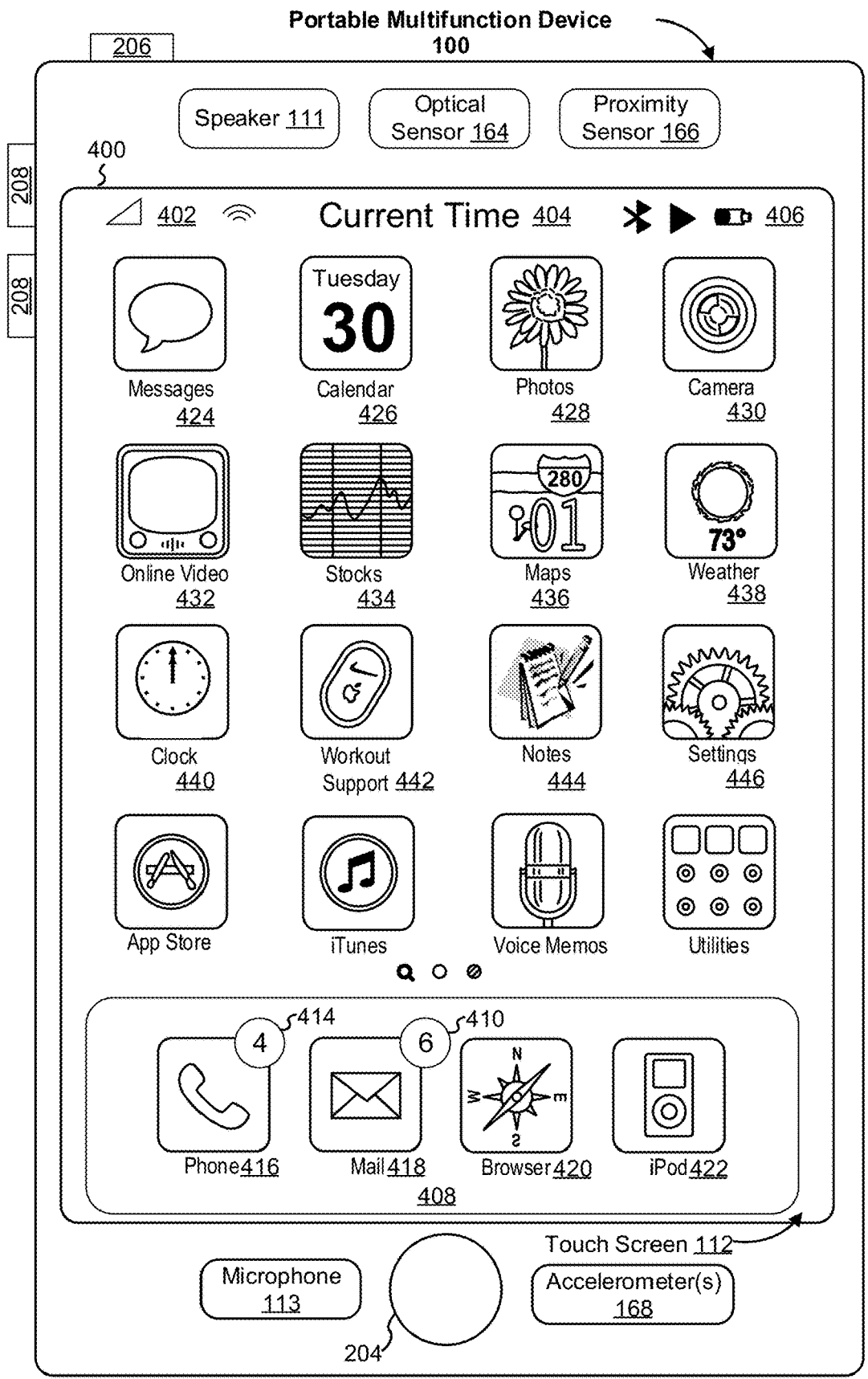
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:

Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser"; and
Icon 422 for video and music player module 152, also referred to as iPod (trademark of Apple Inc.) module 152, labeled "iPod"; and Icons for other applications, such as:
Icon 424 for IM module 141, labeled "Text";
Icon 426 for calendar module 148, labeled "Calendar";
Icon 428 for image management module 144, labeled "Photos";
Icon 430 for camera module 143, labeled "Camera";
Icon 432 for online video module 155, labeled "Online Video";
Icon 434 for stocks widget 149-2, labeled "Stocks";
Icon 436 for map module 154, labeled "Map";
Icon 438 for weather widget 149-1, labeled "Weather";
Icon 440 for alarm clock widget 169-6, labeled "Clock";
Icon 442 for workout support module 142, labeled "Workout Support";
Icon 444 for notes module 153, labeled "Notes"; and
Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
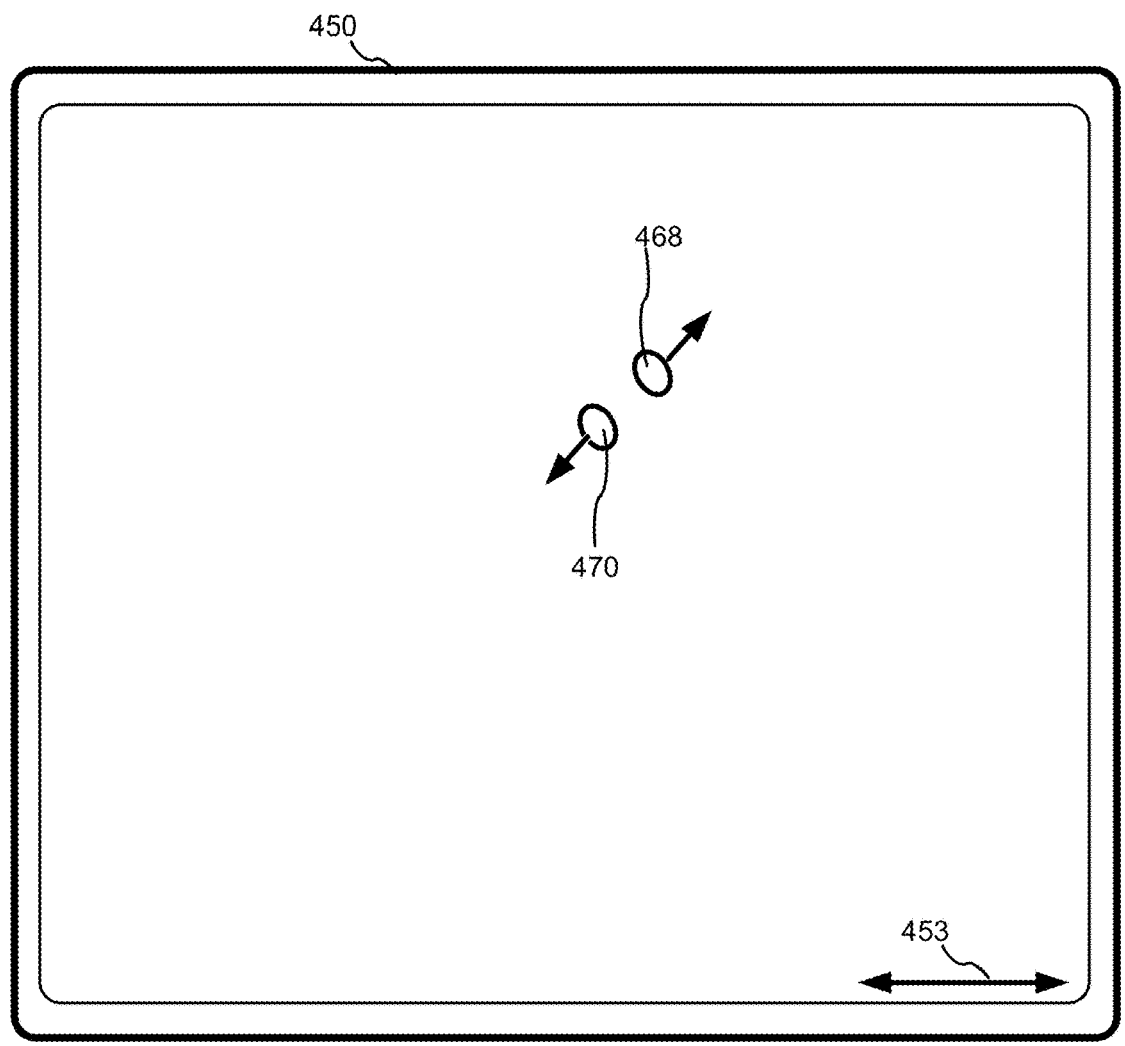
FIG. 4B illustrates an example user interface for a multifunction device with a touch-sensitive surface that is separate from the display in accordance with some embodiments.
Figure 4B:
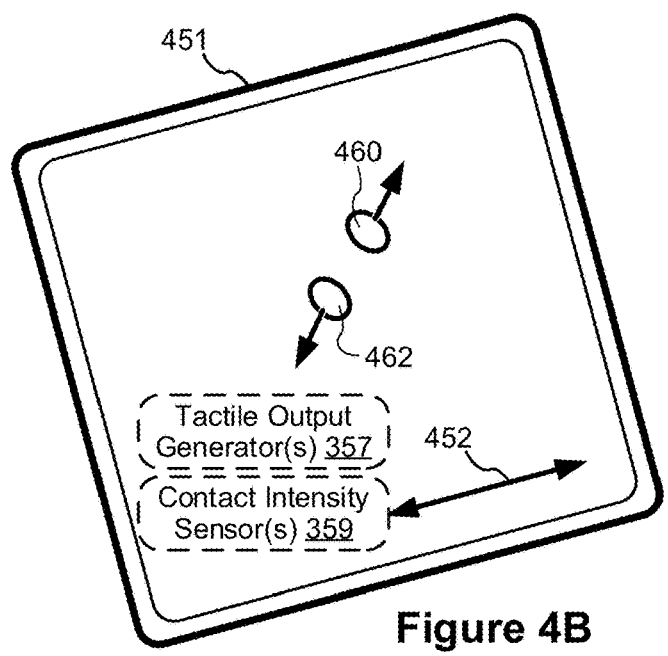

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

Multiple Device Environments

FIG. 5 illustrates an environment 500 including multiple electronic devices such as those described above. The environment 500 includes a smartphone 501, a tablet 502, a media player 503 (connected to a television display), and a second smartphone 504. Although the example environment 500 of FIG. 5 includes four devices, it is to be appreciated that other environments can include other numbers of devices and other devices, such as a laptop, desktop computer, or a smartwatch. A user 599 with limited motor skills, such as those with certain finger or hand impairments, may find interacting with the smartphone 501 (and other devices) via the touch-sensitive surface difficult, if not impossible. Thus, the smartphone 501 can be configured to operate in an accessibility mode in which input from a switch device 510 is used to navigate the user interface.

The switch device 510 generates a binary input stream including binary inputs that are communicated to the smartphone 501. The switch device 510 can include, for example, a switch that produces an "on" input when the switch is pressed and an "off" input when the switch is not pressed. The switch device 510 can include, as another example, a camera that produces an "on" input when the user turns his/her head to the left and an "off" input when the camera does not detect this motion. The binary input stream can be, for example, a voltage wave form that has a first value (e.g., 5 V) to indicate an "on" input and a second value (e.g., 0 V) to indicate an "off" input.

The switch device 510 can generate multiple binary input streams that are communicated to the smartphone 501. The switch device 510 can include, for example, a first switch and a second switch. The first switch produces a first "on" input when the first switch is pressed and a first "off" input when the first switch is not pressed. Similarly, the second switch produces a second "on" input when the second switch is pressed and a second "off" input when the second switch is not pressed. The first "on" input and the second "on" input can have different effects in operating the smartphone 501. As another example, the switch device 510 can include a camera that produces a first "on" input when the user turns his/her head to the left and a second "on" input when the user turns his/her head to the right.

A variety of devices for people of limited mobility can be used to generate switch inputs, including a device that detects when air in blown into a straw or when the person blinks.

In the accessibility mode, the smartphone 501 interprets the input from the switch device 510 to navigate the user interface. In some implementation, the user interface includes a selection indicator that sequentially highlights interface objects. In some embodiments, when the selection indicator is highlighting a first interface object and a select switch input (e.g., a first "on" input) is received, a menu for interacting with the interface object is displayed. In some embodiments, when the selection indicator is highlighting a first interface object, the selection indicator moves to a second interface object automatically after a time, e.g. a scanning period. In some embodiments, when the selection indicator is highlighting a first interface object, the selection indicator moves to a second interface object upon receiving a next switch input (e.g., a second "on" input).

The switch device 510 can be connected to the smartphone 501 via a wired or wireless connection. However, a user 599 with limited motor skills may find it difficult, if not impossible, to disconnect the switch device 510 from the smartphone 501 and connect the switch device 510 to another device (e.g., the tablet 502) to control the other device using the switch device 510 in the accessibility mode. Accordingly, described below are various method, devices, and user interfaces for allowing a user to control multiple devices in an accessibility mode using a single switch device 510.

User Interfaces and Associated Processes

Attention is now directed towards embodiments of user interfaces ("UI") and associated processes that may be implemented on an electronic device, such as the smartphone 501, tablet 502, or media player 503 of FIG. 5.

FIGS. 6A-6BD illustrate example user interfaces for controlling multiple devices in an accessibility mode in accordance with some embodiments. The user interfaces in these figures are used to illustrate the processes described below, including the processes in FIGS. 7A-7G.

FIG. 6A illustrates an environment 600 including the smartphone 501, coupled to a switch device 690 with a first switch 691 and a second switch 692, and the tablet 502. The switch device 690 generate multiple binary input streams that are communicated to the smartphone 501. The switch device 690 includes, for example, a first switch 691 and a second switch 692. The first switch 691 produces a first "on" input when the first switch is pressed and a first "off" input when the first switch is not pressed. Similarly, the second switch produces a second "on" input when the second switch is pressed and a second "off" input when the second switch is not pressed. As described below, the first "on" input and the second "on" input can have different effects in operating the smartphone 501. Accessibility switch devices are frequently used by people who have difficulty operating a standard input mechanism for a computer (e.g., mouse, keyboard, trackpad, touch-sensitive display). Accessibility switch devices come in a variety of different configurations that are tailored to users with different accessibility needs (e.g., switches that can be activated via foot inputs, via hand inputs, via breathing, via eye tracking, via head movement, etc.). While accessibility switch devices are designed to be easier to activate for users with different accessibility needs, they rely on software to intelligently provide binary decisions to navigate through the user interface instead of the more complex inputs that are possible with standard input mechanisms. The smartphone 501 displays a first user interface 610 including a plurality of interface objects 611A-611G on a display of the smartphone 501. The tablet 502 displays a second user interface 620 including a plurality of interface objects 621A-621J on a display of the tablet 502. Although substantially rectangular interface objects are illustrated in FIGS. 6A-6BD, the interface objects can be circular, irregular, or any other shape.

The first user interface 610 includes a selection indicator 695 highlighting a first interface object 611A. Although FIGS. 6A-6BD illustrate the selection indicator 695 as surrounding the first interface object 611A, in various implementations, the selection indicator 695 highlights the interface object 611A in other ways. For example, in various implementations, the selection indicator 695 surrounds the interface object, is displayed over the interface object, changes a visual characteristic of the interface object (e.g., a brightness, a contrast, or a color), points to a location of interface object, or otherwise highlights the interface object.

FIG. 6A illustrates a switch device 690 coupled to the smartphone 501. In various implementations, the switch device 690 can be coupled to the smartphone via a wired or wireless (e.g., Bluetooth™) connection. The switch device 690 includes a first switch 691 configured to provide a select input and a second switch 692 configured to provide a next input. In some embodiments, the switch device 690 includes only the first switch 691 and the selection indicator 695 moves to a next interface object automatically after a scanning period. As described further below, the first switch 691 and second switch 692 are configurable to provide switch inputs besides the select input and the next input. Further, the scanning speed (e.g., the length of the scanning period) is also configurable.

FIG. 6A illustrates that the second switch 692 is activated, resulting in a next input detected by the smartphone 501.

FIG. 6B illustrates the environment 600 of FIG. 6A in response to detecting the next input. In FIG. 6B, the selection indicator 695 highlights a second interface object 611B.

FIG. 6B illustrates that the first switch 691 is activated, resulting in a select input detected by the smartphone 501.

Figure 6C:
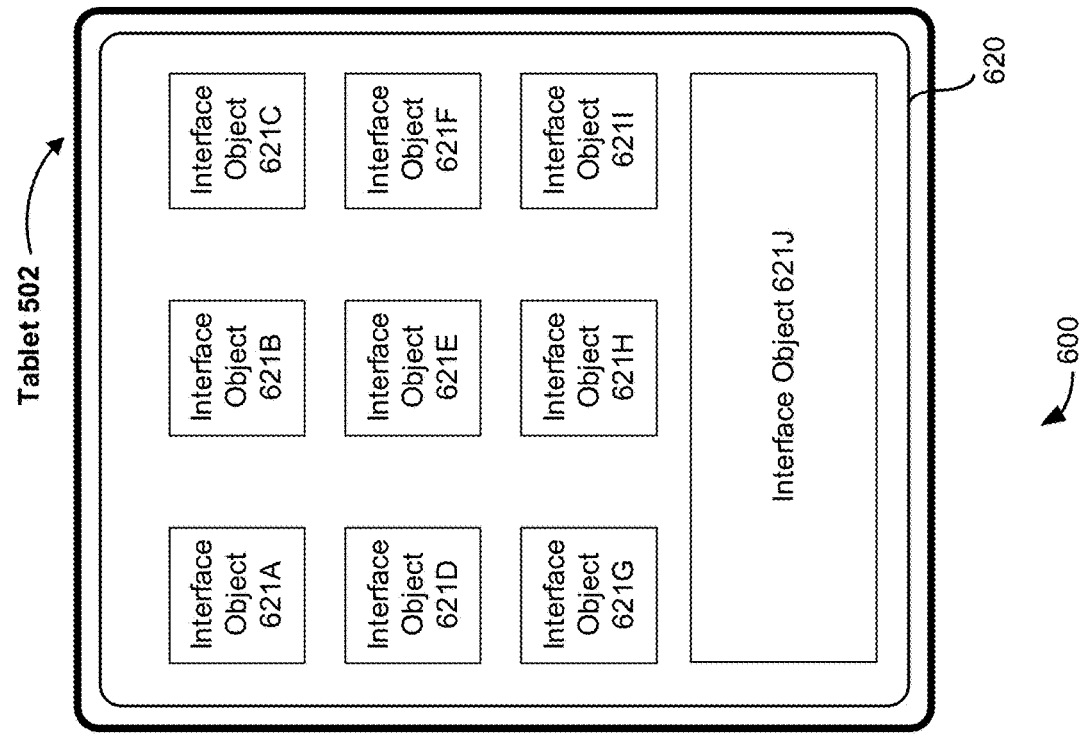
Figure 6C:
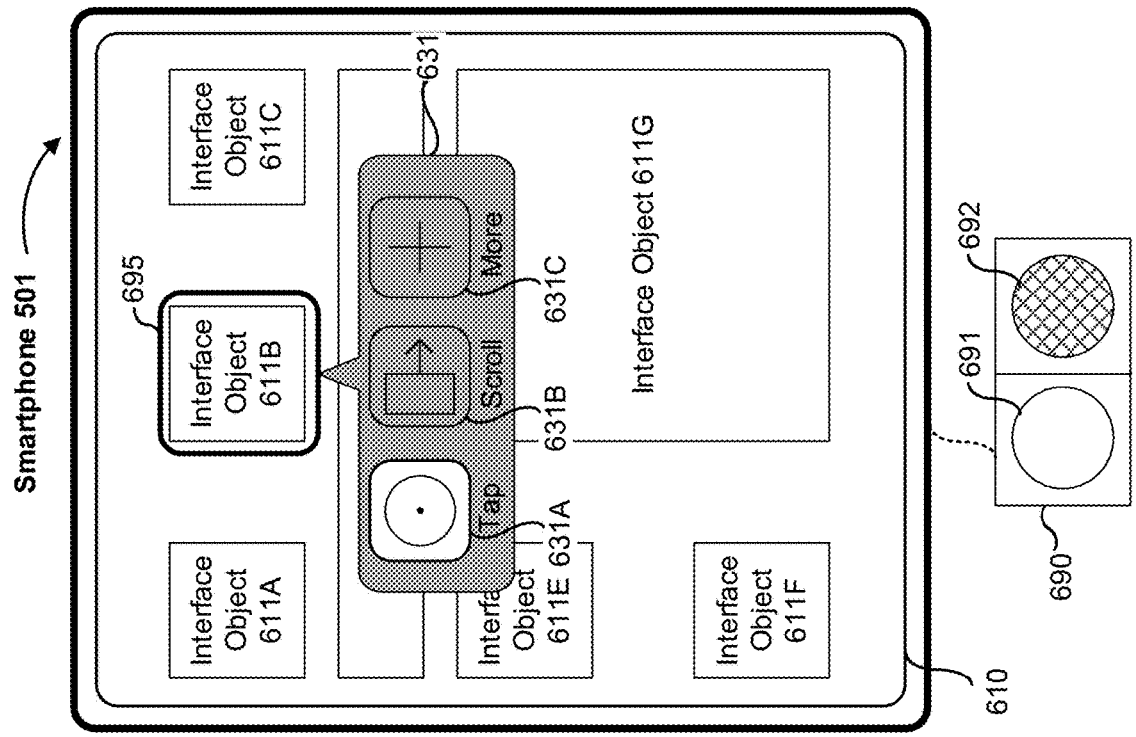

FIG. 6C illustrates the environment 600 of FIG. 6B in response to detecting the select input. The user interface 610 includes a first interaction menu 631 including a plurality of interaction affordances. The interaction affordances include a tap affordance 631A for performing a tap operation associated with a tap of the interface object 611B. The interaction affordances include a scroll affordance 631B for performing a scroll operation (e.g., replacing the interface objects 611A-611G with other interface objects). The interaction affordances include a more affordance 631C for displaying a second interaction menu. In FIG. 6C, the tap affordance 631A is highlighted and the other interaction affordances are not highlighted.

FIG. 6C illustrates that the second switch 692 is activated, resulting in a next input detected by the smartphone 501.

Figure 6D:
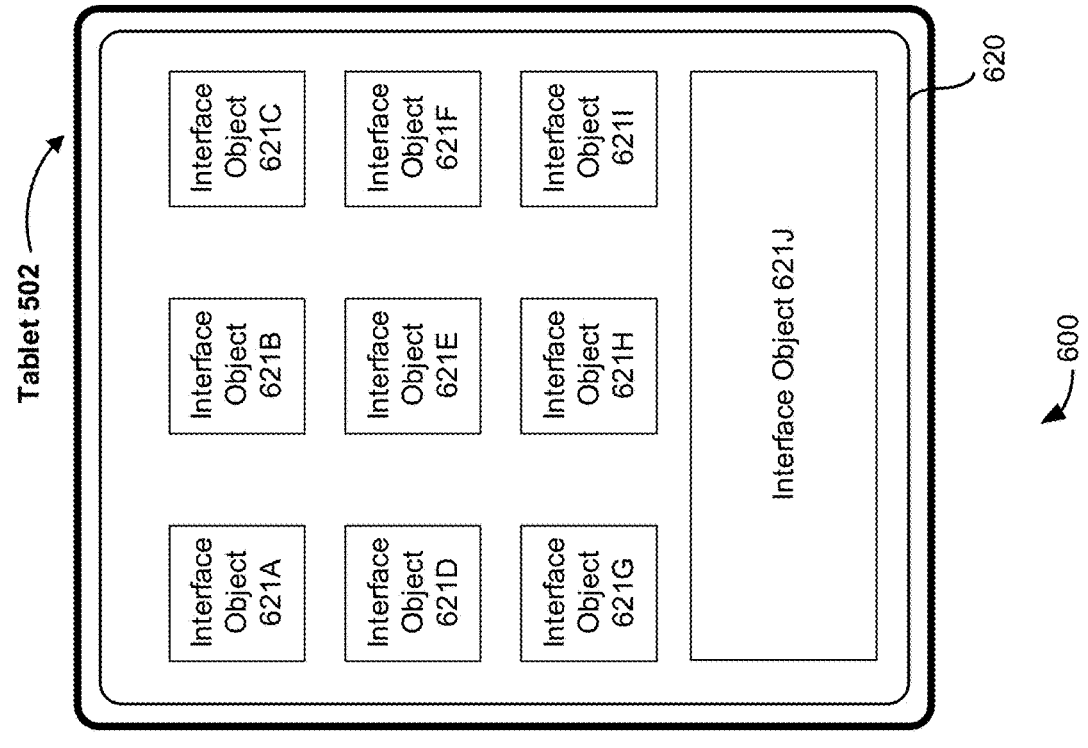
Figure 6D:
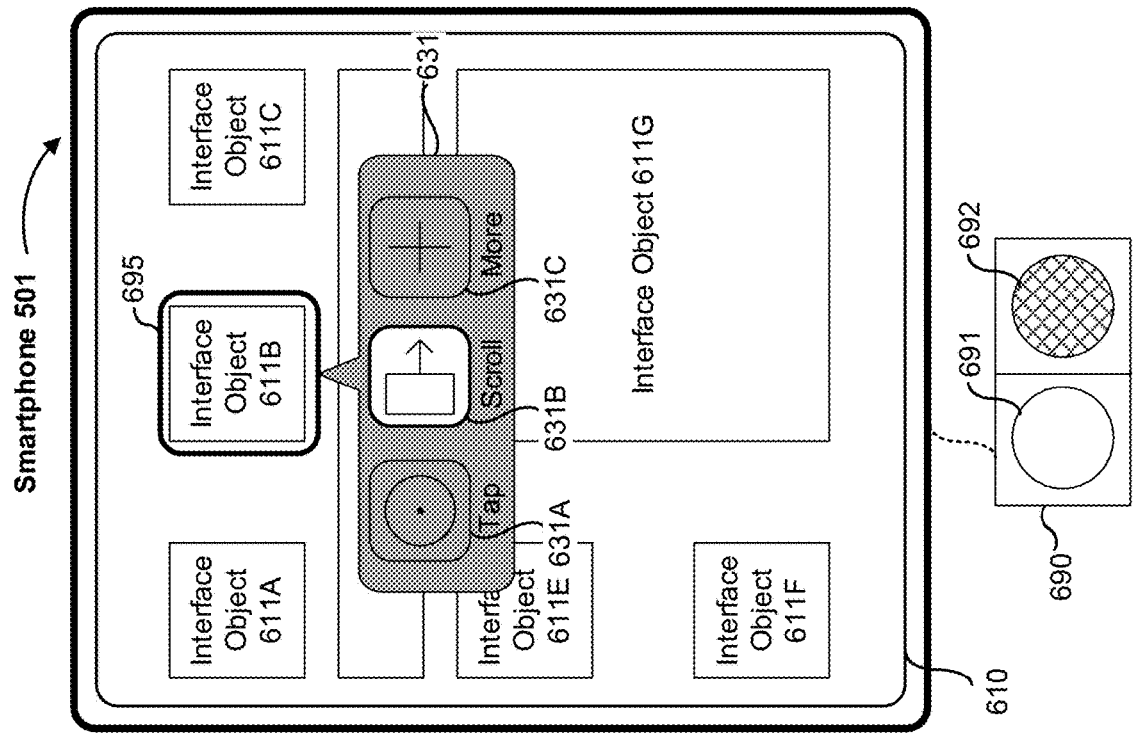

FIG. 6D illustrates the environment 600 of FIG. 6C in response to detecting the next input. In FIG. 6D, the scroll affordance 631B is highlighted and the other interaction affordances are not highlighted.

FIG. 6D illustrates that the second switch 692 is activated, resulting in a next input detected by the smartphone 501.

Figure 6E:
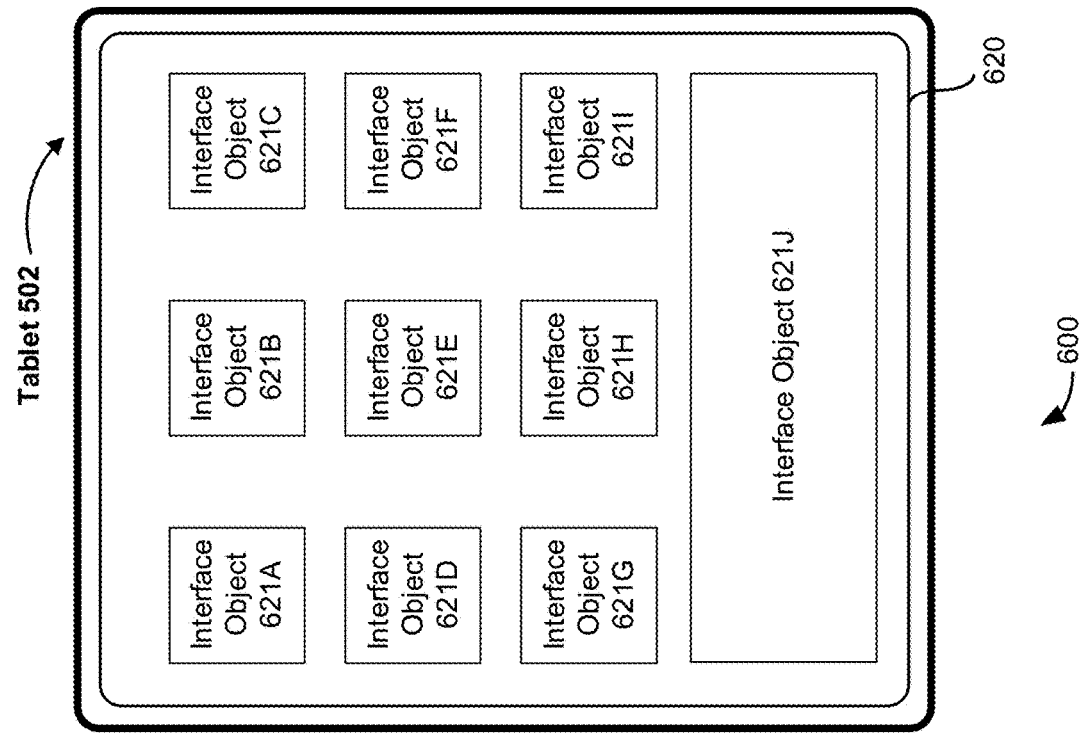
Figure 6E:
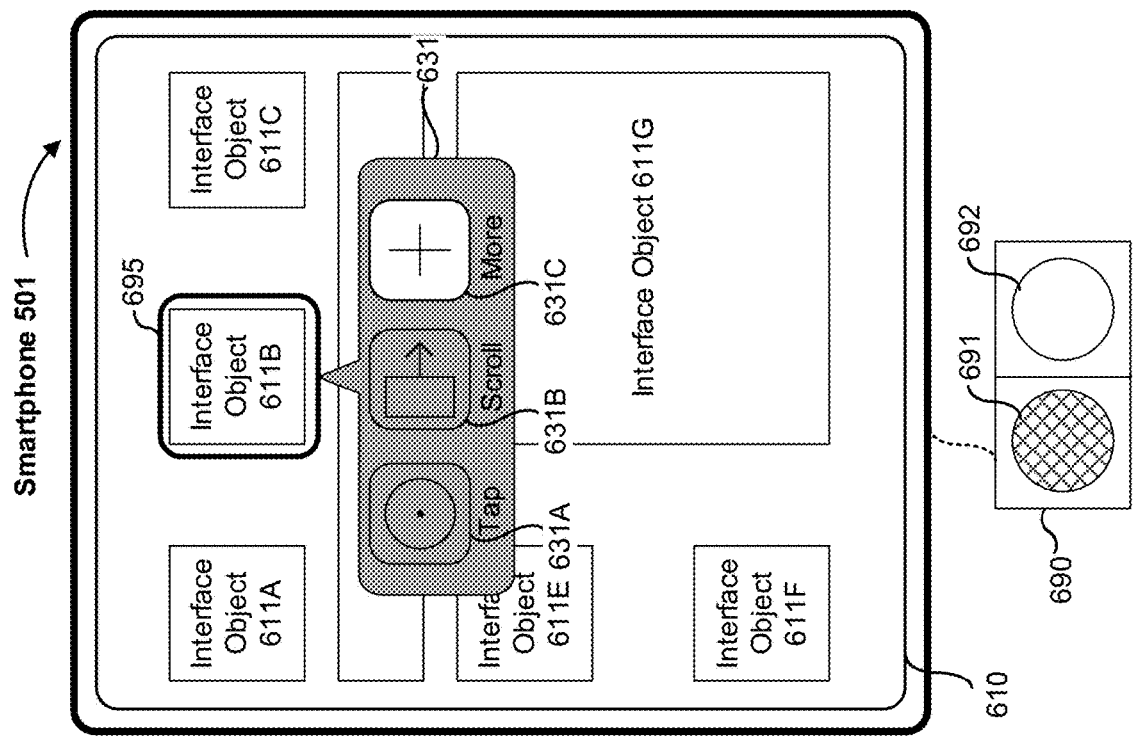

FIG. 6E illustrates the environment 600 of FIG. 6D in response to detecting the next input. In FIG. 6E, the more affordance 631C is highlighted and the other interaction affordances are not highlighted.

FIG. 6E illustrates that the first switch 691 is activated, resulting in a select input detected by the smartphone 501.

Figure 6F:
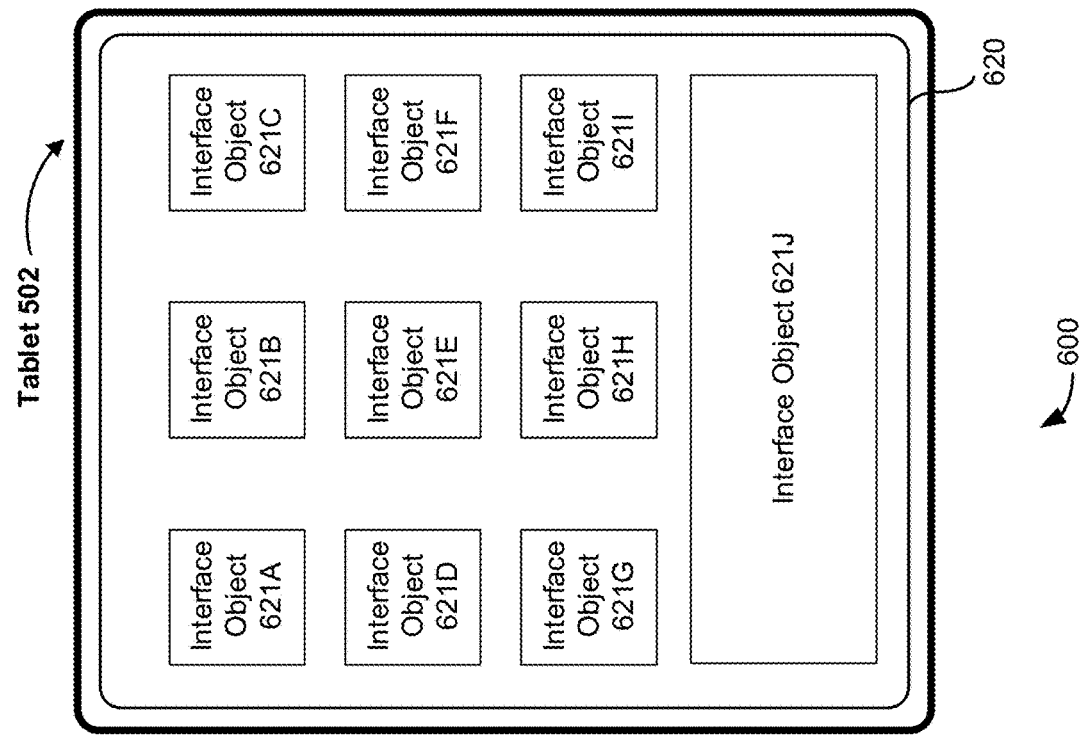
Figure 6F:
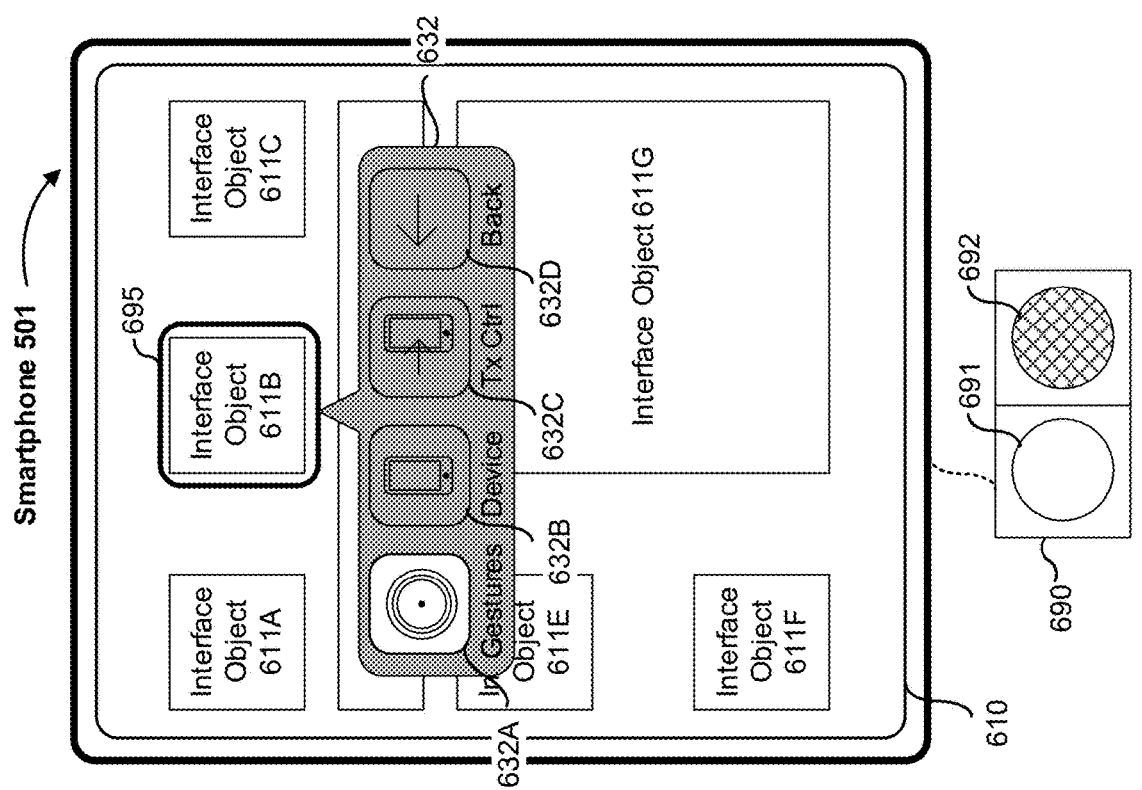

FIG. 6F illustrates the environment 600 of FIG. 6E in response to detecting the select input. In FIG. 6F, the first interaction menu 631 is replaced with a second interaction menu 632. The second interaction menu 632 includes a plurality of interaction affordances. The interaction affordances include a gestures affordance 632A for displaying a gestures menu. The gestures menu can include a plurality of gesture affordances for performing operations associated with performing touch gestures at a location of the interface object 611B. The interaction affordances include a device affordance 632B for display a device menu. The device menu can include a plurality of device affordances for performing operations on the device, such as returning to a home screen, entering a settings screen, changing a volume of the device, or powering down the device. The interaction affordances include a transfer control affordance 632C for controlling other devices using the switch device 690 (as described in detail below). The interaction affordances include a back affordance 632D for exiting the second interface menu (and returning to the state of FIG. 6B). In FIG. 6F, the gestures affordance 632A is highlighted and the other interaction affordances are not highlighted.

FIG. 6F illustrates that the second switch 692 is activated, resulting in a next input detected by the smartphone 501.

Figure 6G:
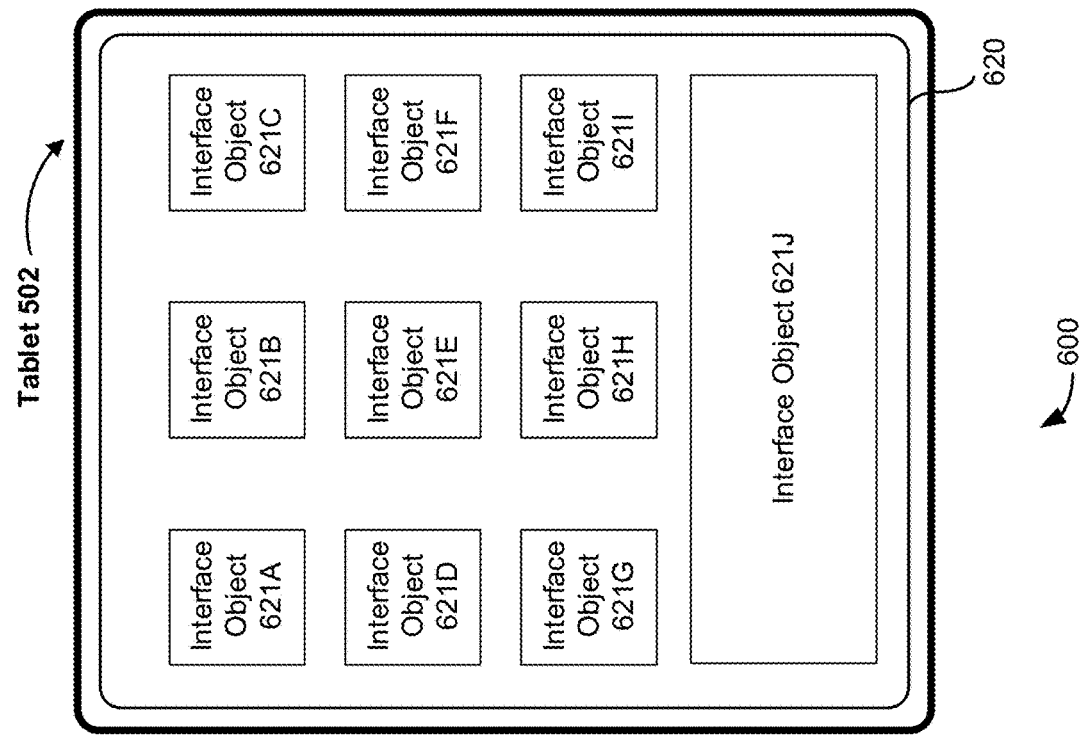
Figure 6G:
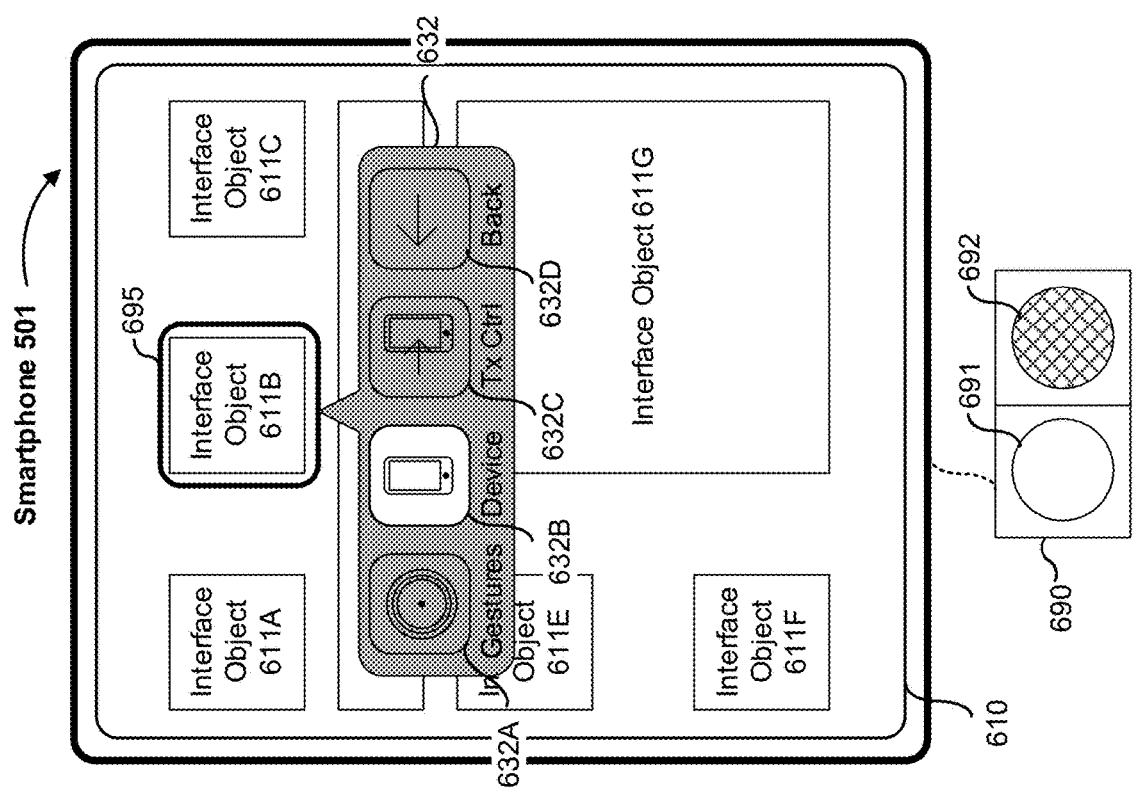

FIG. 6G illustrates the environment 600 of FIG. 6F in response to detecting the next input. In FIG. 6G, the device affordance 632B is highlighted and the other interaction affordances are not highlighted.

FIG. 6G illustrates that the second switch 692 is activated, resulting in a next input detected by the smartphone 501.

Figure 6H:
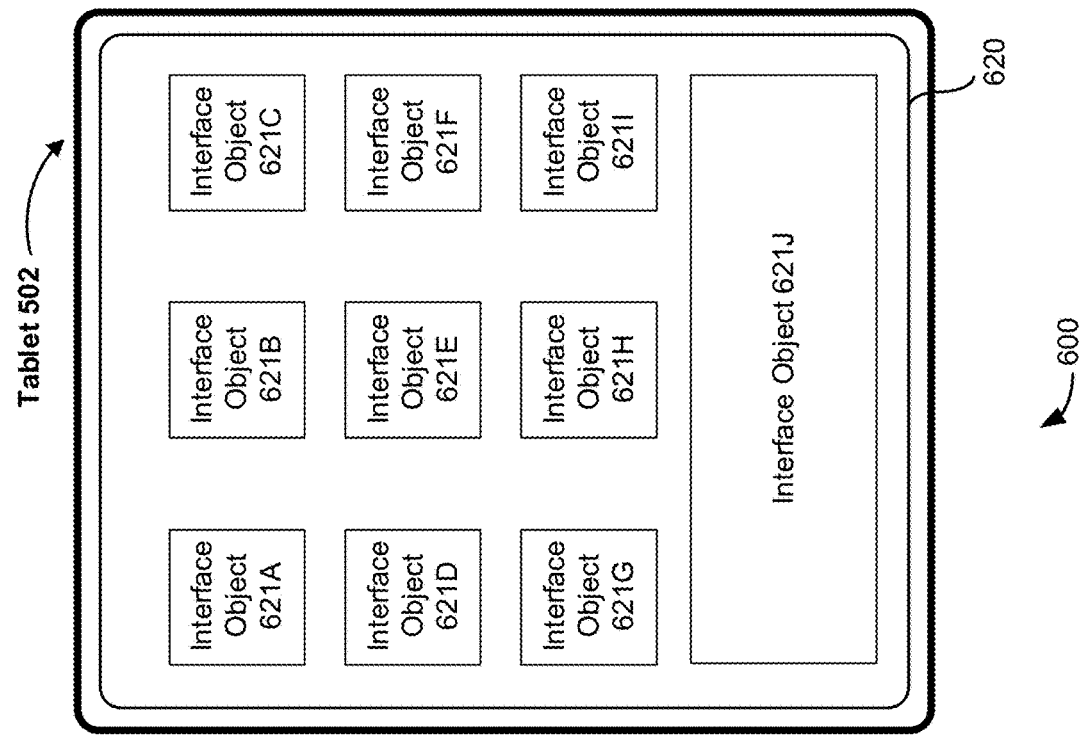
Figure 6H:
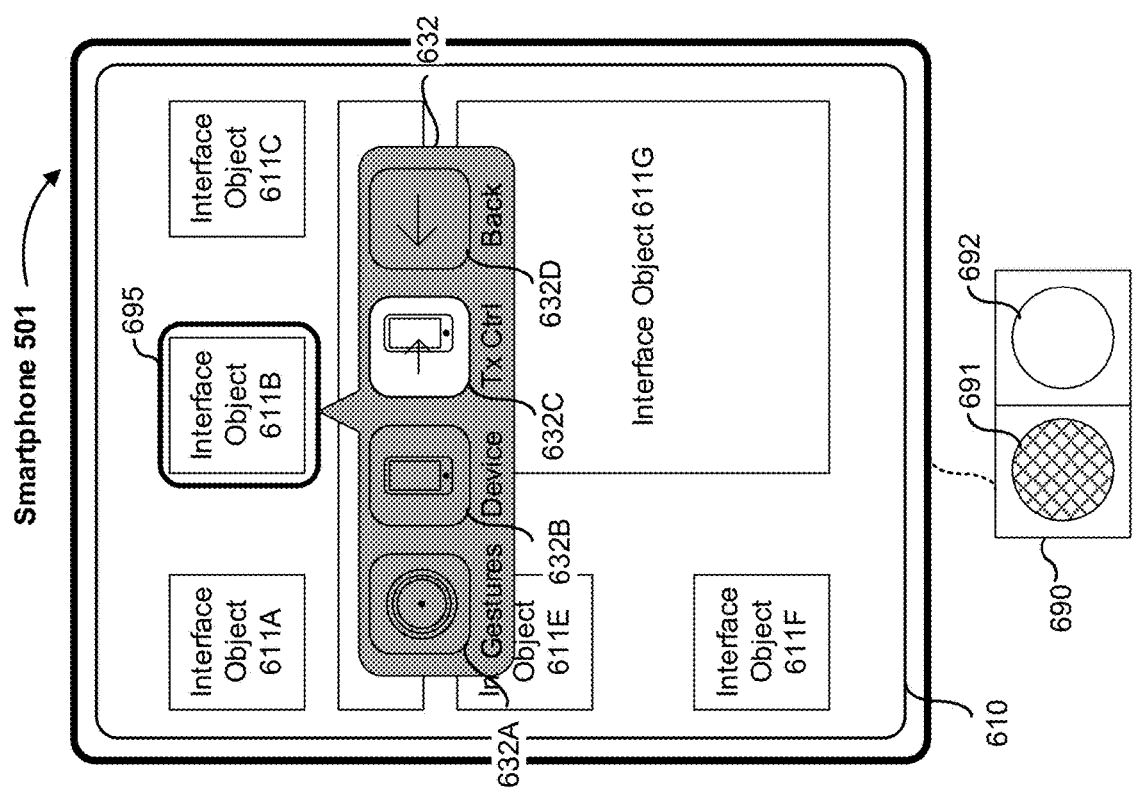

FIG. 6H illustrates the environment 600 of FIG. 6G in response to detecting the next input. In FIG. 6H, the transfer control affordance 632D is highlighted and the other interaction affordances are not highlighted.

FIG. 6H illustrates that the first switch 691 is activated, resulting in a select input detected by the smartphone 501.

Figure 6I:
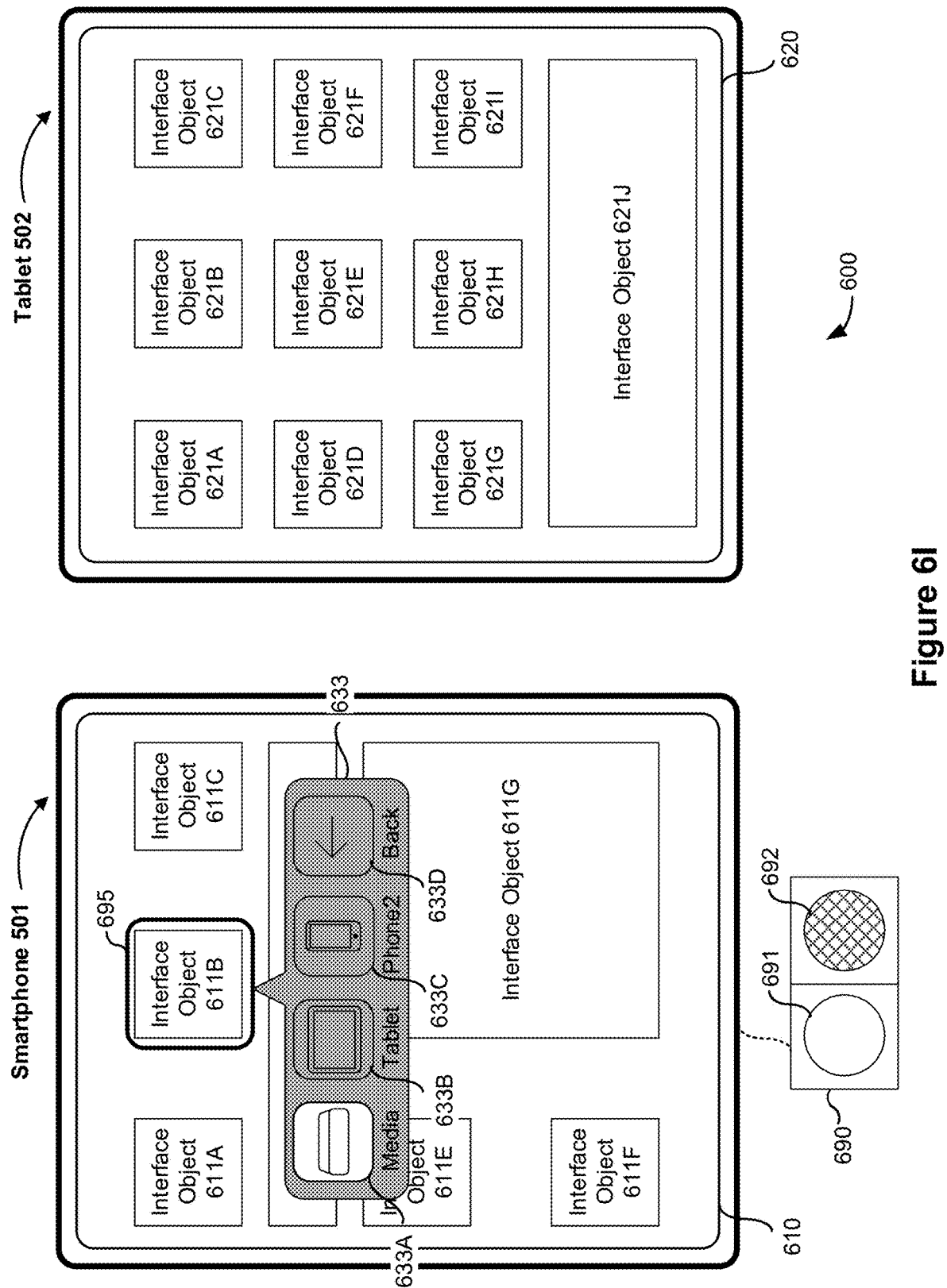

FIG. 6I illustrates the environment 600 of FIG. 6H in response to detecting the select input. In FIG. 6I, the second interaction menu 632 is replaced with a device select menu 633 including a plurality of device select affordances. In response to detecting the select input while the transfer control affordance 632D is highlighted, the smartphone 501 scans the environment to detect the presence of other nearby devices. For example, the smartphone 501 can be associated with a user account and can access a list of other devices associated with the user account. For each other device on the list, the smartphone 501 can determine whether the other device is nearby based on a proximity sensor, GPS location information, network connectivity (e.g., connected to the same WLAN), or other information. In some embodiments, the device select affordances include a device select affordance for each detected nearby device.

In FIG. 6I, the device select affordances include a media player select affordance 633A for selecting a media player 503 of the environment 600. The device select affordances include a tablet select affordance 633B for selecting the tablet 502 of the environment 600. The device select affordances include a phone select affordance for selecting a smartphone 504 of the environment 600. The device select menu 633 also includes a back affordance 633D for exiting the device select menu (and returning to the state of FIG. 6B or, alternatively, to the state of FIG. 6H). In FIG. 6I, the media player select affordance 633A is highlighted and the other affordances of the device select menu 633 are not highlighted.

FIG. 6I illustrates that the second switch 692 is activated, resulting in a next input detected by the smartphone 501.

Figure 6J:
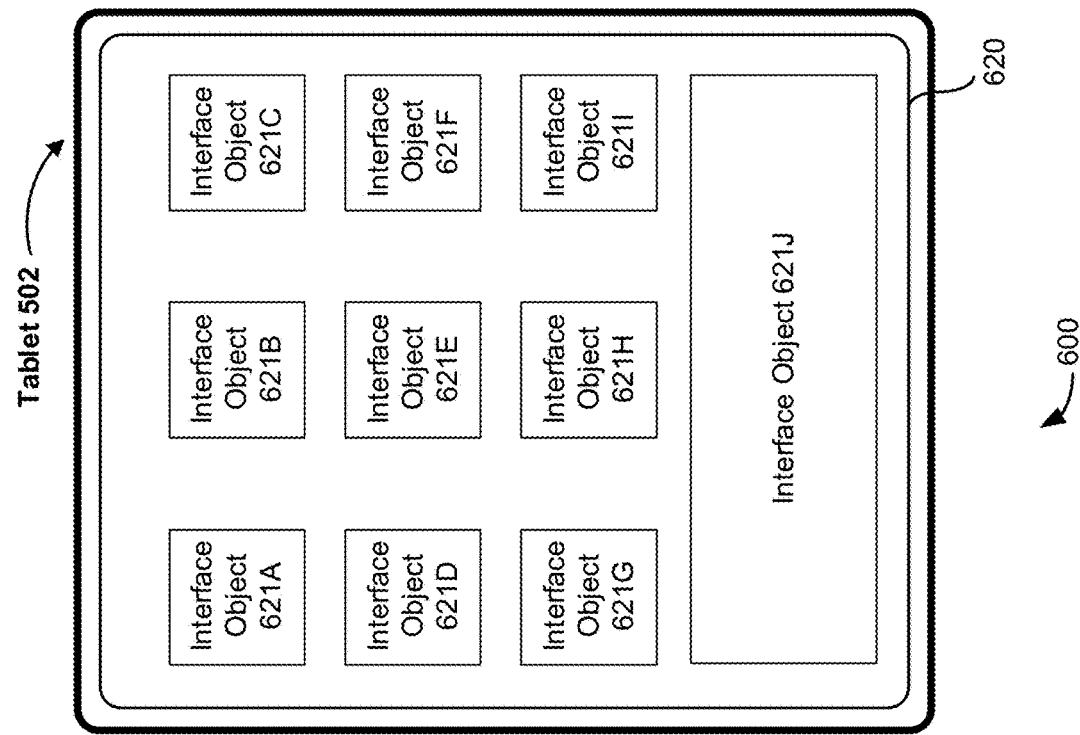
Figure 6J:
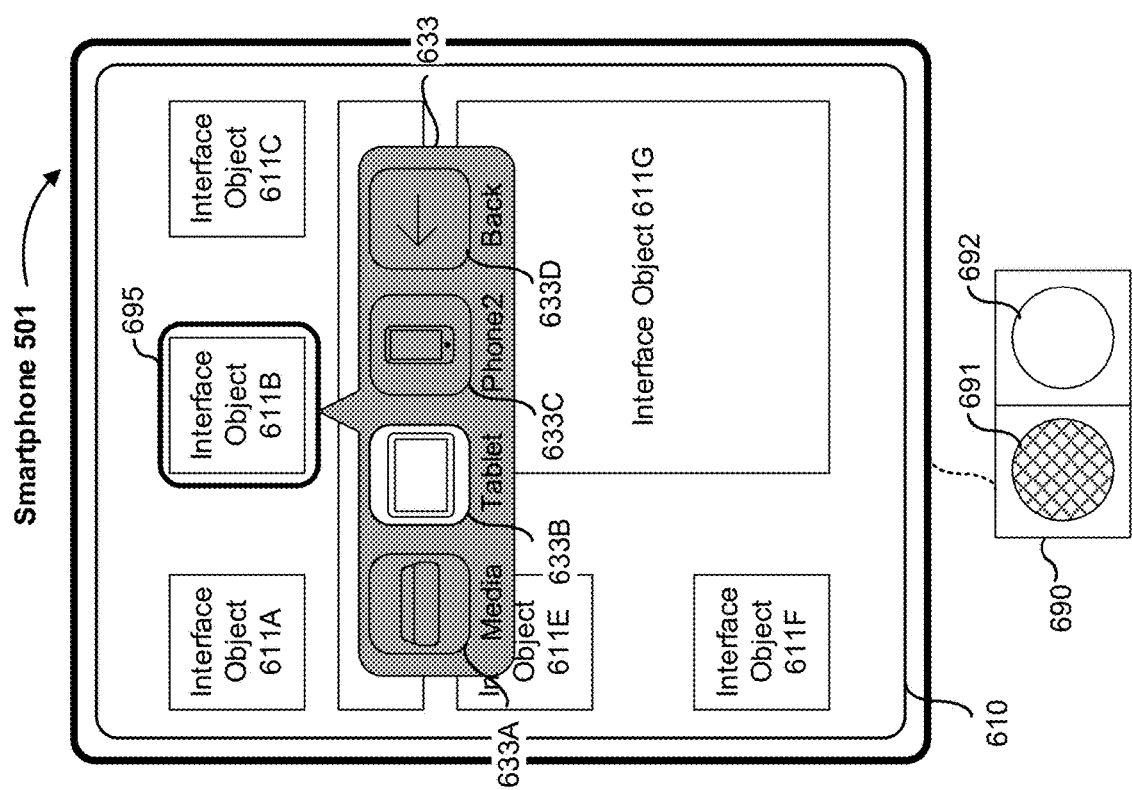

FIG. 6J illustrates the environment 600 of FIG. 6I in response to detecting the next input. In FIG. 6J, the tablet select affordance 633B is highlighted and the other affordances of the device select menu 633 are not highlighted.

FIG. 6J illustrates that the first switch 691 is activated, resulting in a select input detected by the smartphone 501.

Figure 6K:
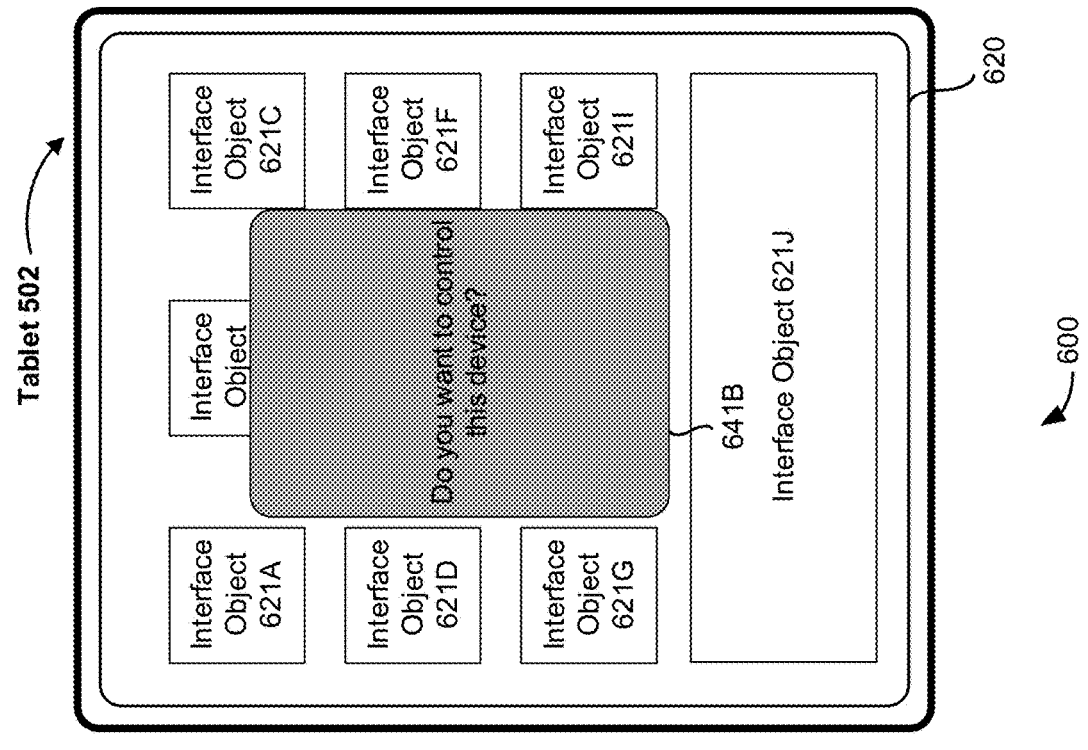
Figure 6K:
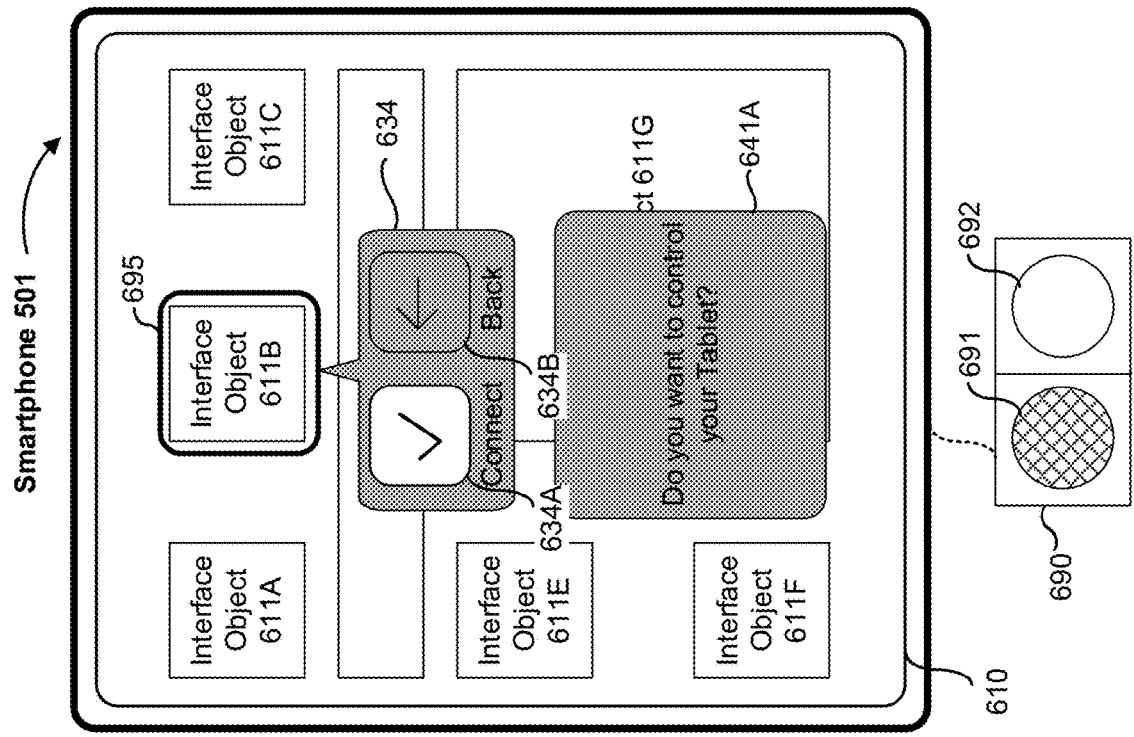

FIG. 6K illustrates the environment 600 of FIG. 6J in response to detecting the select input. In FIG. 6K, the device select menu 633 is replaced with a transfer control confirmation menu 634. The transfer control confirmation menu 634 include a confirmation affordance 634A for transferring control to the selected device and a back affordance 634B for exiting the transfer control confirmation menu 634 (and returning to the state of FIG. 6B or, alternatively, to the state of FIG. 6H or 6J).

The first user interface 610 includes a first transfer confirmation notification 641A indicating that selection of the confirmation affordance 634A will transfer control to the selected device (e.g., the tablet 502). The second user interface 620 includes a second transfer confirmation notification 641B indicating that selection of the confirmation affordance 634A will transfer control to the device upon which the second transfer confirmation notification 641B is displayed (e.g., the tablet 502).

Thus, if a user mistakenly selects an unintended device (e.g., a device that is not visible or nearby), the first transfer confirmation notification 641A and second transfer confirmation notification 641B provide an indication that a mistake has been made.

FIG. 6K illustrates that the first switch 691 is activated, resulting in a select input detected by the smartphone 501.

Figure 6L:
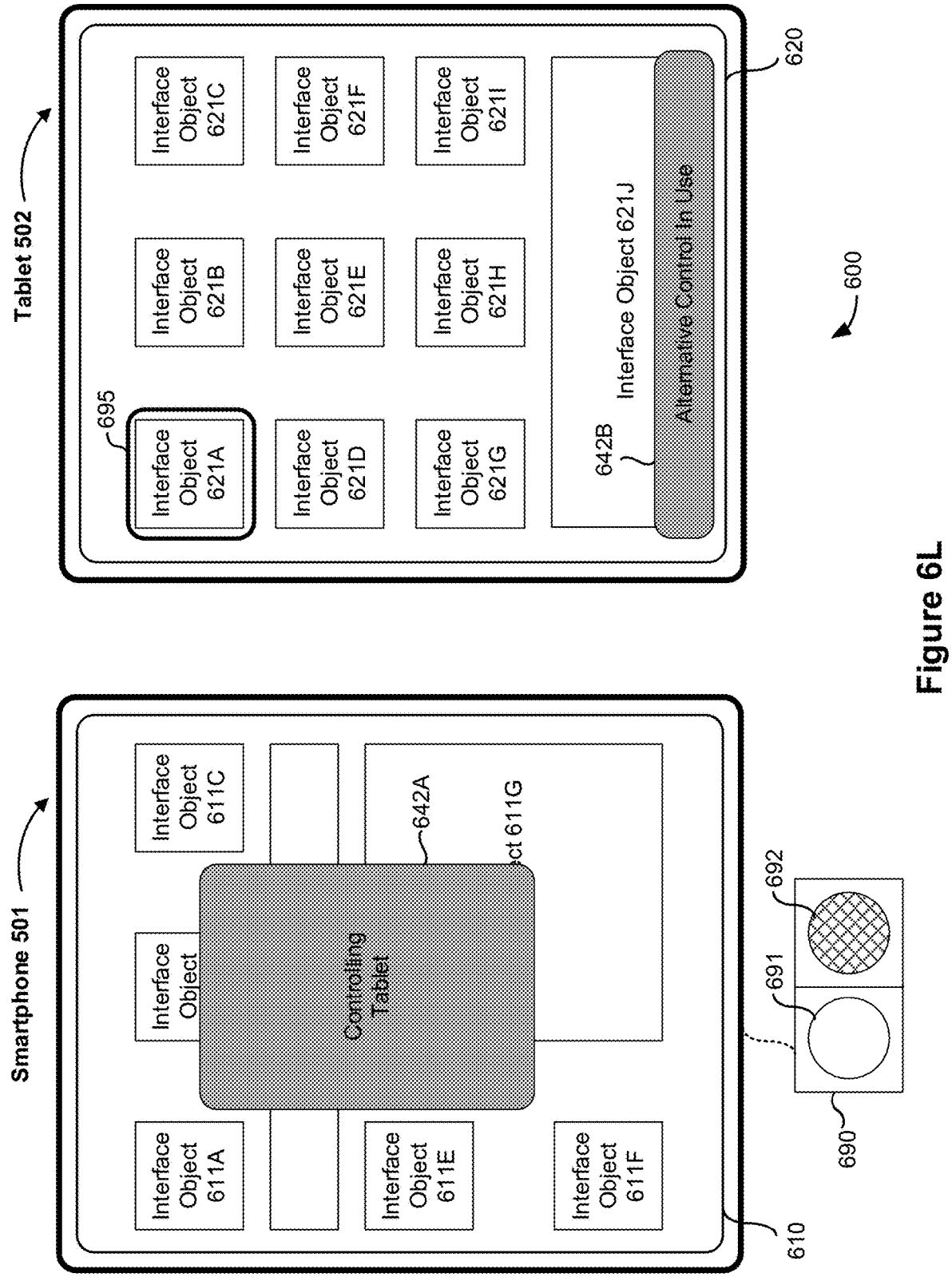

FIG. 6L illustrates the environment 600 of FIG. 6K in response to detecting the select input. In FIG. 6L, the selection indicator 695 is part of the second user interface 620 of the tablet 501, highlighting a first interface object 621A. The first user interface 610 includes a first transferred control notification 642A indicating that the switch device 690 coupled to the smartphone 501 is interacting with the second user interface 620 of the tablet 502 (and not the first user interface 610 of the smartphone 501). The second user interface 620 includes a second transferred control notification 642B indicating that the second user interface 620 is being controlled by the switch device 690 coupled to the smartphone 501 (and not any other input device of the tablet 502 or connected to the tablet 502). In some embodiments, the first transferred control notification 642A and/or the second transferred control notification 642B persist as long as the second device is being operated based on input from the switch device 690.

In some implementations, switch inputs received from the switch device are received by the smartphone 501 and forwarded by the smartphone 501 to the tablet 502. In some implementations, switch inputs received from the switch device are sent directly to the second device. Thus, in some implementations, upon detecting the select input while highlighting of the confirmation affordance 634A, the smartphone 501 configures the tablet 502 to establish a connection with the switch device 690.

FIG. 6L illustrates that the second switch 692 is activated, resulting in a next input detected by the smartphone 501 (and forwarded to the tablet 502).

Figure 6M:
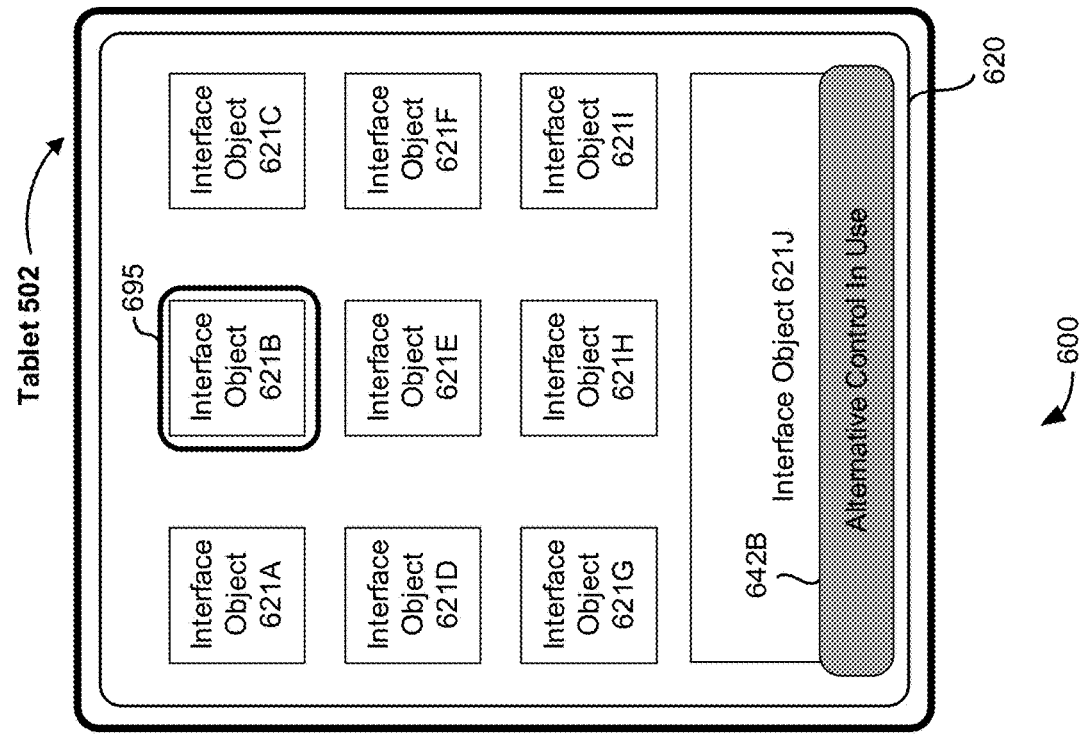
Figure 6M:
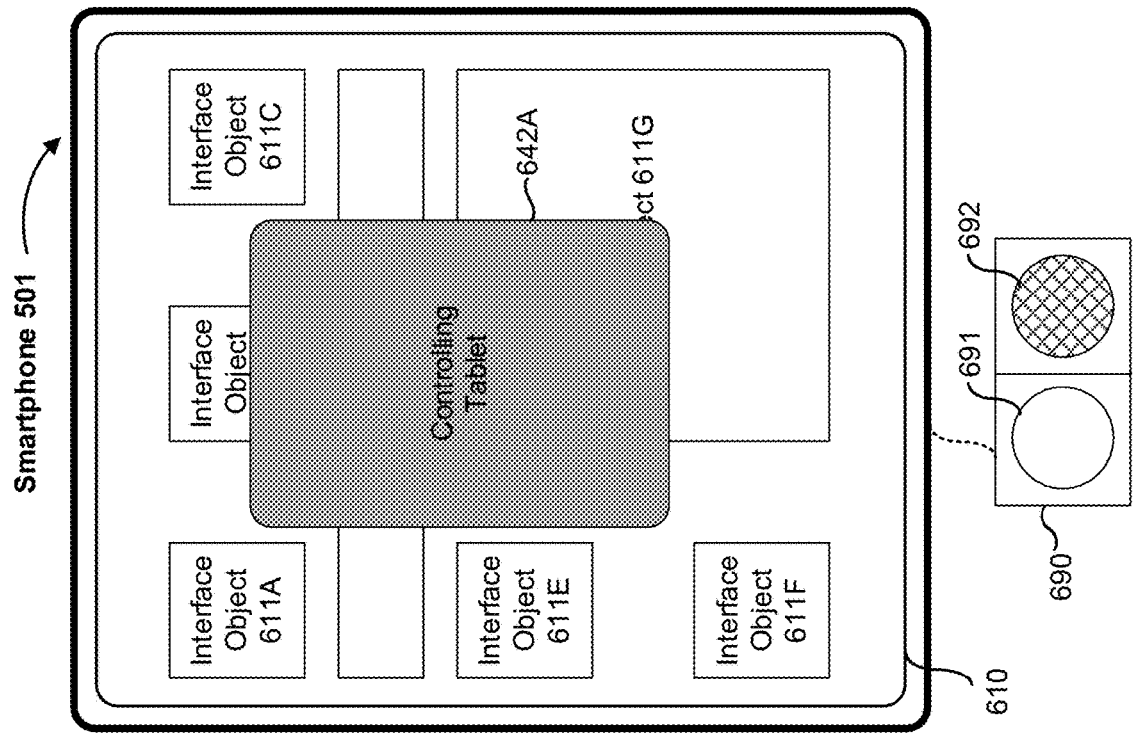

FIG. 6M illustrates the environment 600 of FIG. 6L in response to detecting the next input. In FIG. 6M, the selection indicator 695 has moved to highlight a second interface object 621B.

FIG. 6M illustrates that the second switch 692 is activated, resulting in a next input detected by the smartphone 501 (and forwarded to the tablet 502).

Figure 6N:
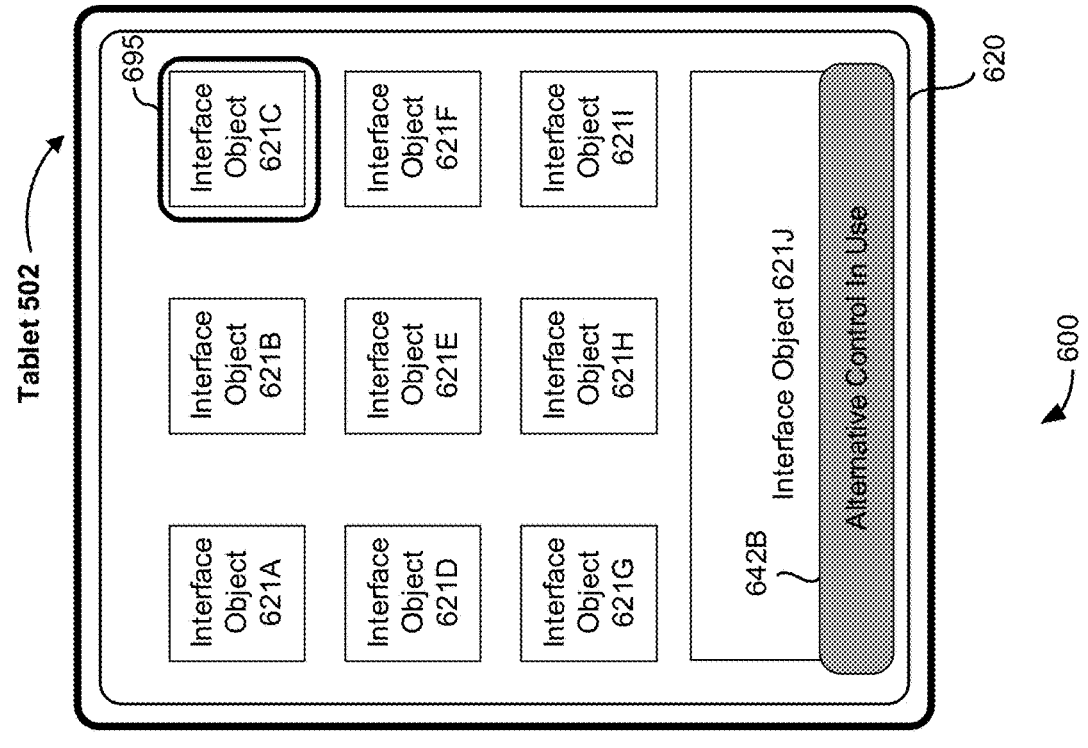
Figure 6N:
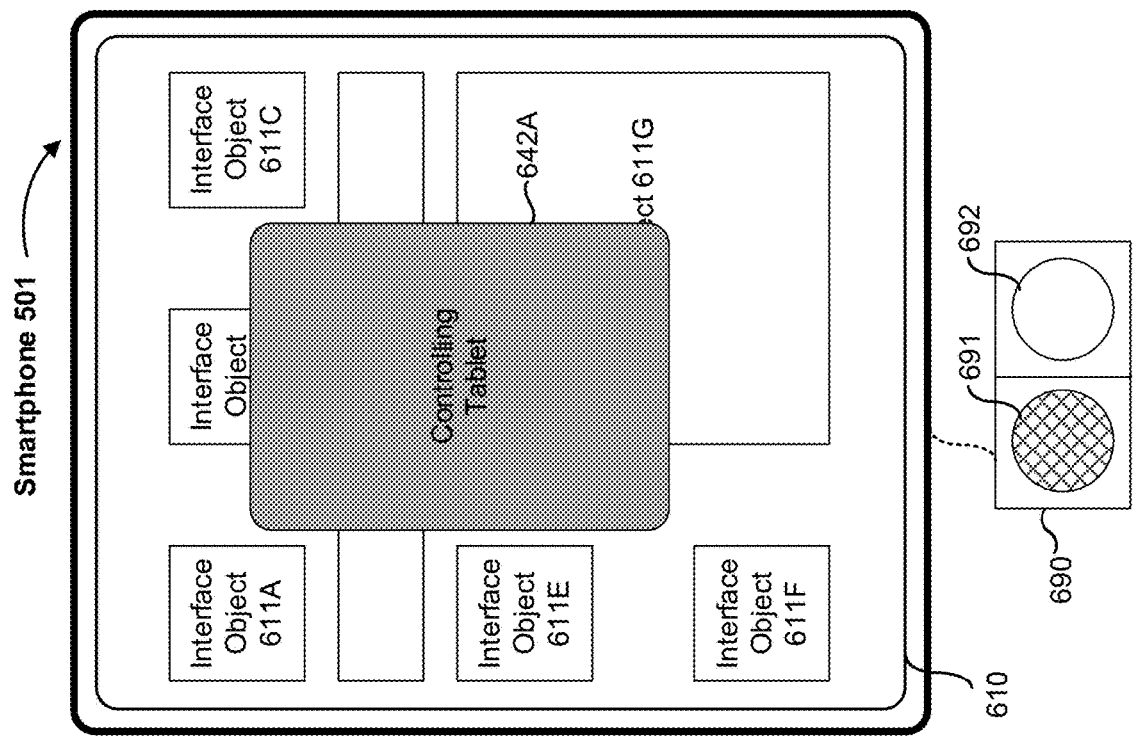

FIG. 6N illustrates the environment 600 of FIG. 6M in response to detecting the next input. In FIG. 6N, the selection indicator 695 has moved to highlight a third interface object 621C.

FIG. 6N illustrates that the first switch 691 is activated, resulting in a select input detected by the smartphone 501 (and forwarded to the tablet 502).

Figure 6O:
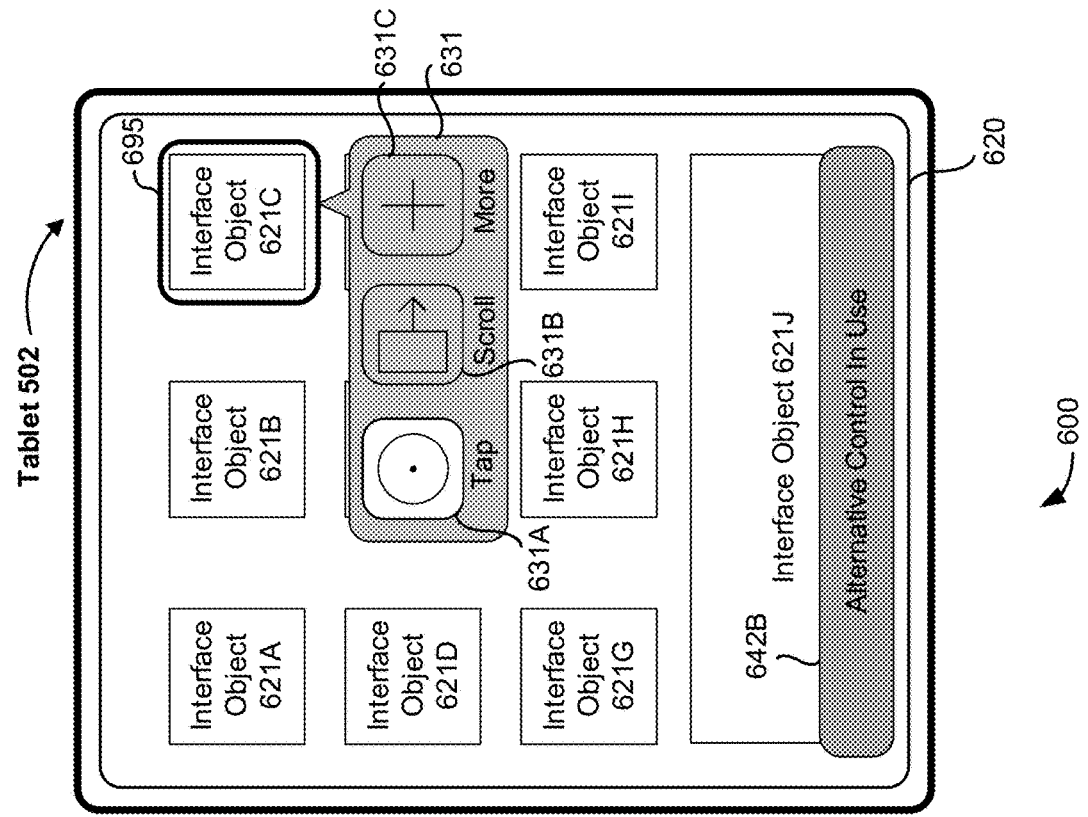
Figure 6O:
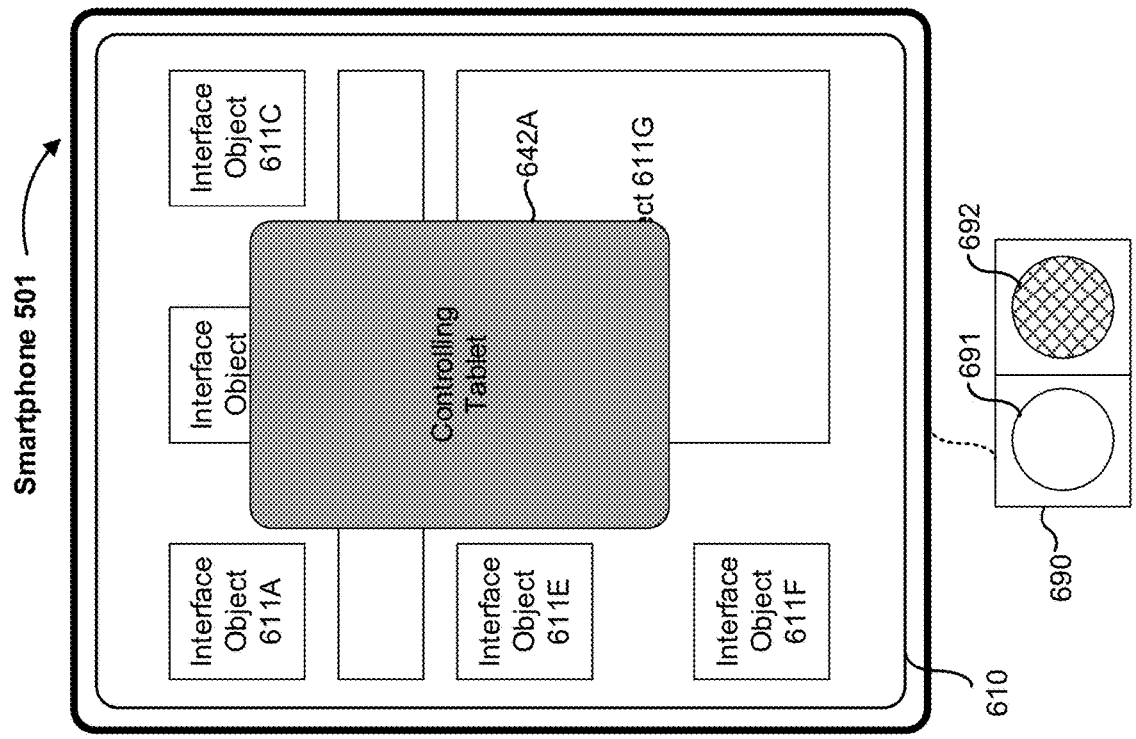

FIG. 6O illustrates the environment 600 of FIG. 6N in response to detecting the select input. The second user interface 620 includes the first interaction menu 631 displayed in association with the third interface object 621C. The tap affordance 631A of the first interaction menu 631 is highlighted and the other affordances of the first interaction menu 631 are not highlighted.

FIG. 6O illustrates that the second switch 692 is activated, resulting in a next input detected by the smartphone 501 (and forwarded to the tablet 502).

Figure 6P:
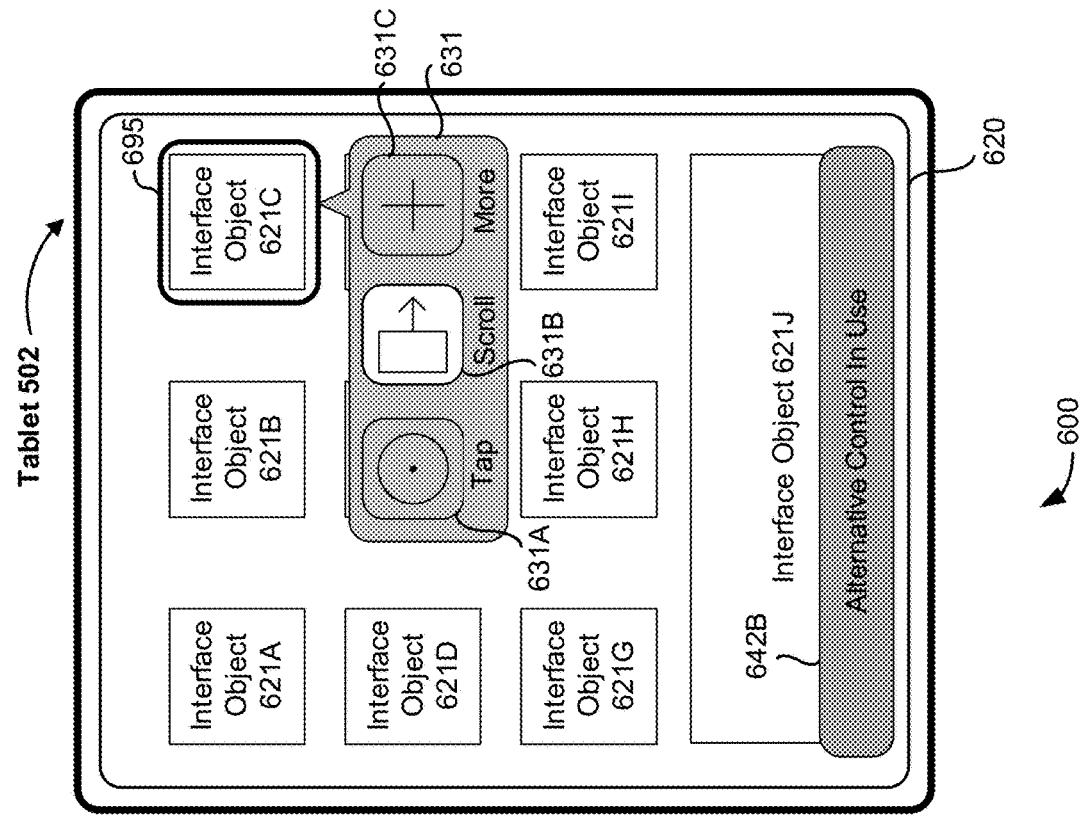
Figure 6P:
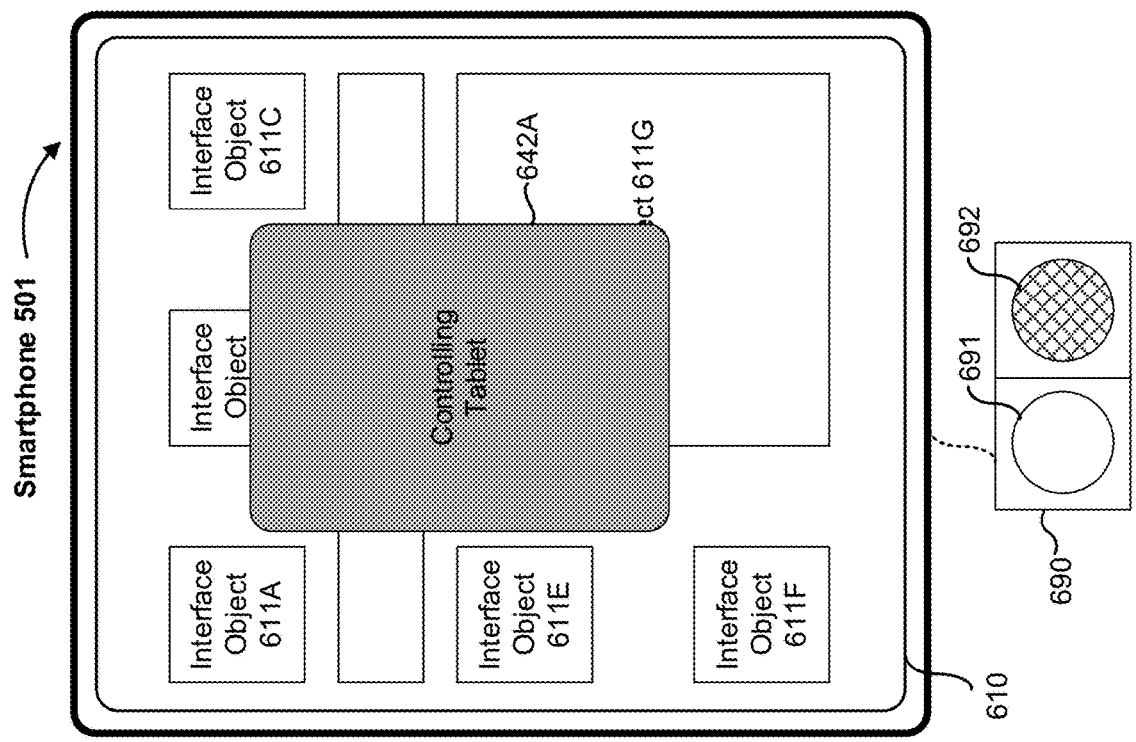

FIG. 6P illustrates the environment 600 of FIG. 6O in response to detecting the next input. In FIG. 6P, the scroll affordance 631B of the first interaction menu 631 is highlighted and the other affordances of the first interaction menu 631 are not highlighted.

FIG. 6P illustrates that the second switch 692 is activated, resulting in a next input detected by the smartphone 501 (and forwarded to the tablet 502).

Figure 6Q:
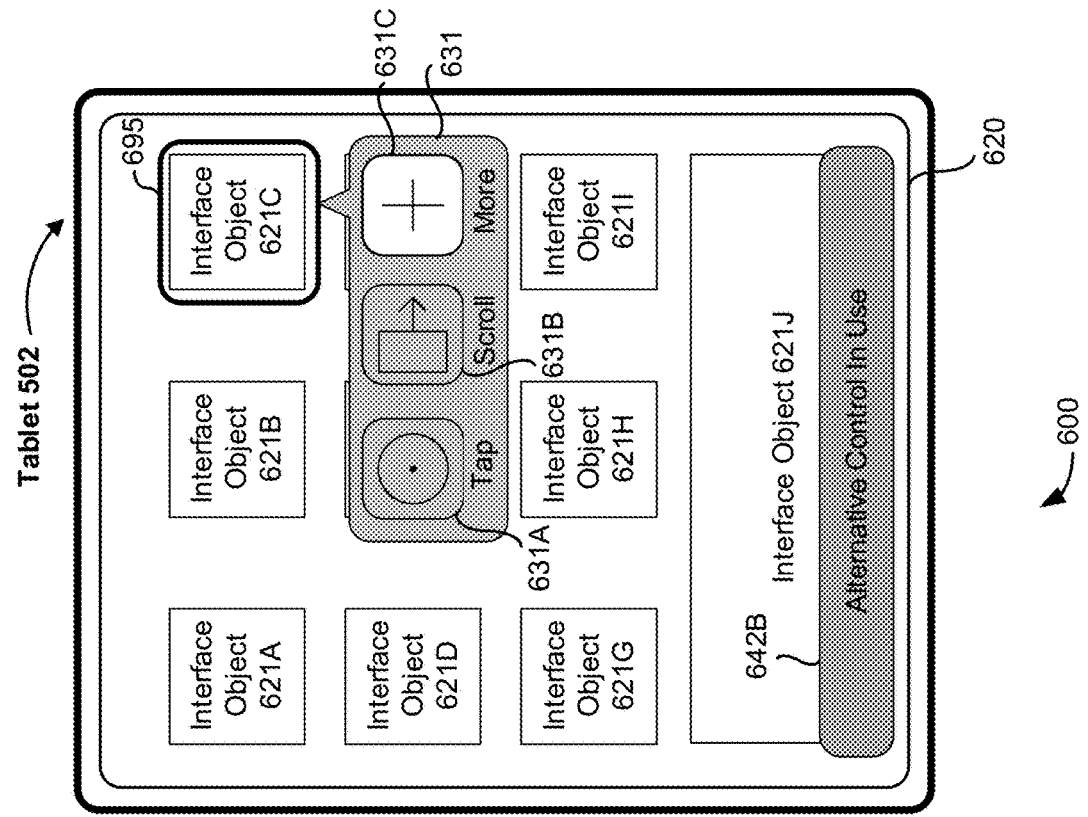
Figure 6Q:
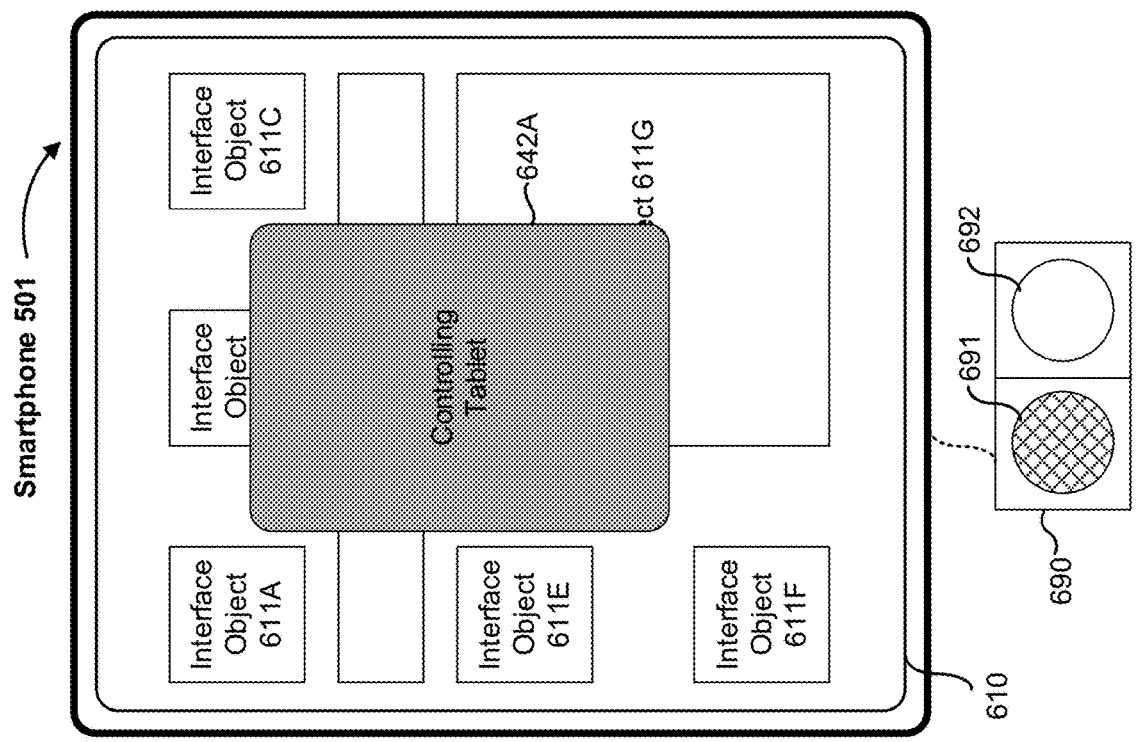

FIG. 6Q illustrates the environment 600 of FIG. 6P in response to detecting the next input. In FIG. 6Q, the more affordance 631C of the first interaction menu 631 is highlighted and the other affordances of the first interaction menu 631 are not highlighted.

FIG. 6Q illustrates that the first switch 691 is activated, resulting in a select input detected by the smartphone 501 (and forwarded to the tablet 502).

Figure 6R:
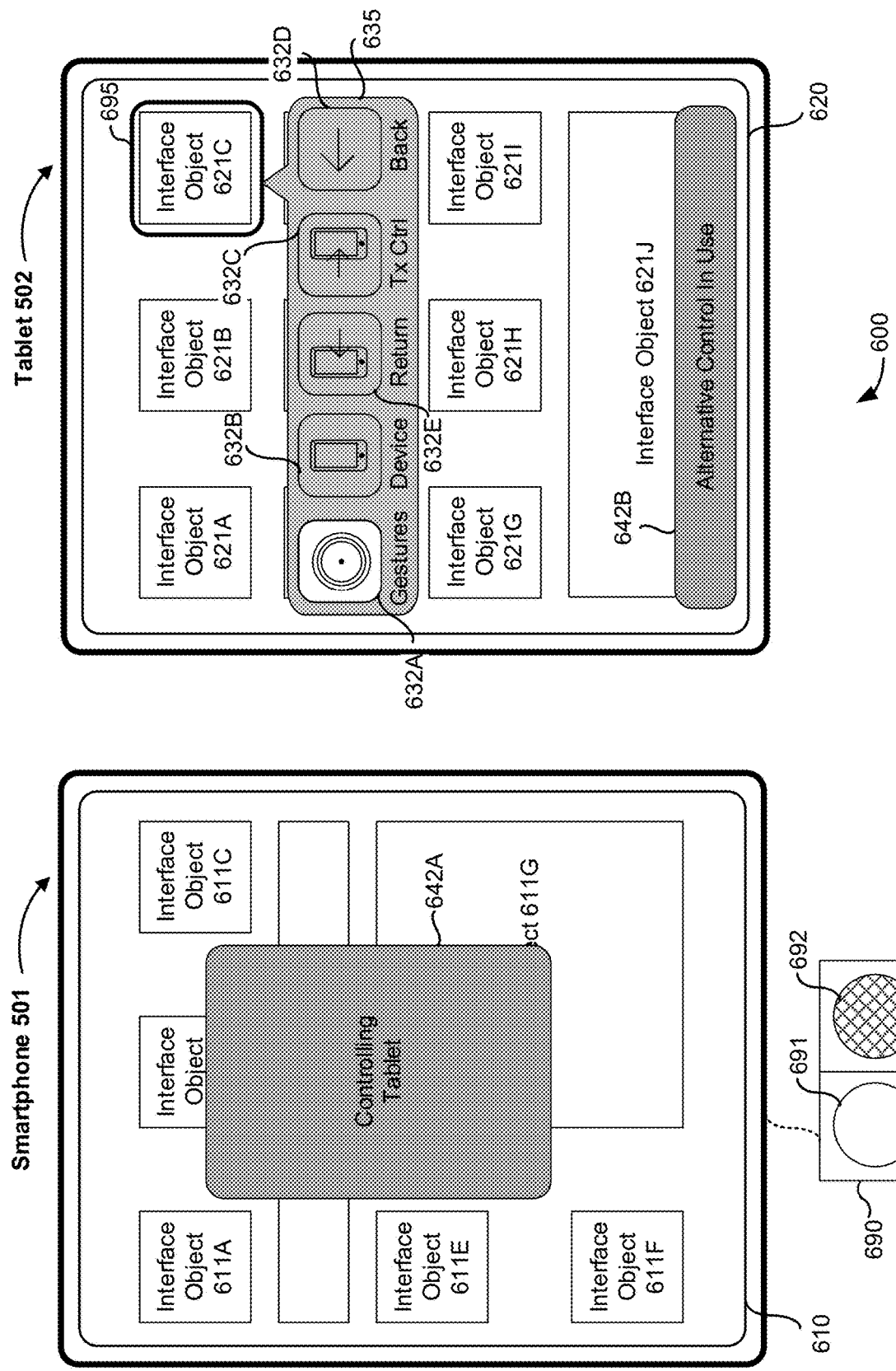

FIG. 6R illustrates the environment 600 of FIG. 6Q in response to detecting the select input. In FIG. 6R, the first interaction menu 631 is replaced with a transferred control second interaction menu 635. The transferred control second interaction menu 635 differs from the second interaction menu 632 (e.g., as shown in FIG. 6F) in that it includes a return affordance 632E for returning control to the smartphone 501. In FIG. 6R, the gestures affordance 632A is highlighted and the other affordances of the transferred control second interaction menu 635 are not highlighted.

FIG. 6R illustrates that the second switch 692 is activated, resulting in a next input detected by the smartphone 501 (and forwarded to the tablet 502).

Figure 6S:
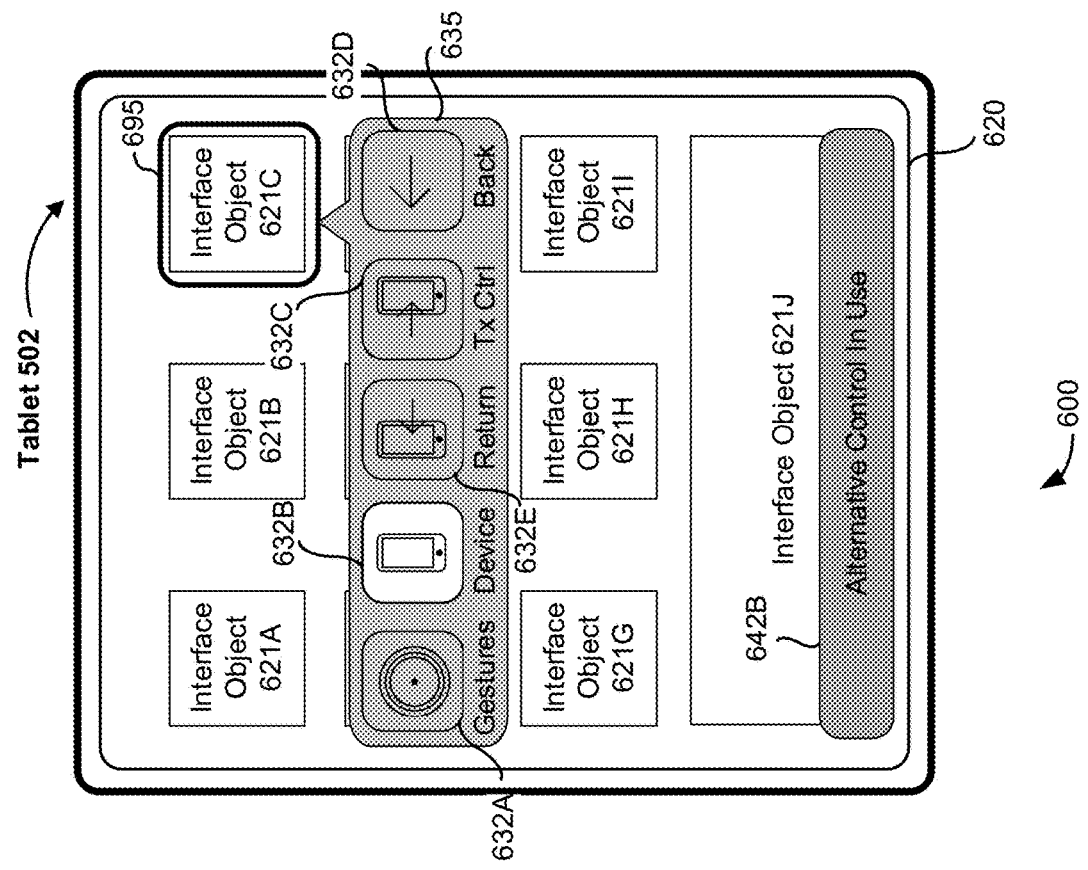
Figure 6S:
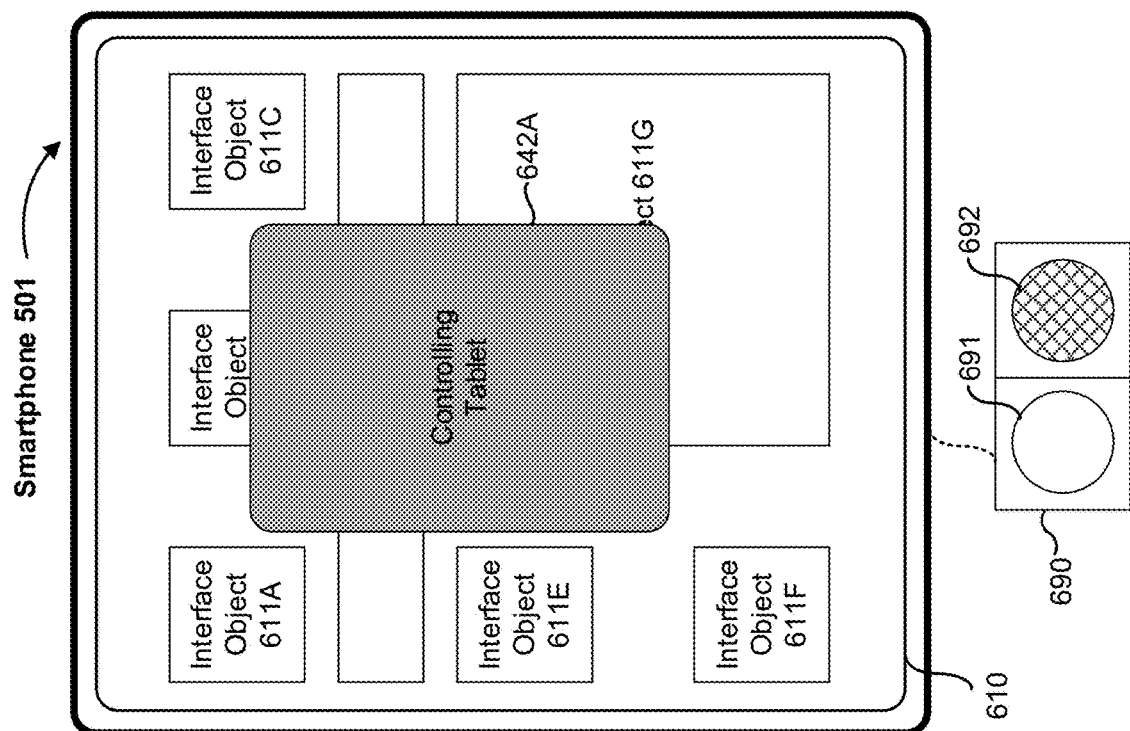

FIG. 6S illustrates the environment 600 of FIG. 6R in response to detecting the next input. In FIG. 6S, the device affordance 632A is highlighted and the other affordances of the transferred control second interaction menu 635 are not highlighted.

FIG. 6S illustrates that the second switch 692 is activated, resulting in a next input detected by the smartphone 501 (and forwarded to the tablet 502).

Figure 6T:
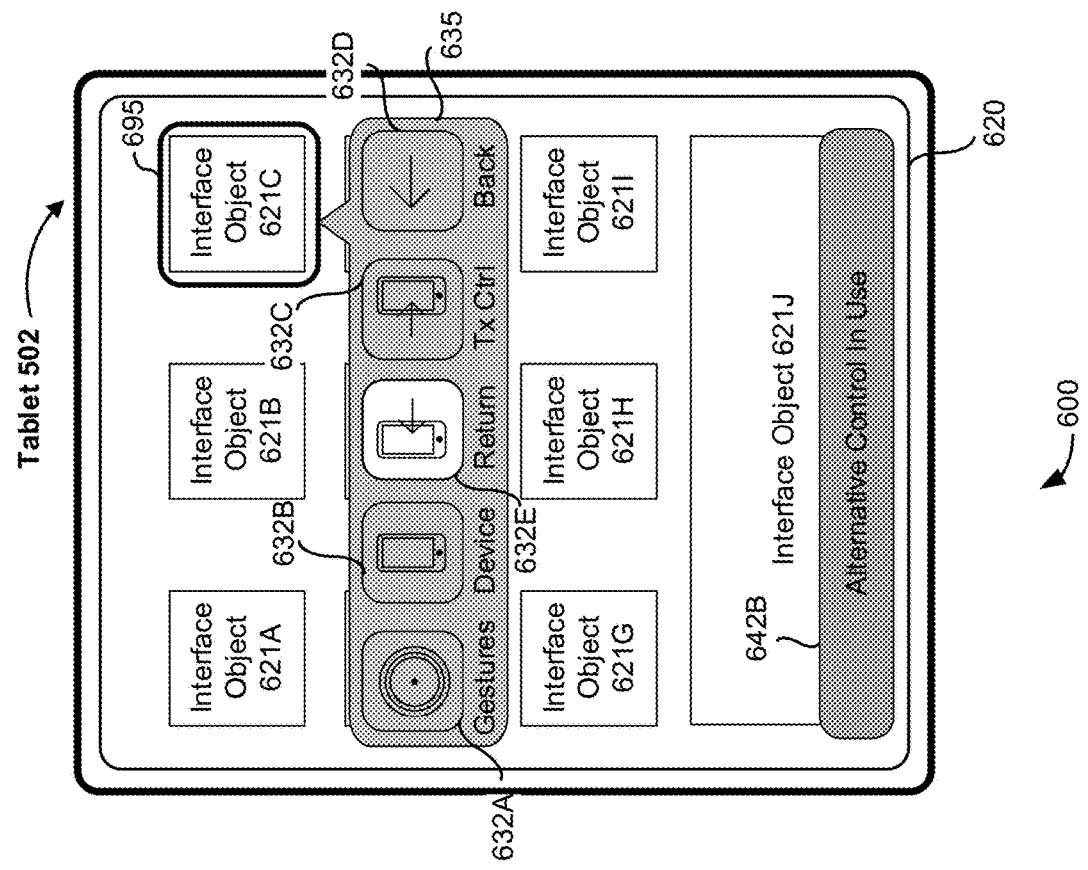
Figure 6T:
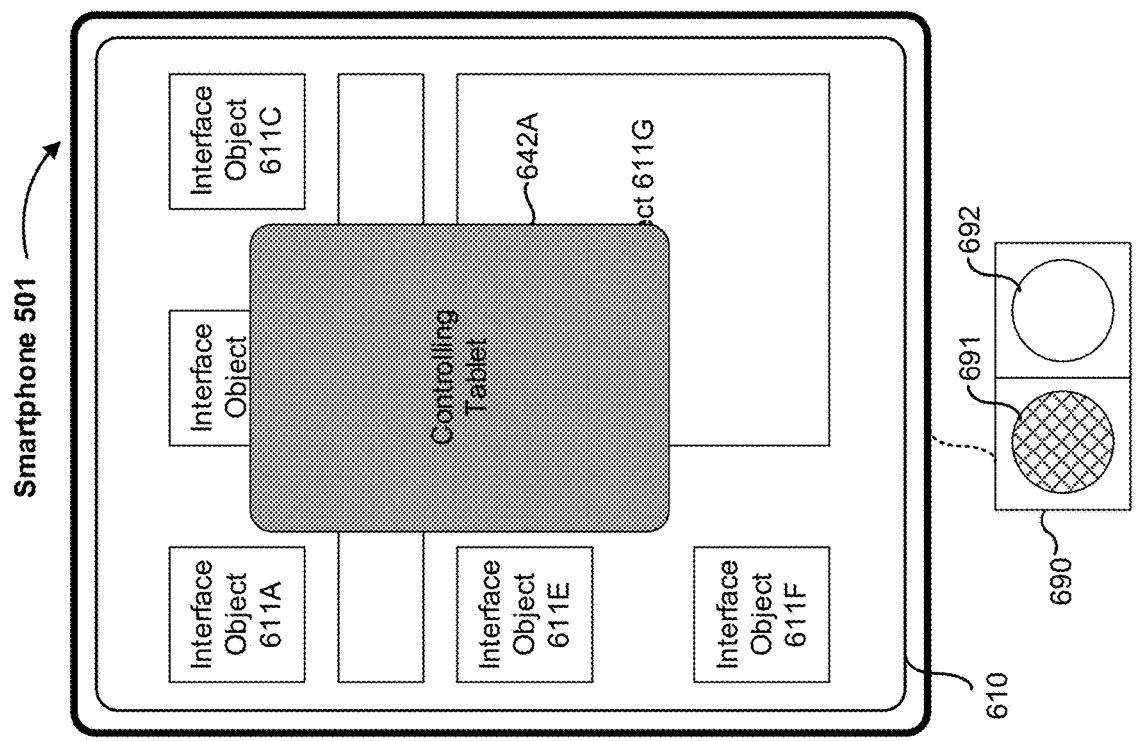

FIG. 6T illustrates the environment 600 of FIG. 6S in response to detecting the next input. In FIG. 6T, the return affordance 632E is highlighted and the other affordances of the transferred control second interaction menu 635 are not highlighted.

FIG. 6T illustrates that the first switch 691 is activated, resulting in a next input detected by the smartphone 501 (and forwarded to the tablet 502).

Figure 6U:
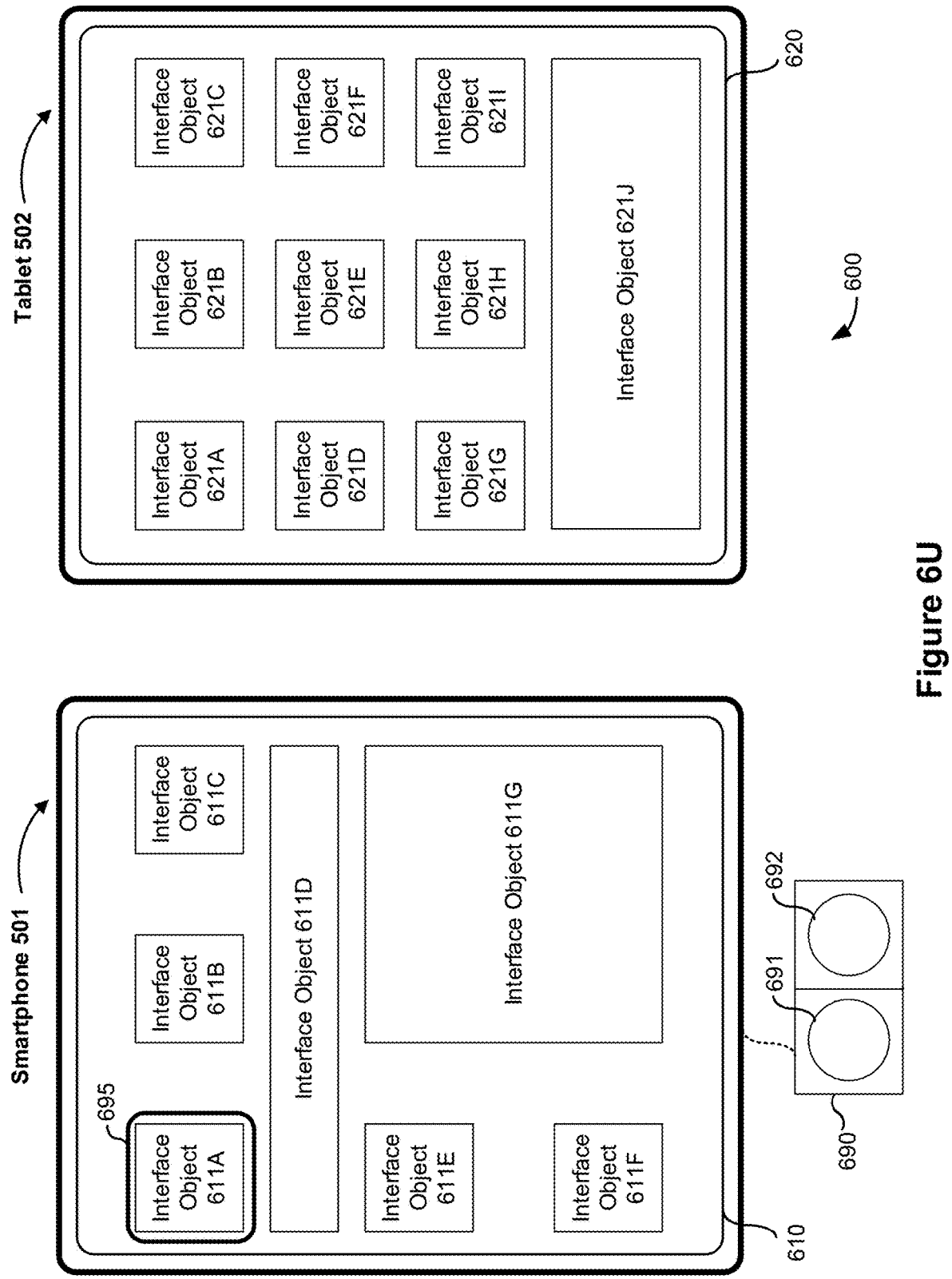

FIG. 6U illustrates the environment of FIG. 6T in response to detecting the select input. In FIG. 6U, control is returned to the smartphone 501 and the environment is in the same state as in FIG. 6A. Thus, switch inputs received from the switch device 690 will affect the first user interface 610 of the smartphone 501 (as shown, for example, in FIGS. 6B-6K).

Figure 6V:
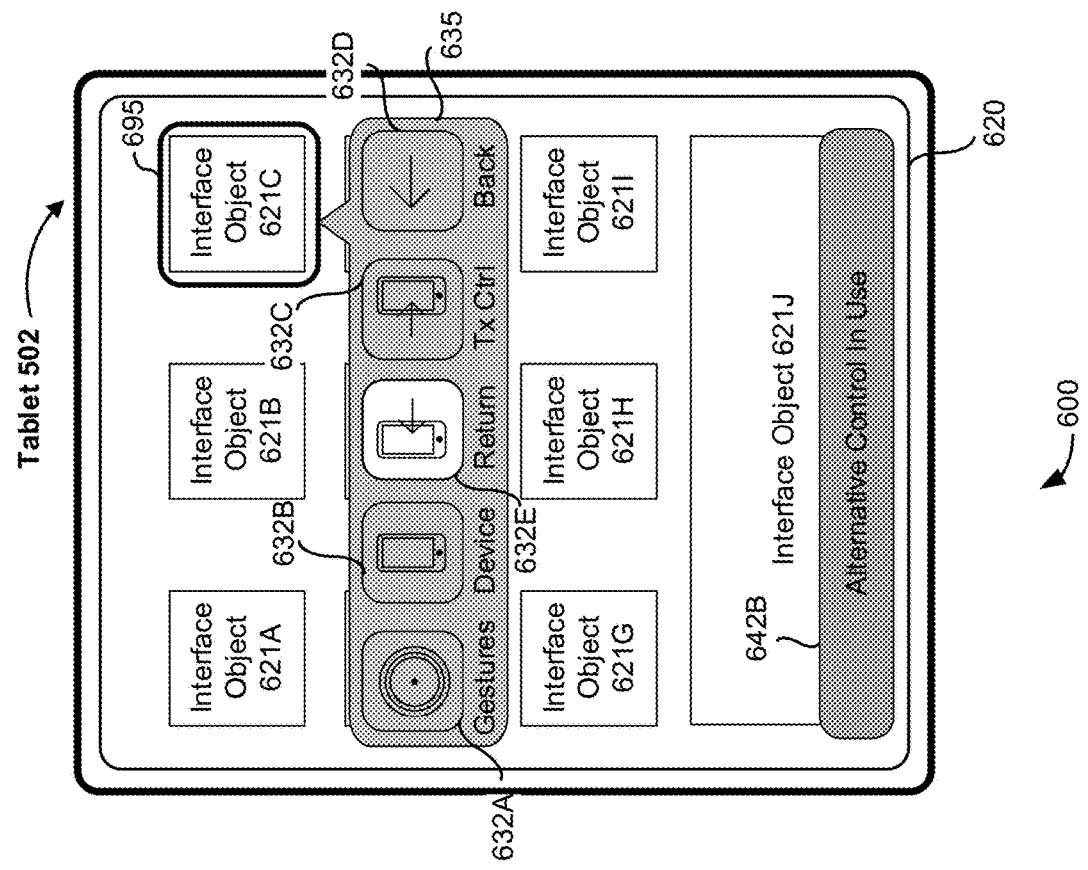
Figure 6V:
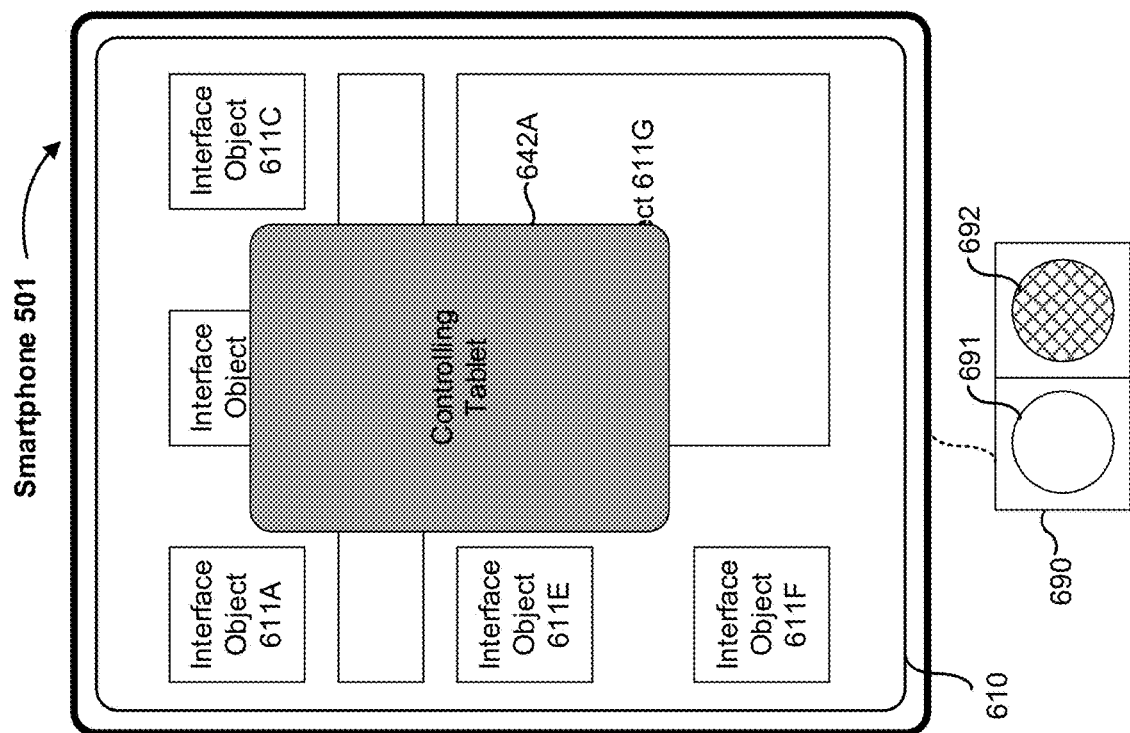

FIG. 6V, like FIG. 6T, illustrates the environment of FIG. 6S in response to detecting the next input. Unlike FIG. 6T, FIG. 6V illustrates that the second switch 692 is activated, resulting in a next input detected by the smartphone 501 (and forwarded to the tablet 502).

Figure 6W:
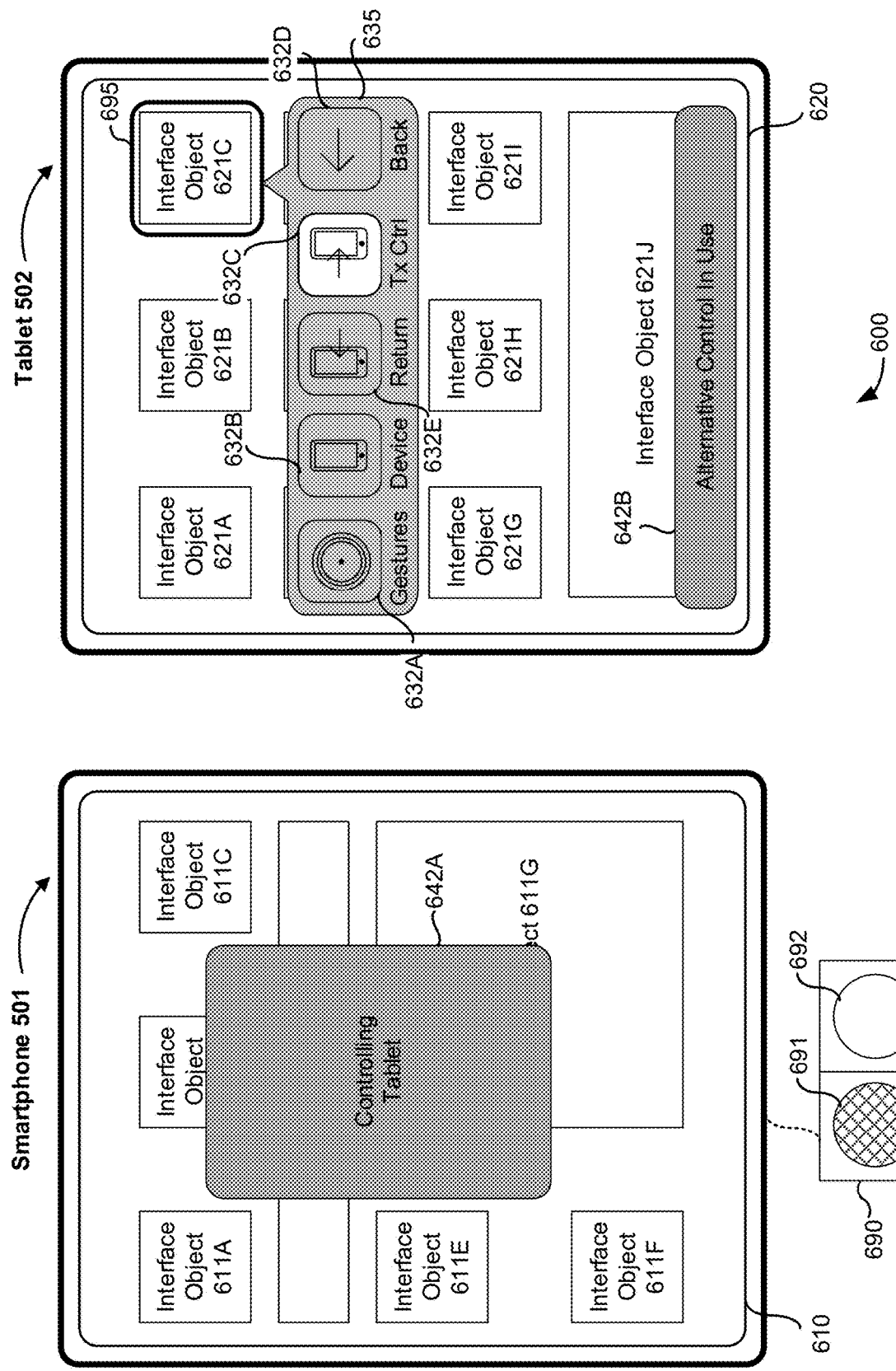

FIG. 6W illustrates the environment 600 of FIG. 6V in response to detecting the next input. In FIG. 6W, the transfer control affordance 632C is highlighted and the other affordances of the transferred control second interaction menu 635 are not highlighted.

FIG. 6W illustrates that the first switch 691 is activated, resulting in a select input detected by the smartphone 501 (and forwarded to the tablet 502).

Figure 6X:
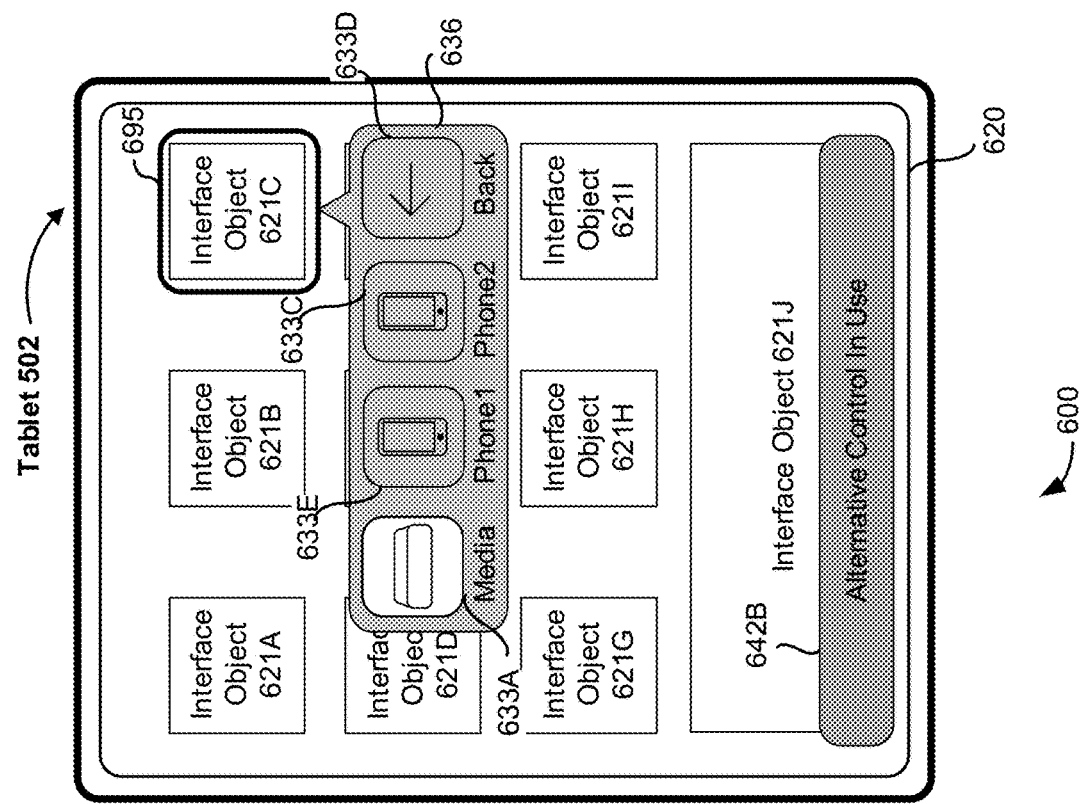
Figure 6X:
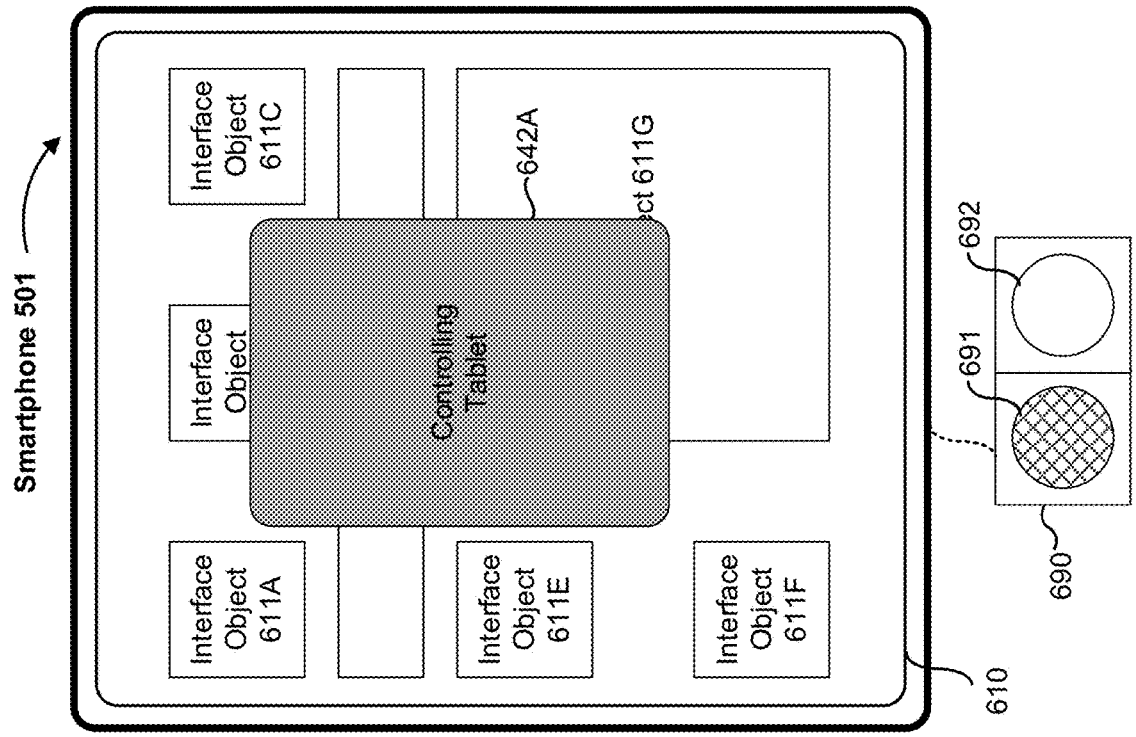

FIG. 6X illustrates the environment 600 of FIG. 6W in response to detecting the select input. In FIG. 6X, the transferred control second interaction menu 635 is replaced with a transferred control device select menu 636 including a plurality of device select affordances. The transferred control device select menu 636 differs from the device select menu 633 (e.g., as shown in FIG. 6I) in that it includes a smartphone select affordance 633E for selecting the smartphone 501 and does not include a tablet affordance 633B for selecting the tablet 502. In FIG. 6X, the media player select affordance 633A is highlighted and the other affordances of the transferred control device select menu 636 are not highlighted.

FIG. 6X illustrates that the first switch 691 is activated, resulting in a select input detected by the smartphone 501 (and forwarded to the tablet 502).

Figure 6Y:
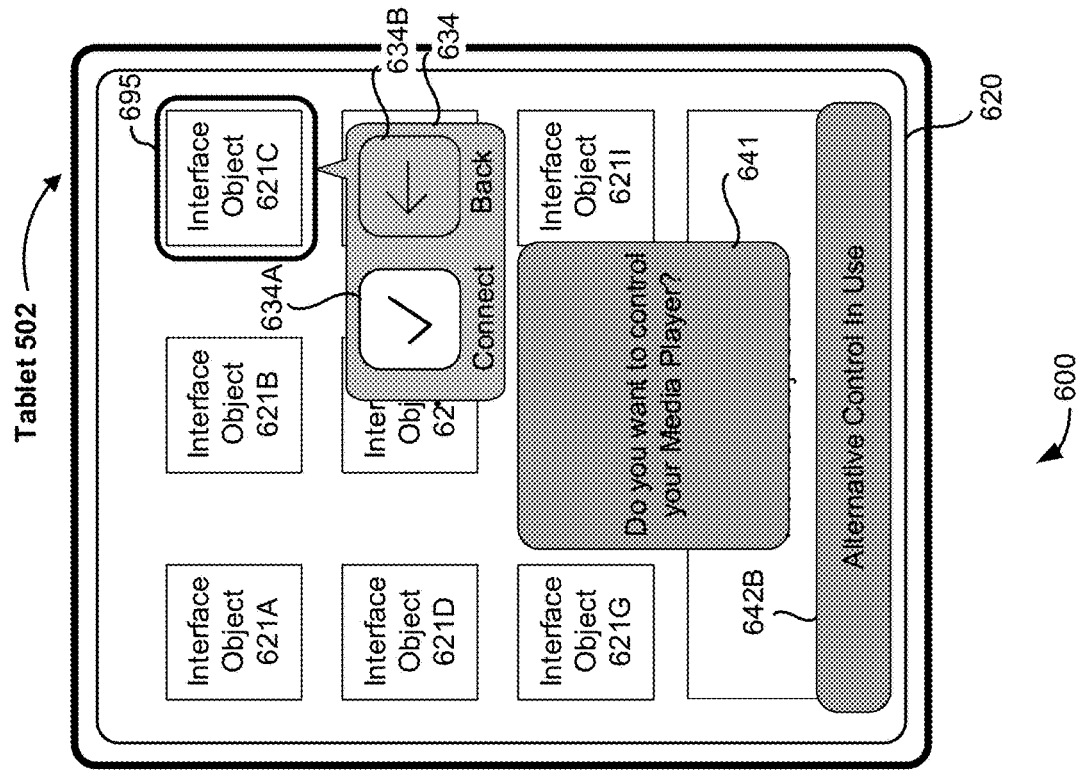
Figure 6Y:
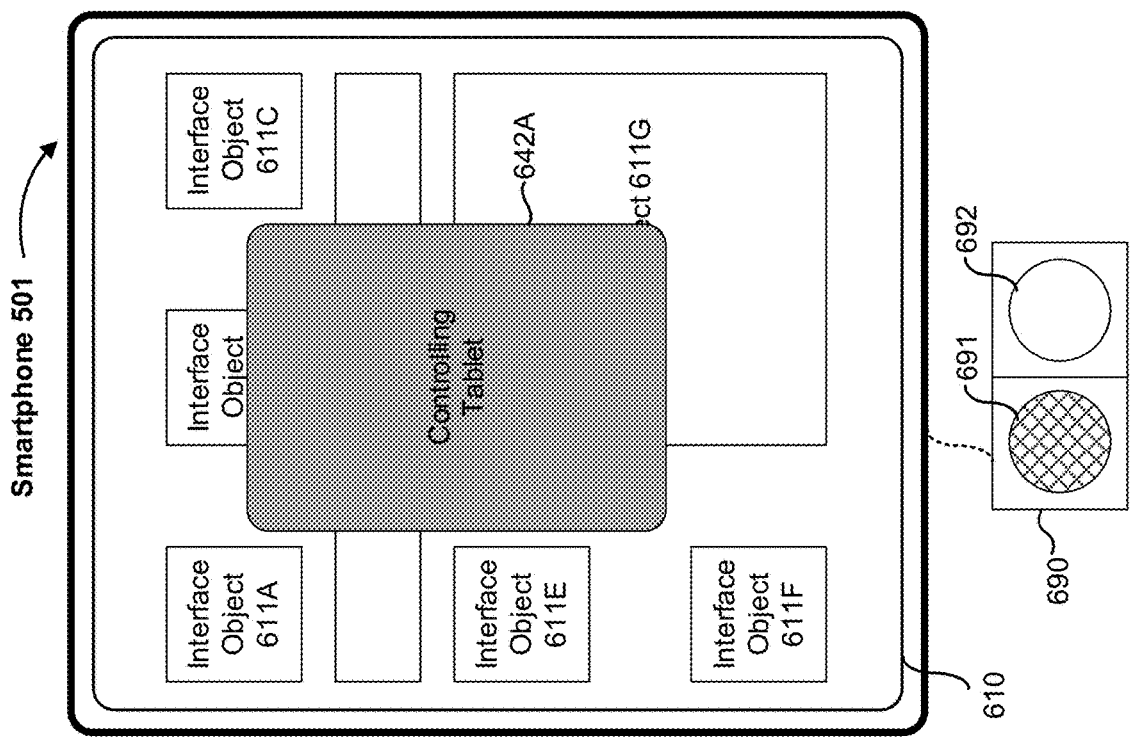

FIG. 6Y illustrates the environment 600 of FIG. 6X in response to detecting the select input. In FIG. 6Y, the transferred control device select menu 636 is replaced with the transfer control confirmation menu 634. As described above with respect to FIG. 6K, the transfer control confirmation menu 634 include a confirmation affordance 634A (highlighted in FIG. 6Y) for transferring control to the selected device and a back affordance 634B (not highlighted in FIG. 6Y) for exiting the transfer control confirmation menu 634.

The second user interface 620 includes the first transfer confirmation notification 641A indicating that selection of the confirmation affordance 634A will transfer control to the selected device (e.g., the media player 503). The user interface of the media player can also include the second transfer confirmation notification 641B indicating that selection of the confirmation affordance 634A will transfer control to the device upon which the second transfer confirmation notification 641B is displayed (e.g., the media player 503).

FIG. 6Y illustrates that the first switch 691 is activated, resulting in a select input detected by the smartphone 501 (and forwarded to the tablet 502).

Figure 6Z:
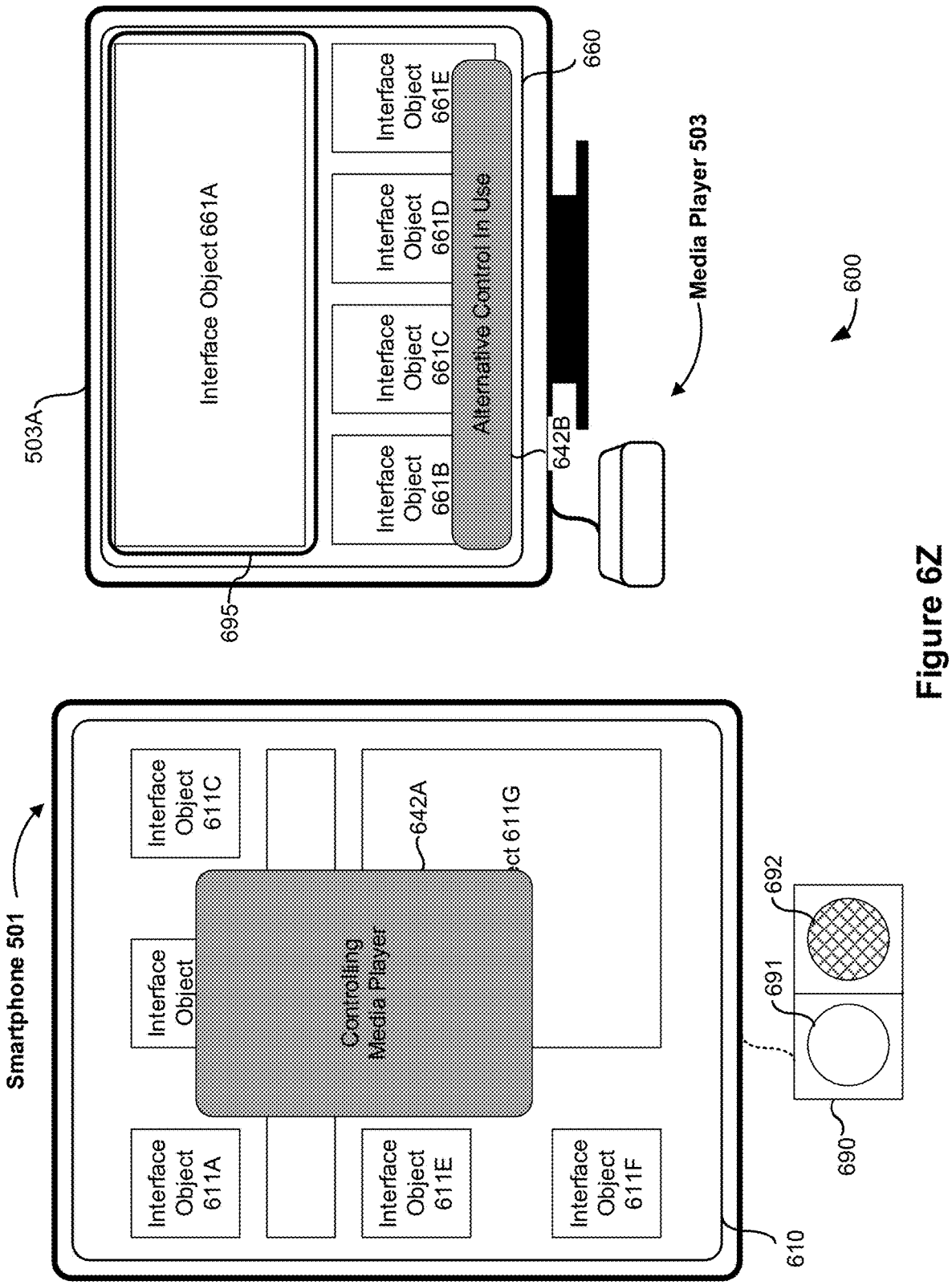
Figure 6A:
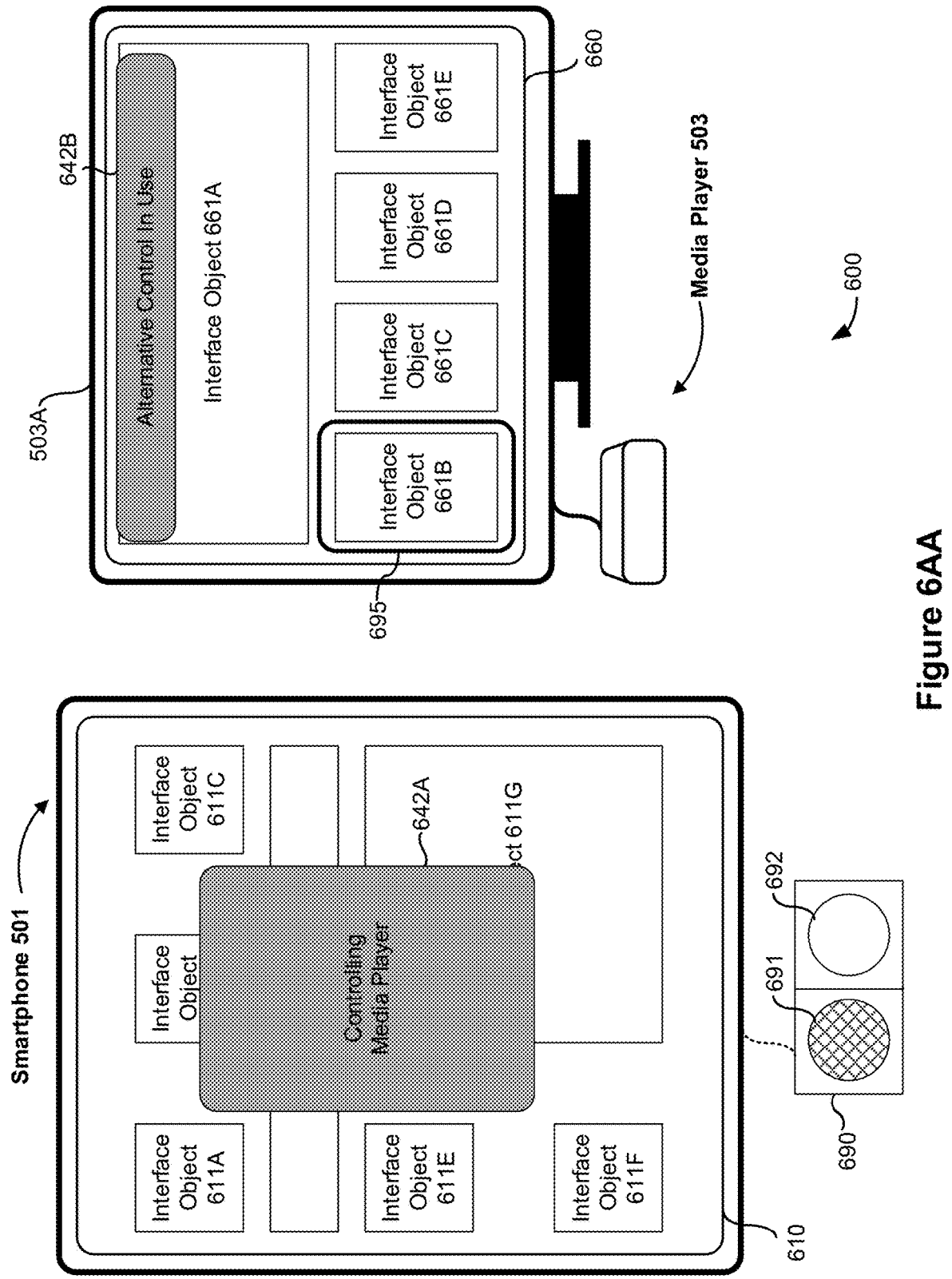
Figure 6A:
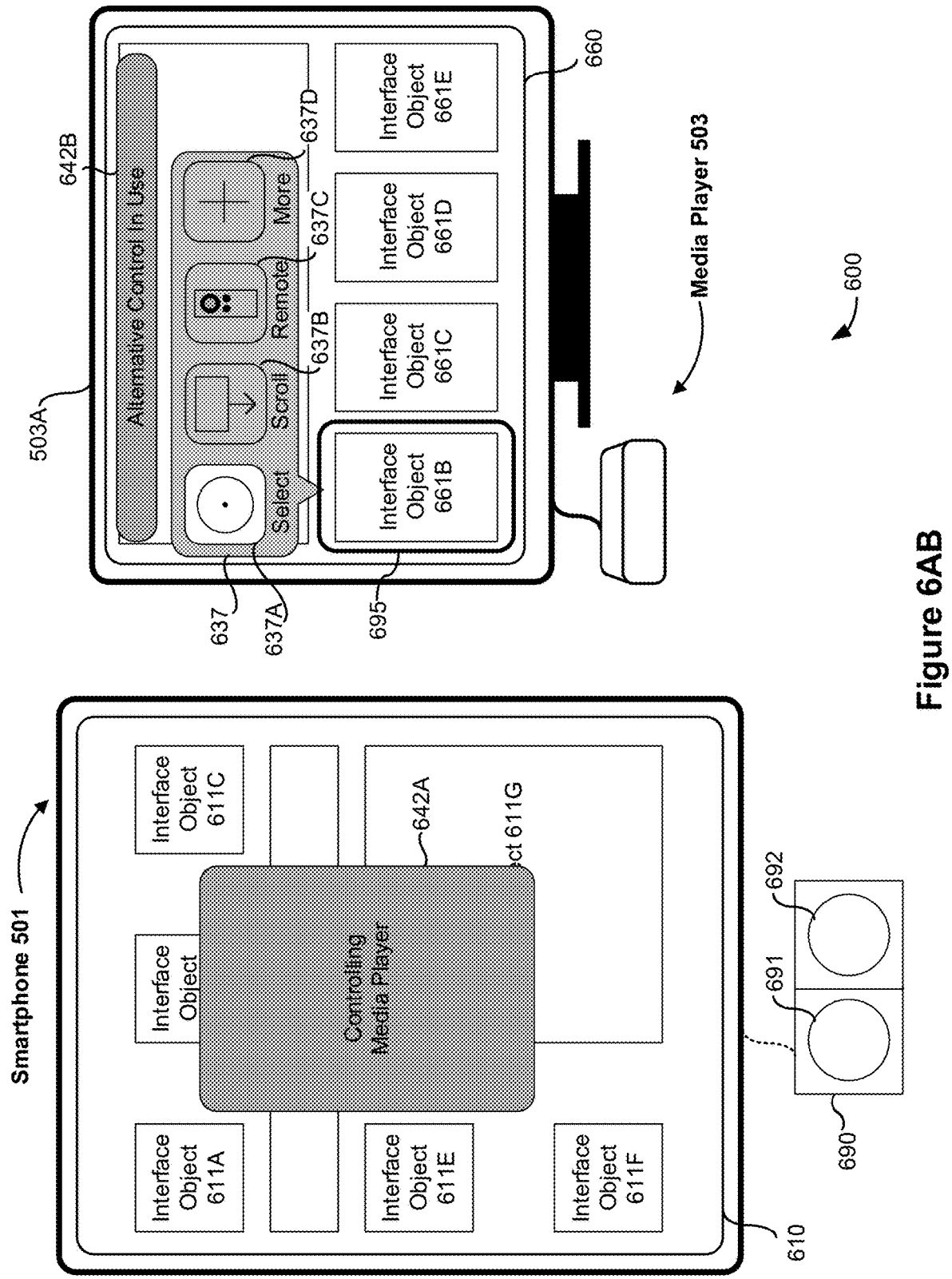
Figure 6A:
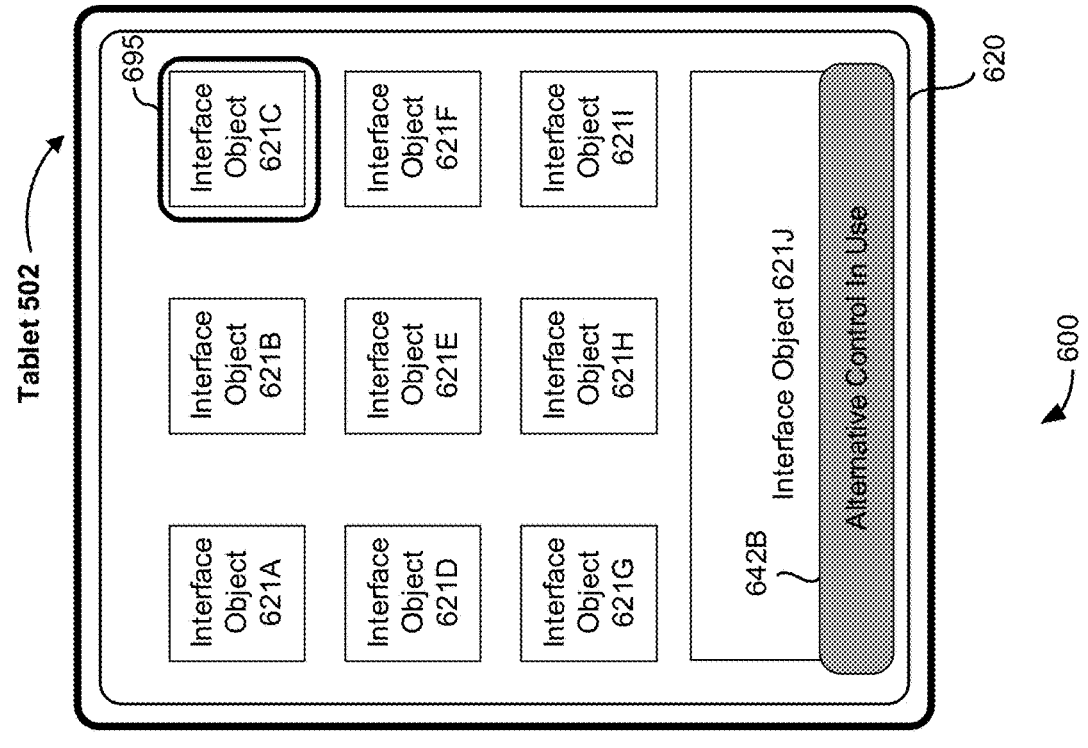
Figure 6A:
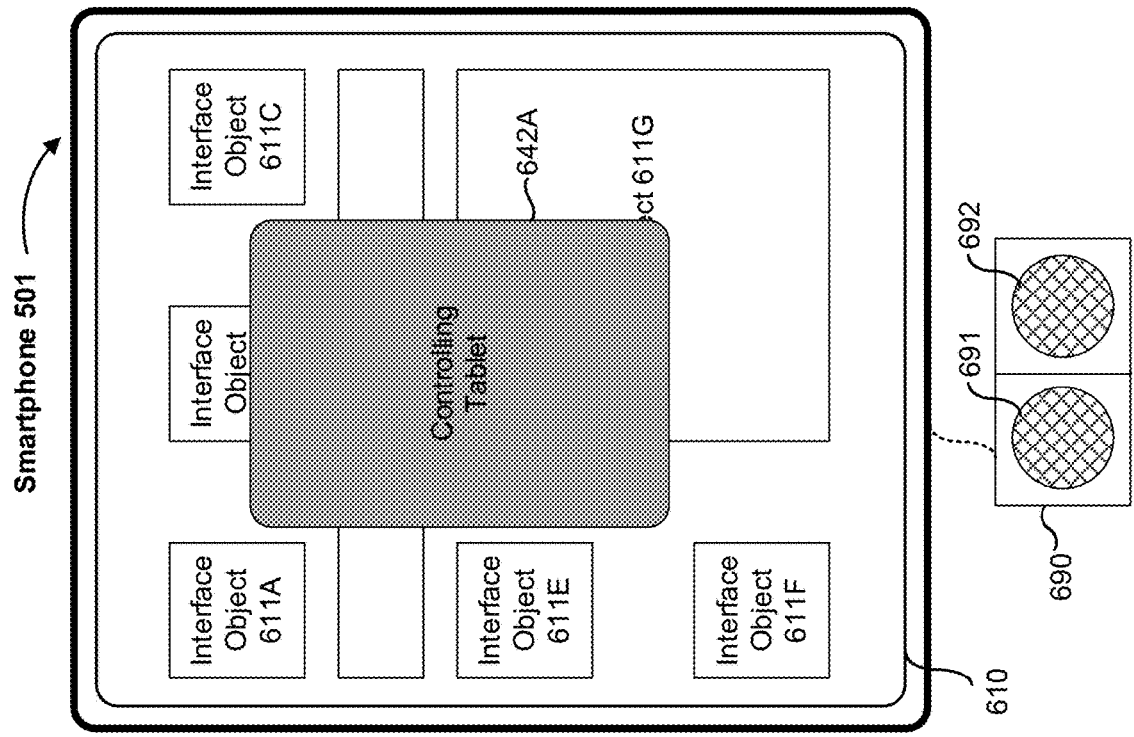
Figure 6A:
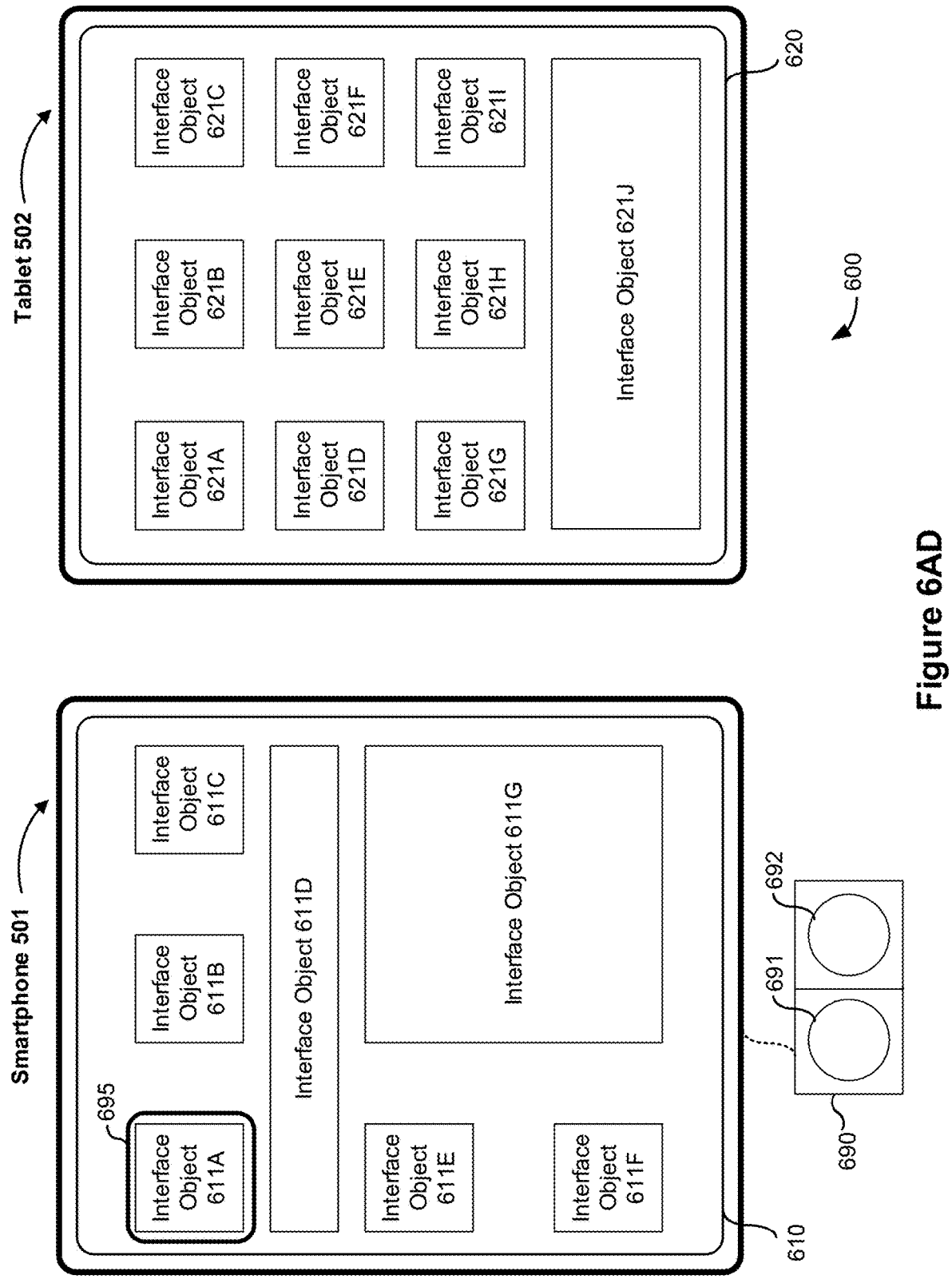
Figure 6A:
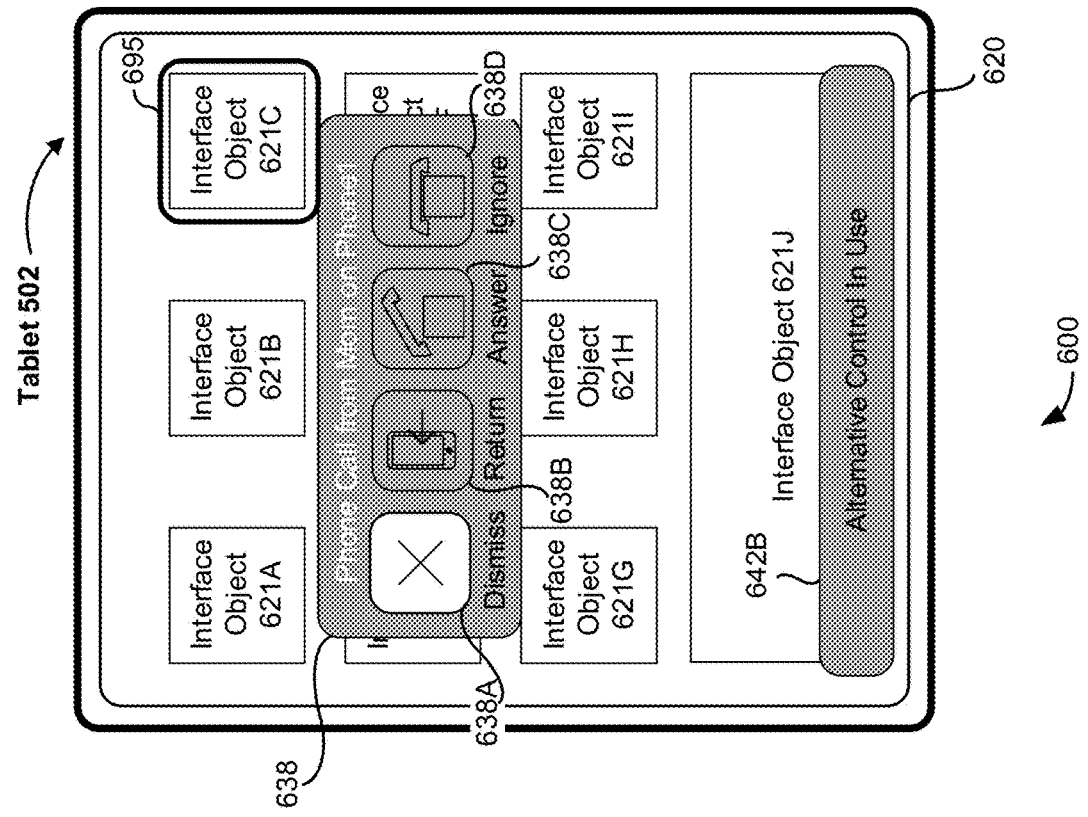
Figure 6A:
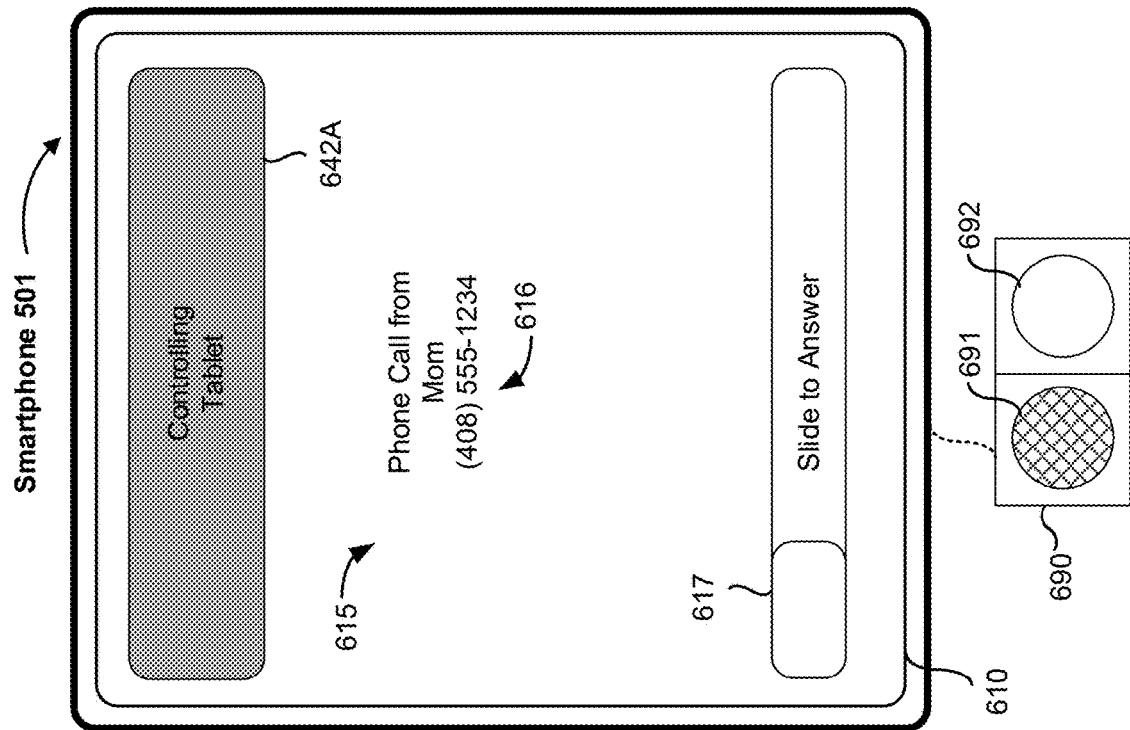
Figure 6A:
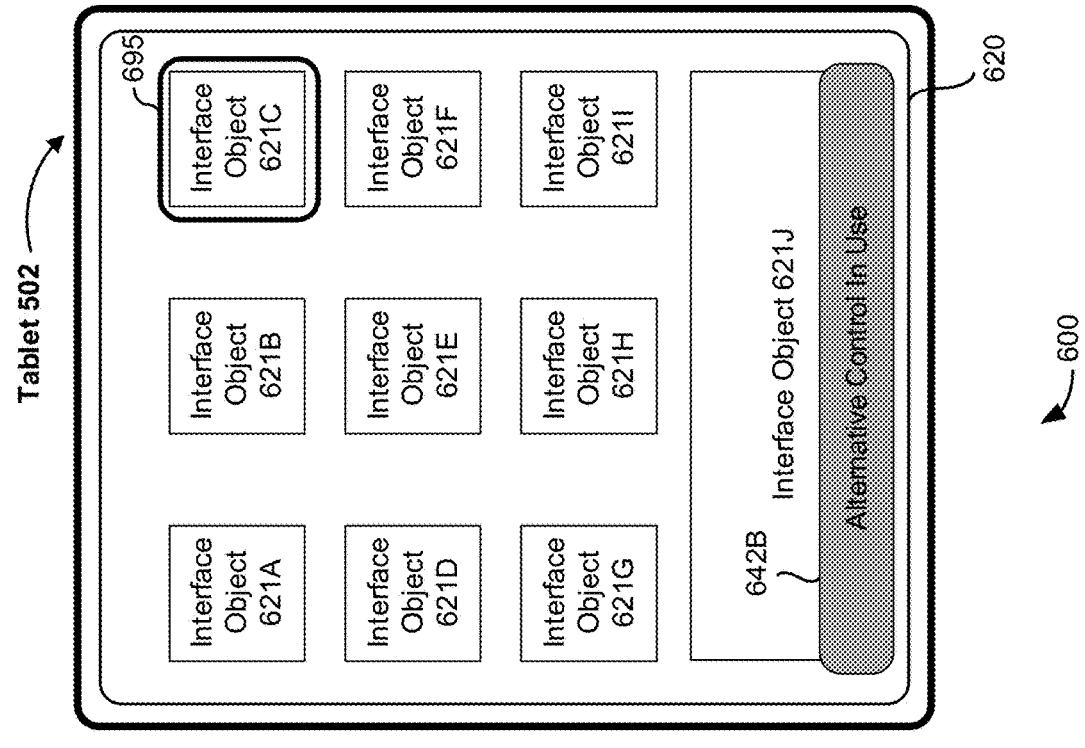
Figure 6A:
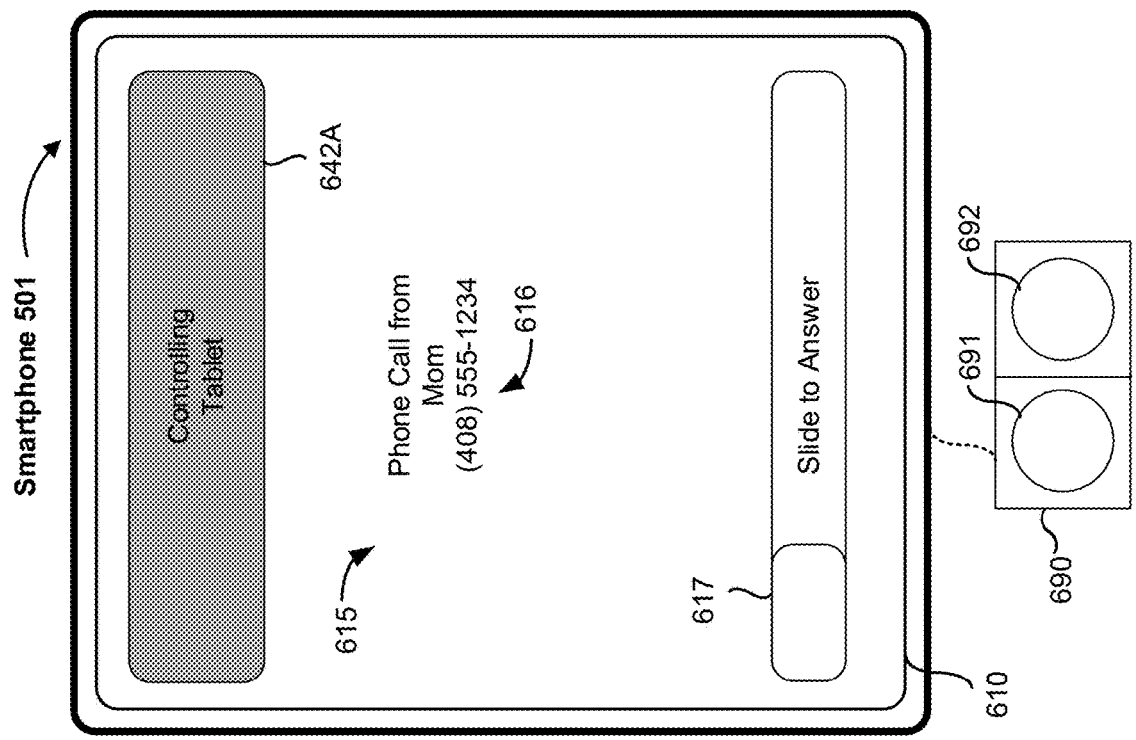
Figure 6A:
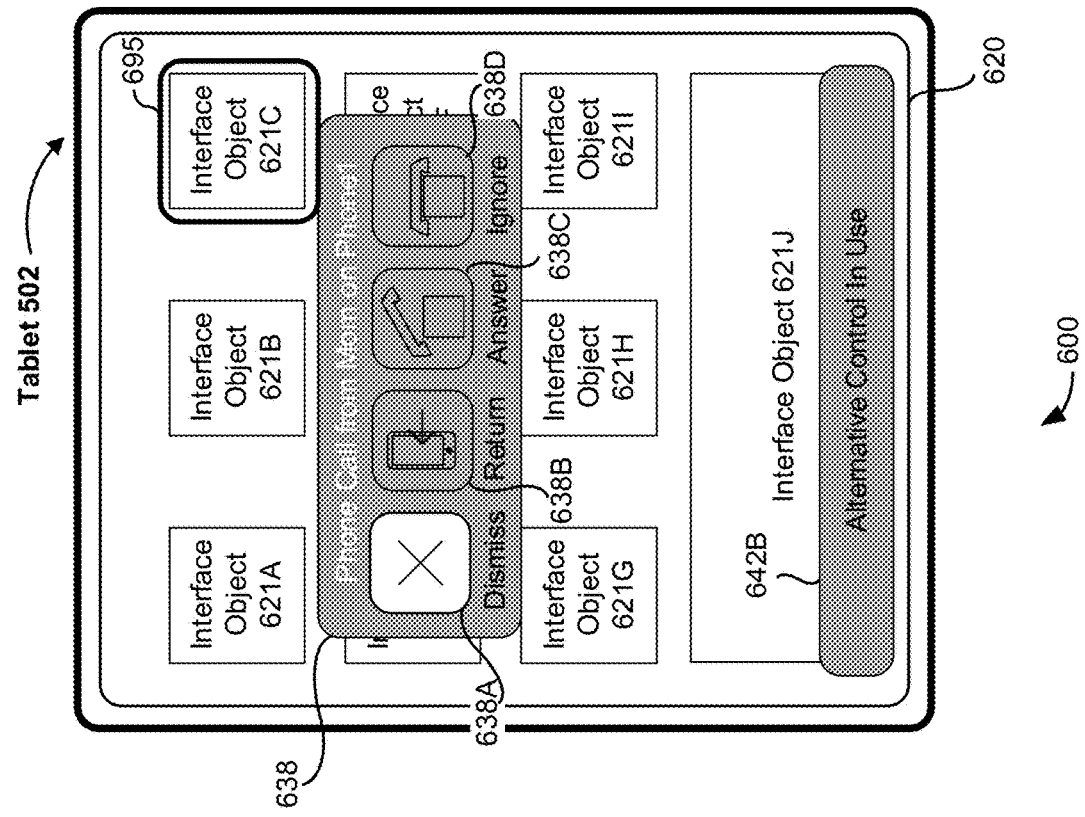
Figure 6A:
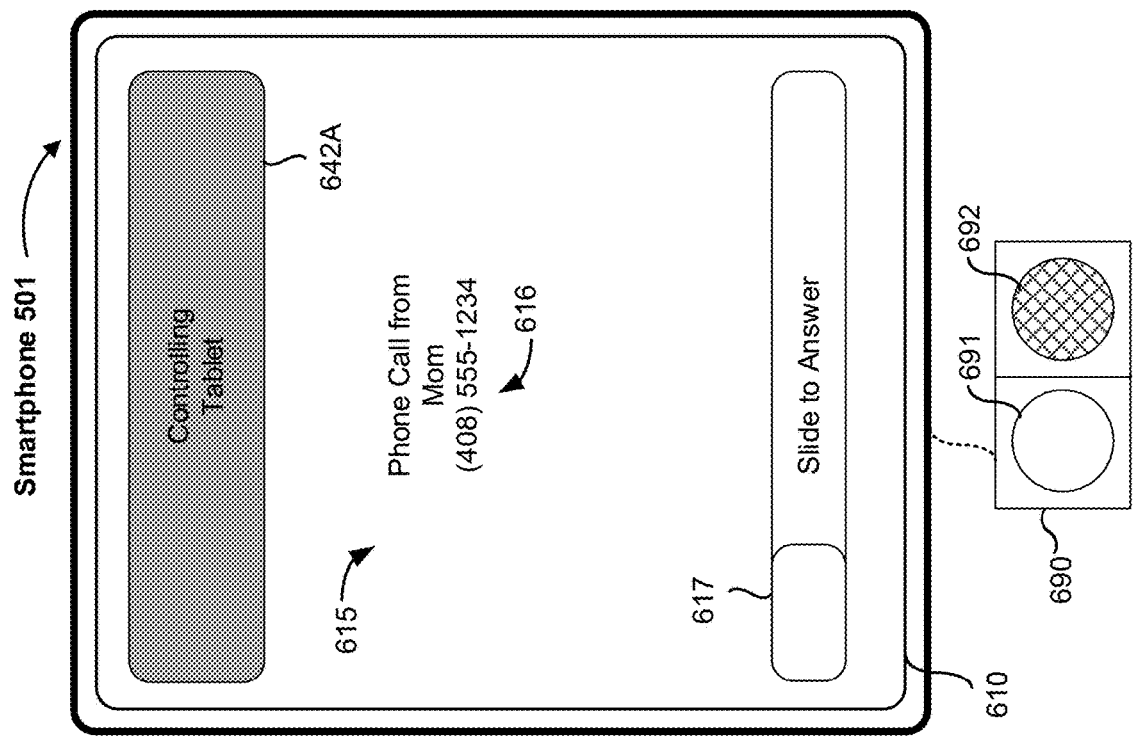
Figure 6A:
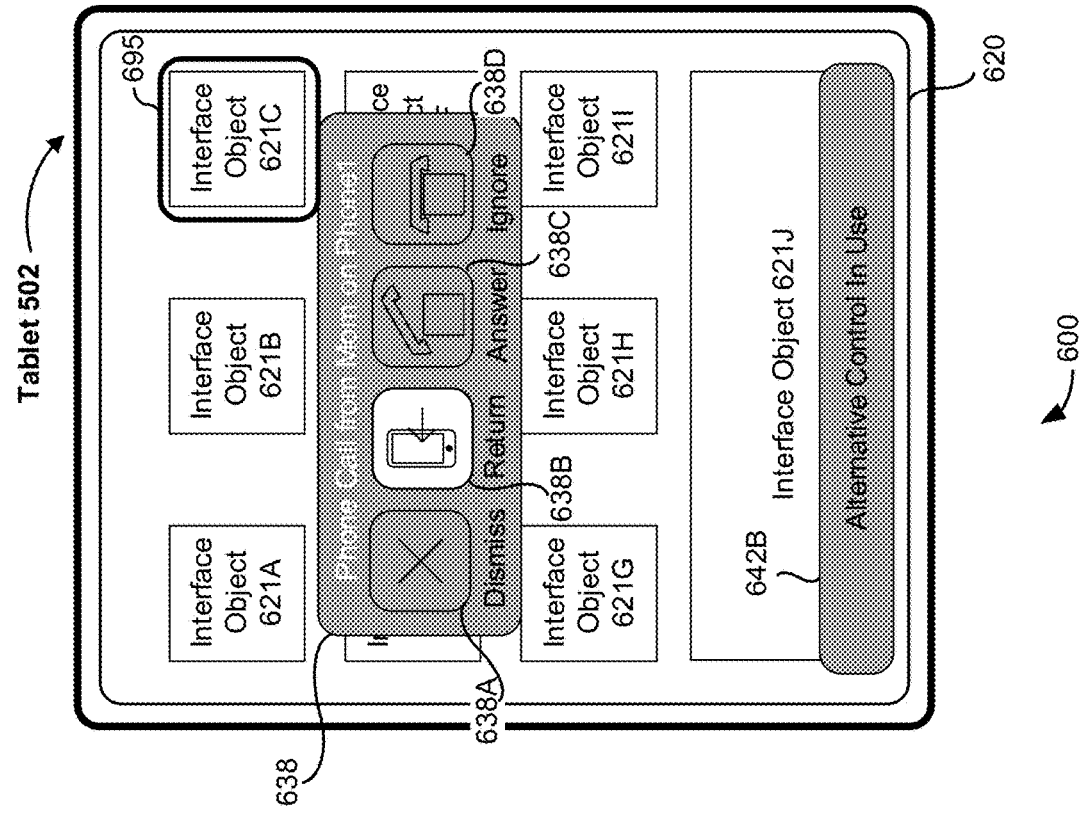
Figure 6A:
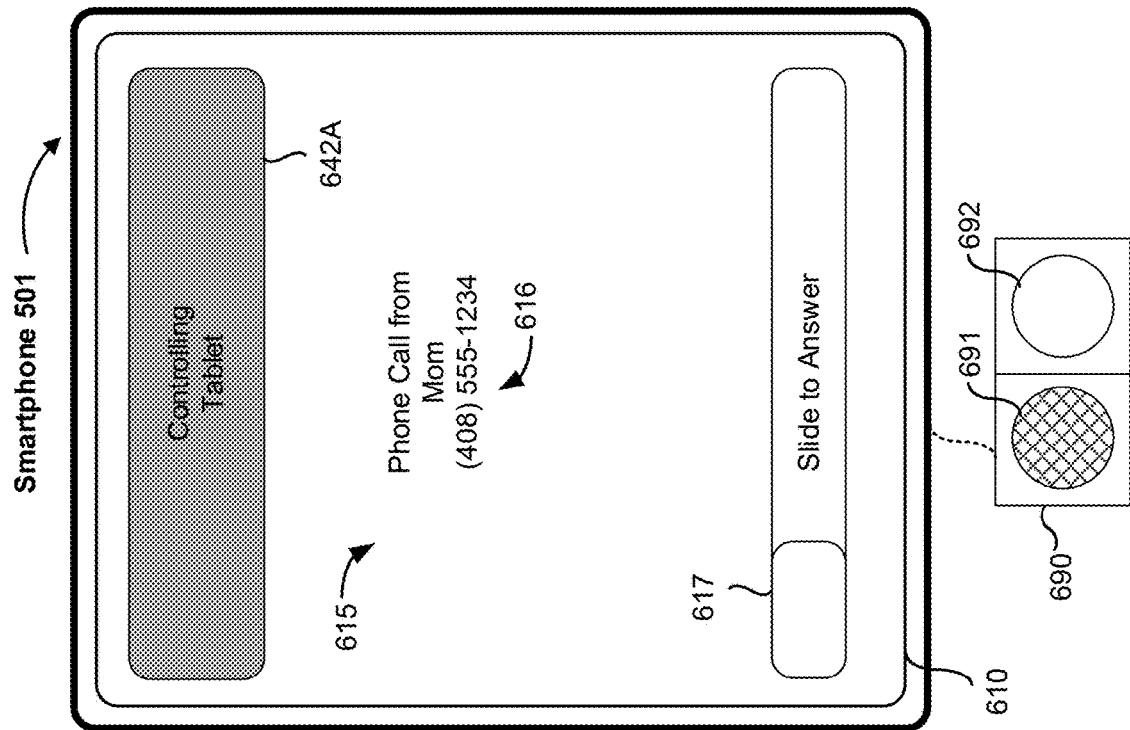
Figure 6A:
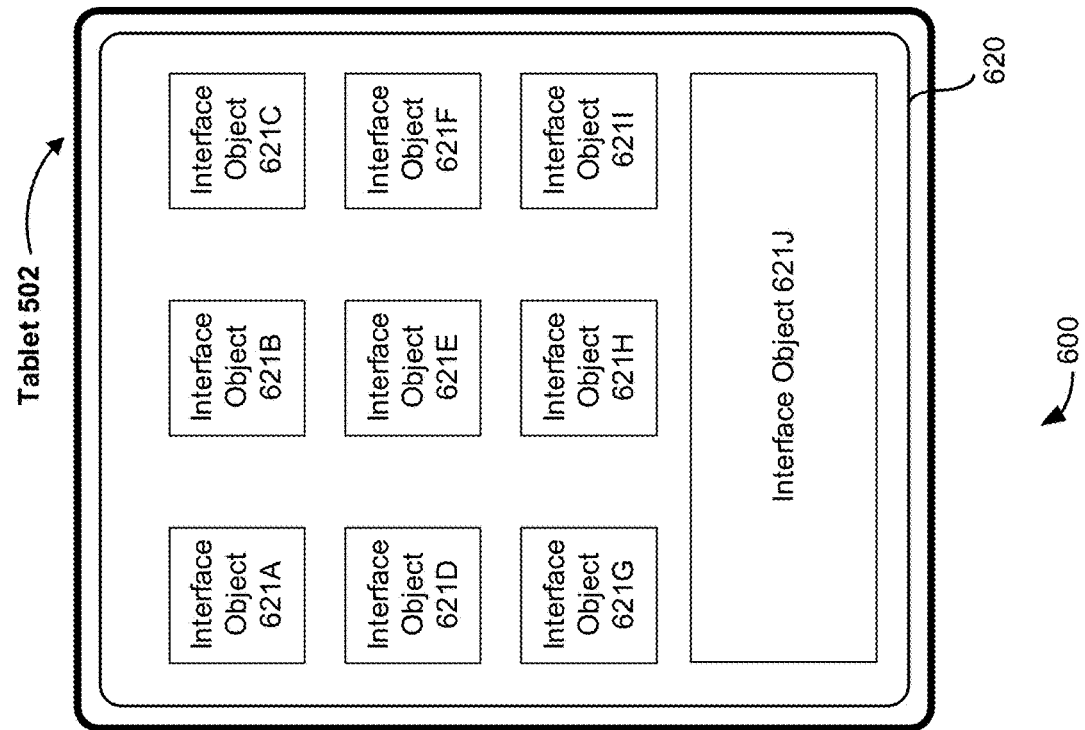
Figure 6A:
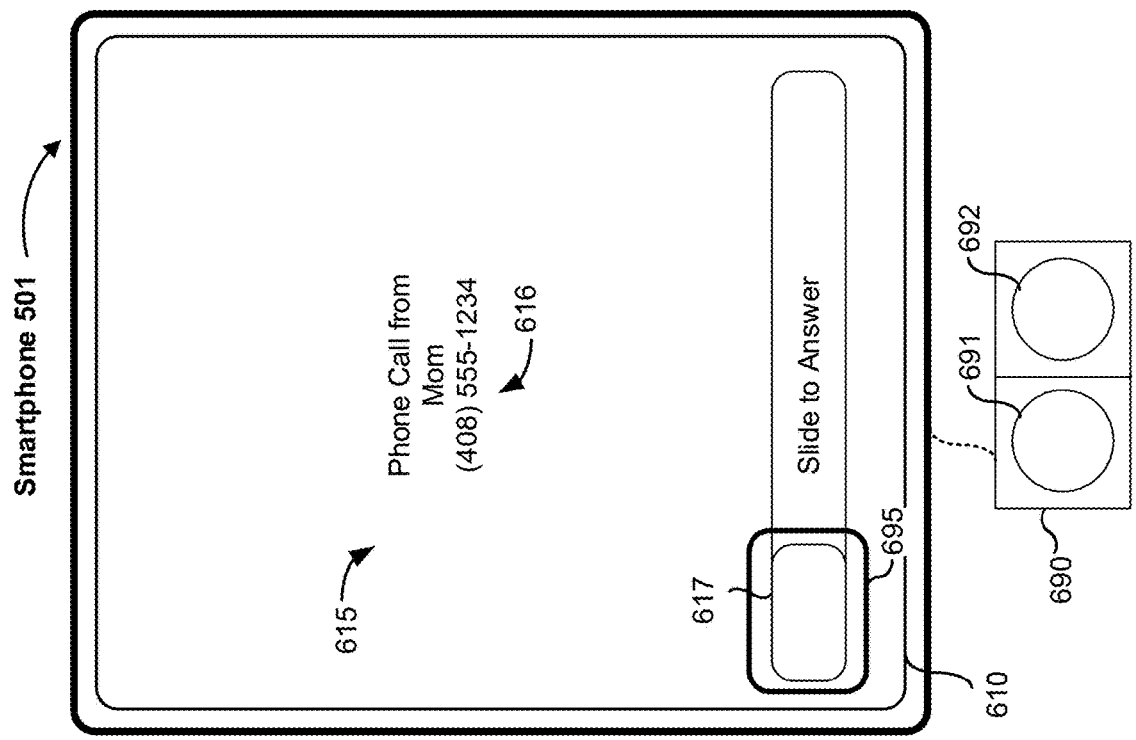
Figure 6A:
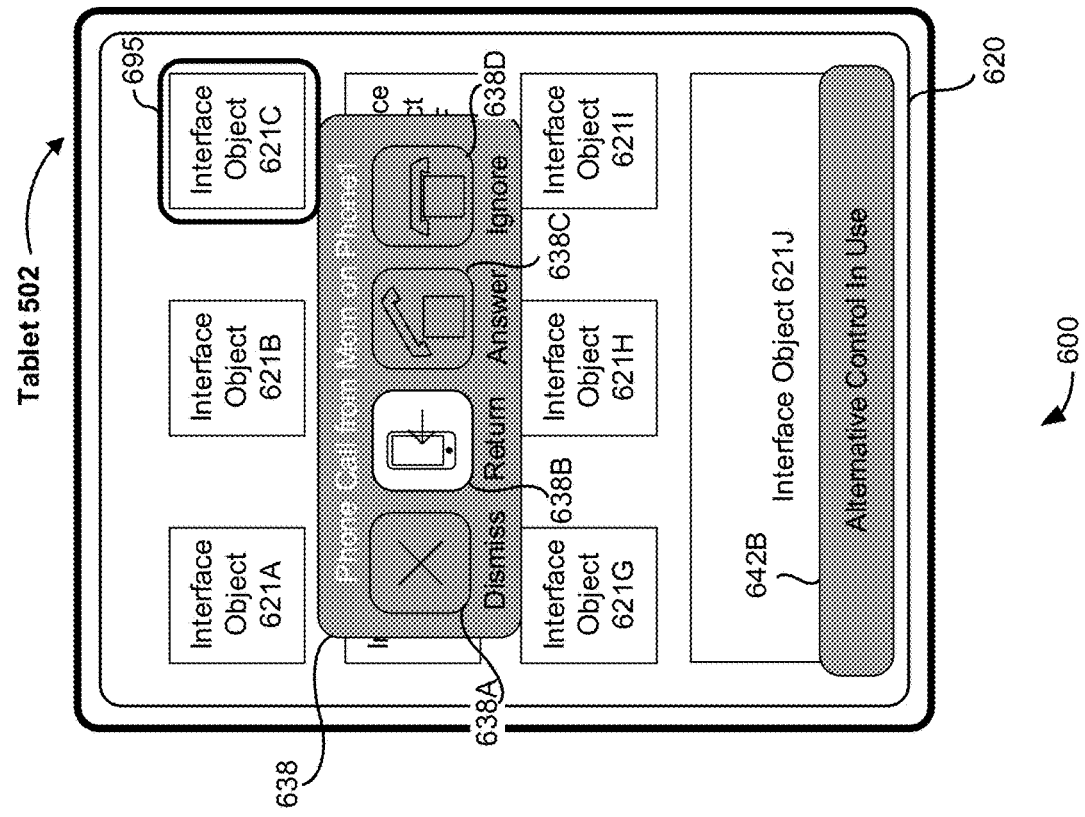
Figure 6A:
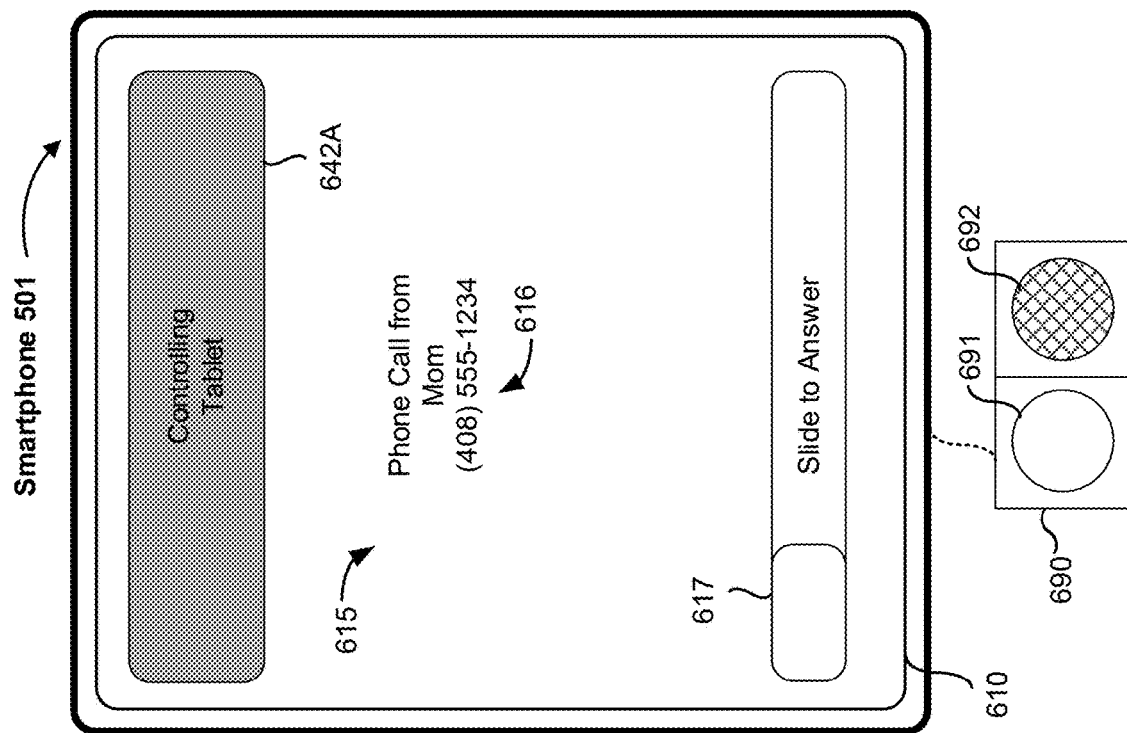
Figure 6A:
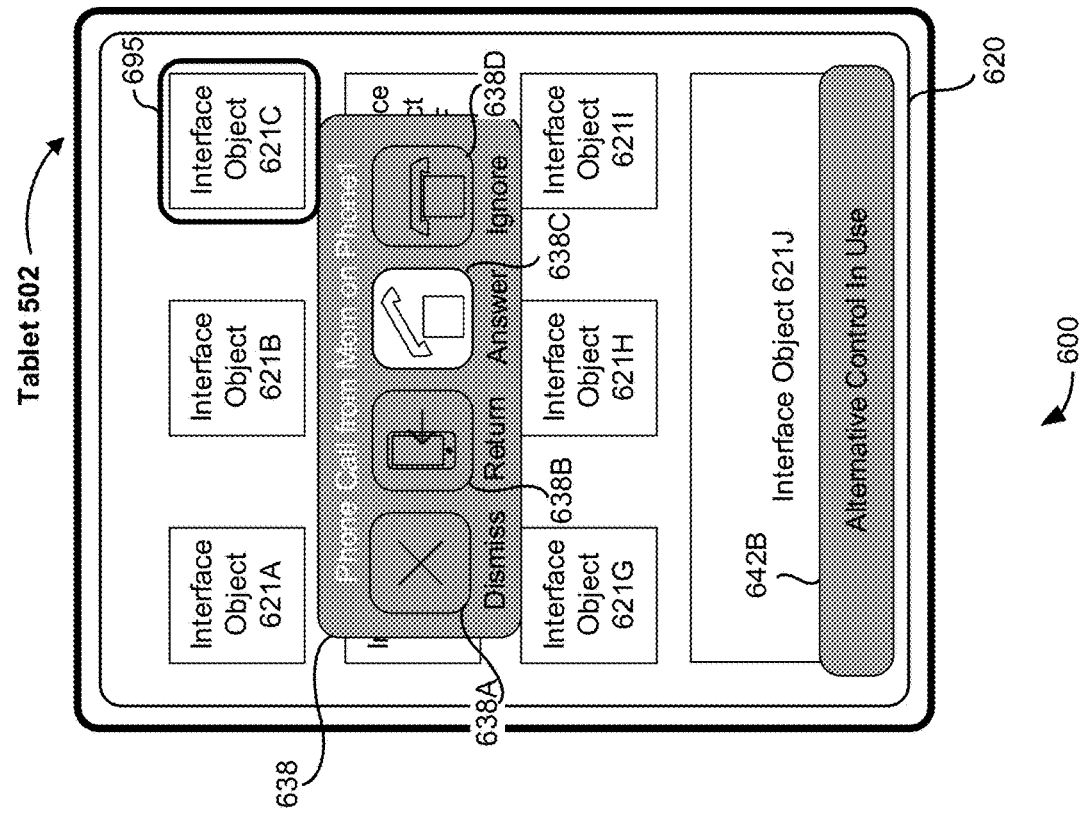
Figure 6A:
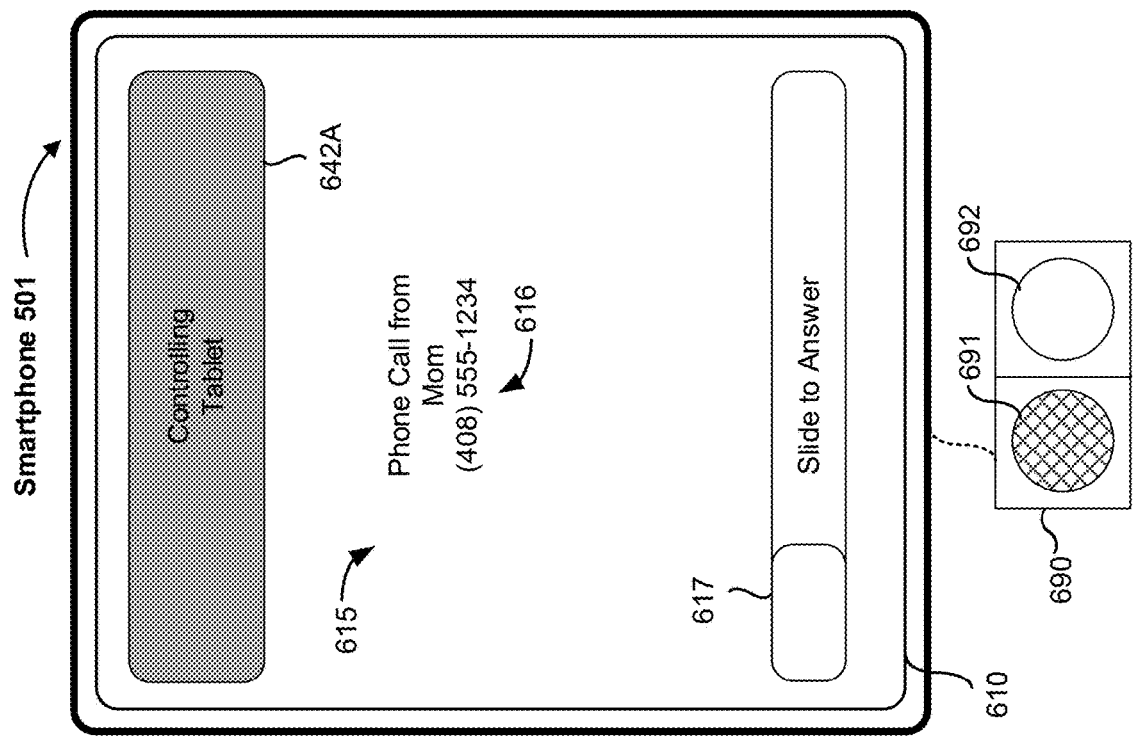
Figure 6A:
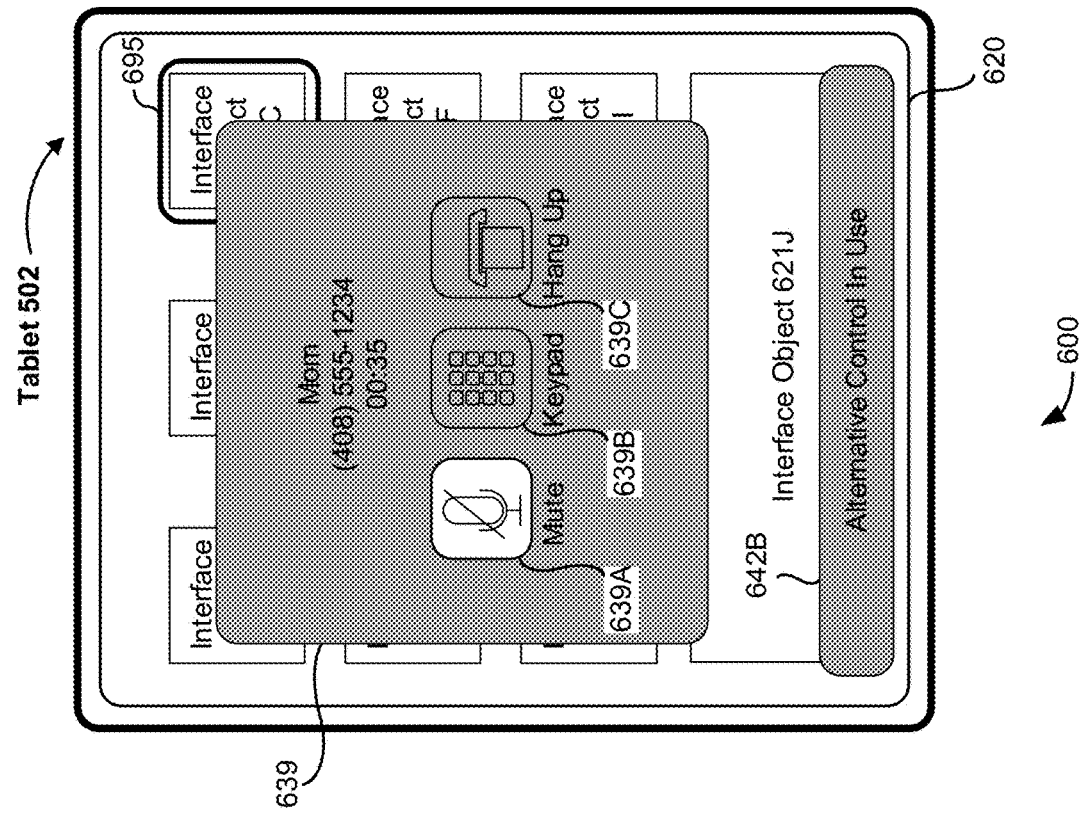
Figure 6A:
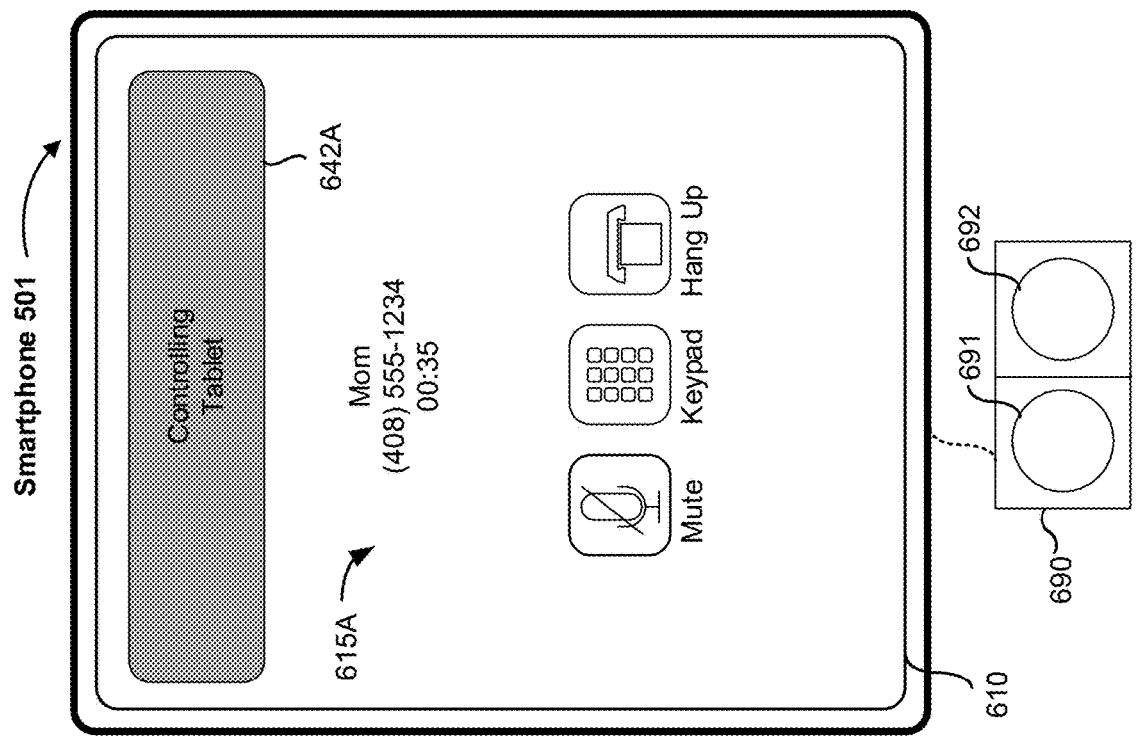
Figure 6A:
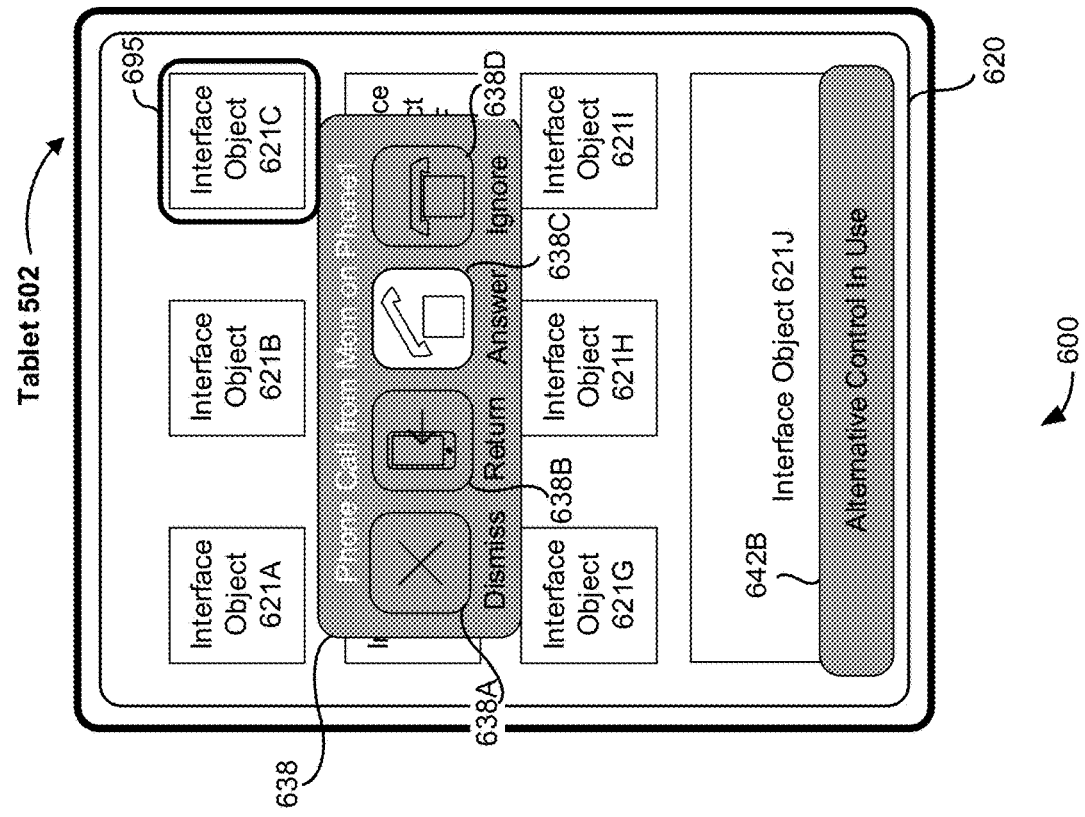
Figure 6A:
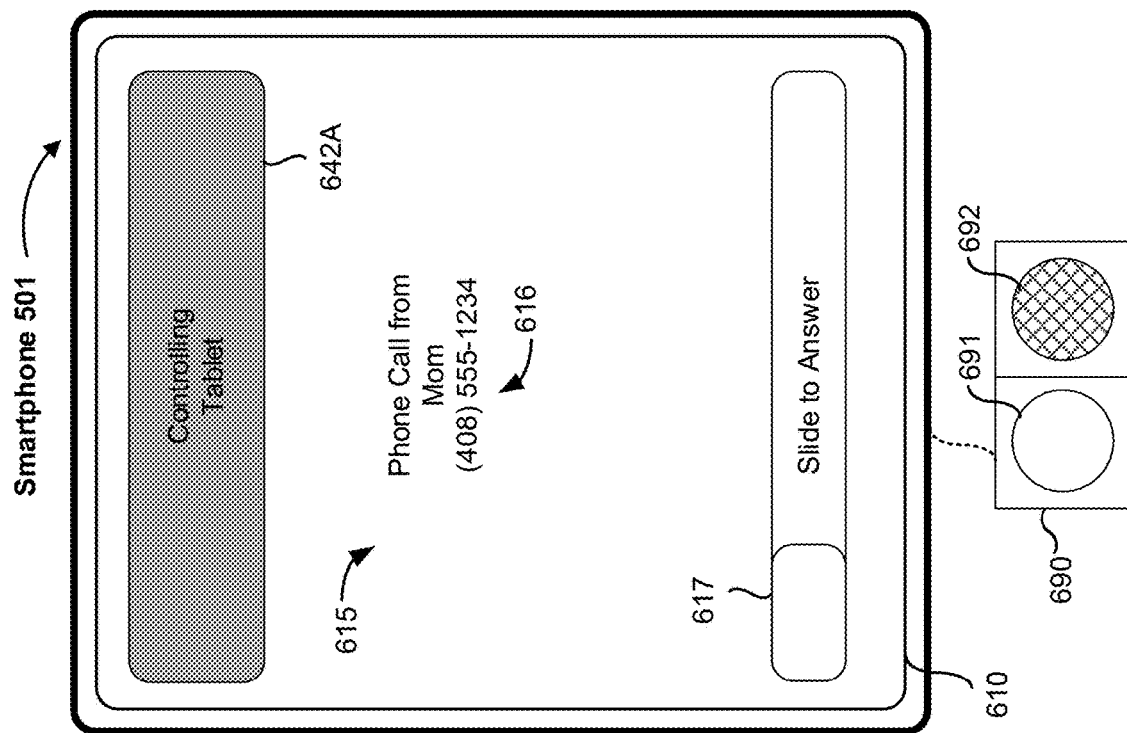
Figure 6A:
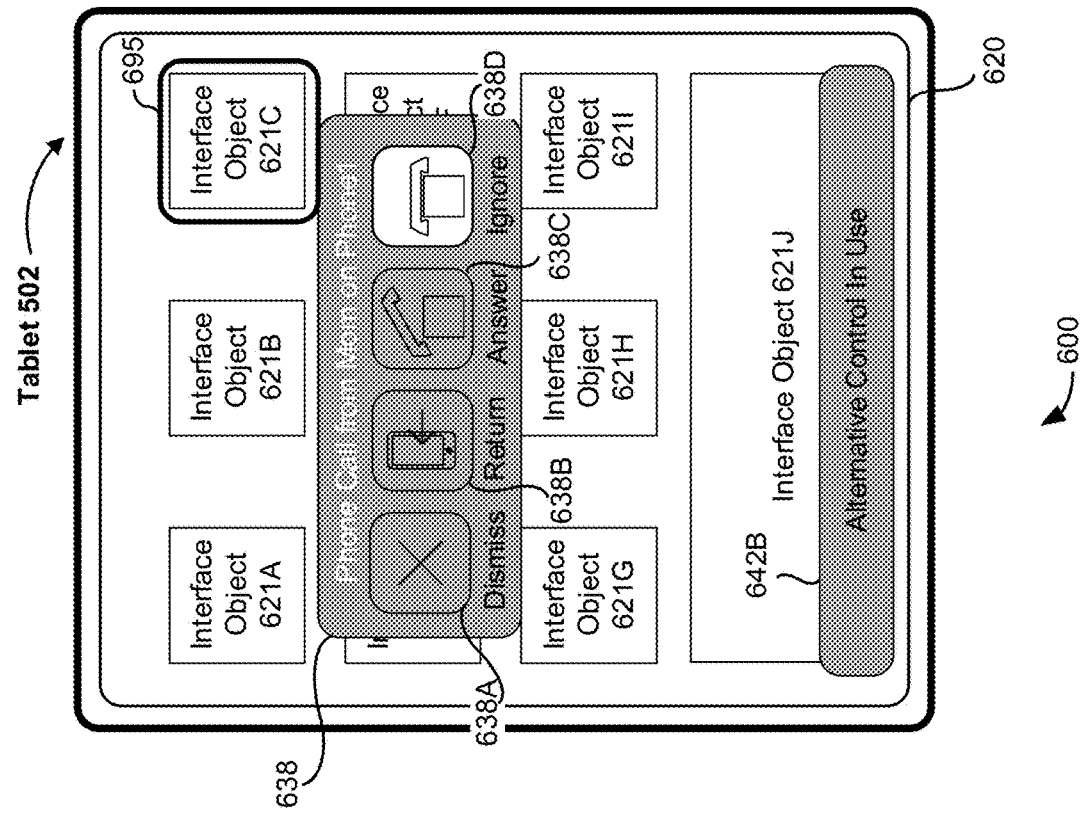
Figure 6A:
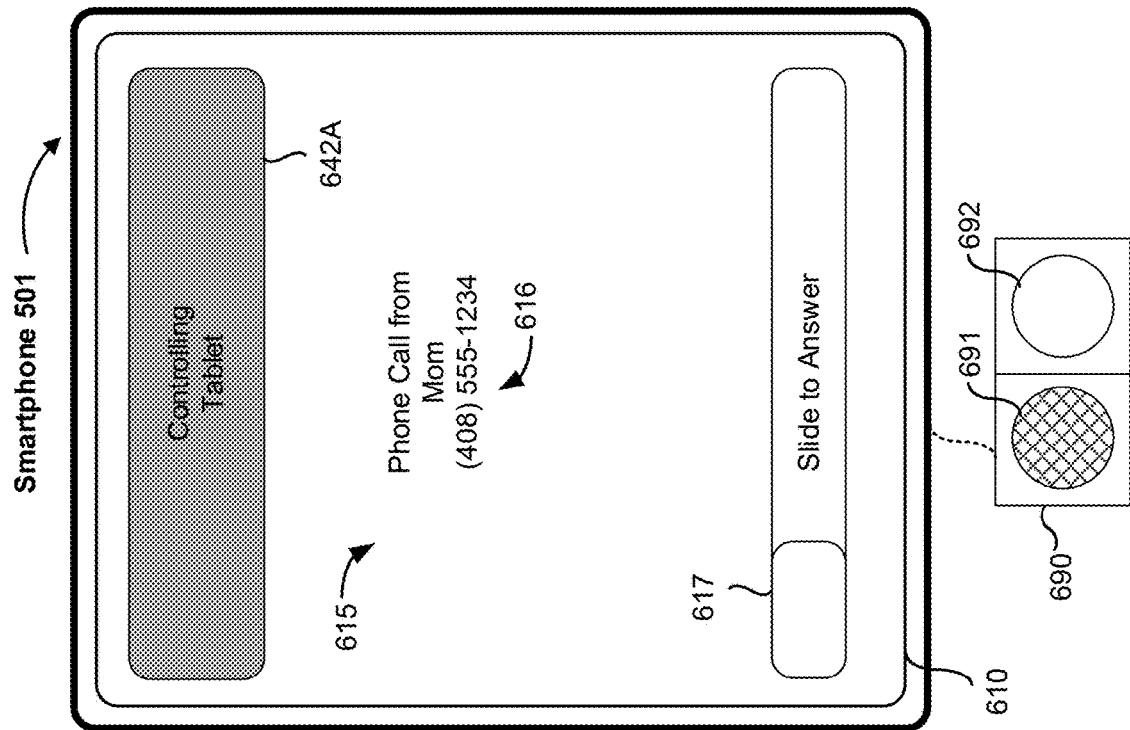
Figure 6A:
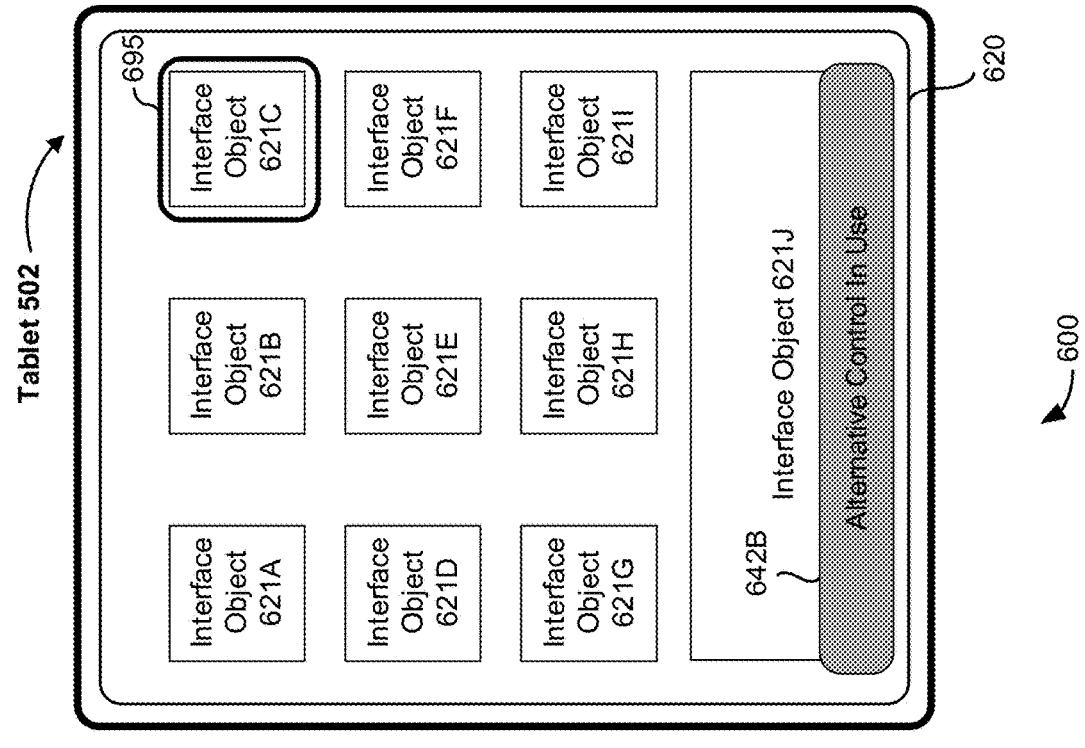
Figure 6A:
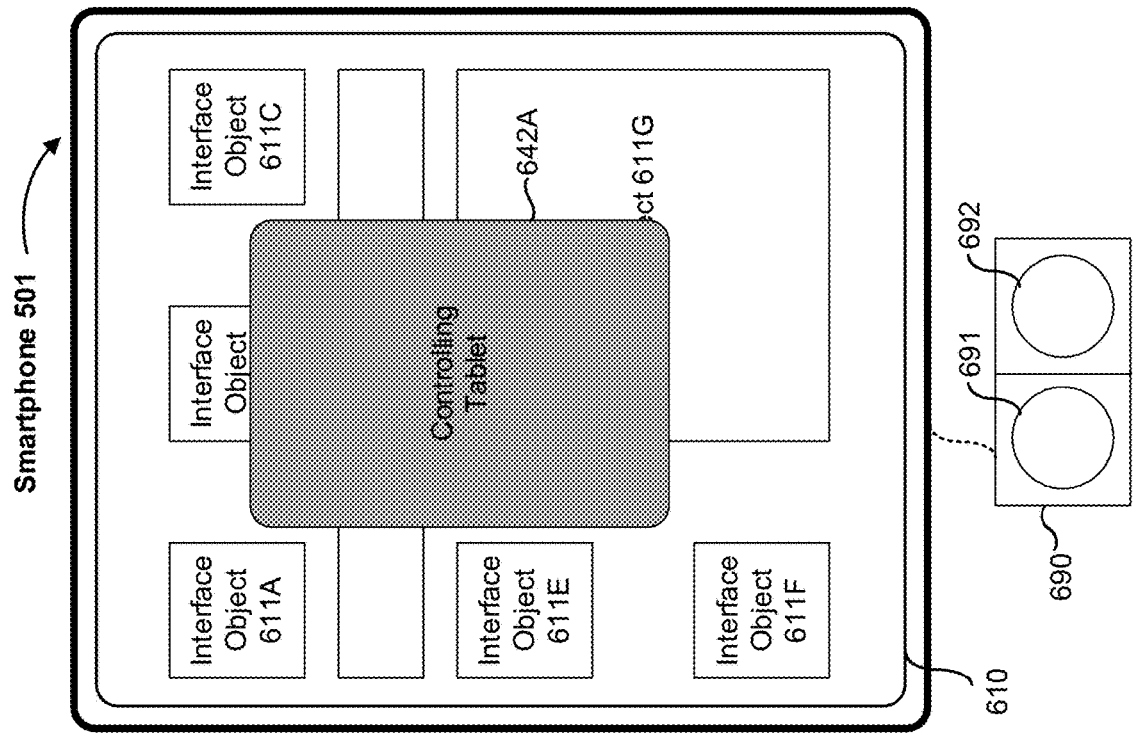
Figure 6A:
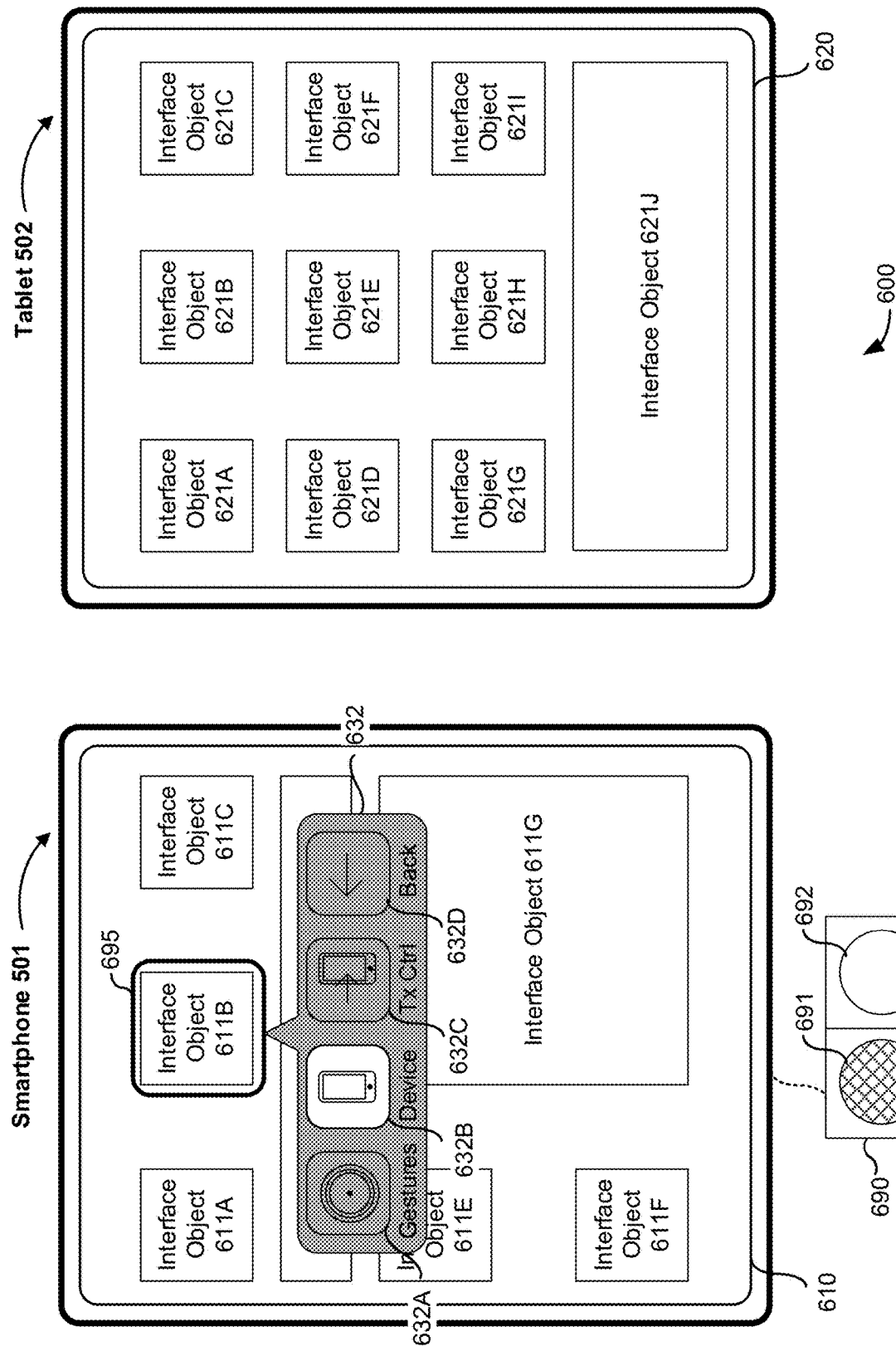
Figure 6A:
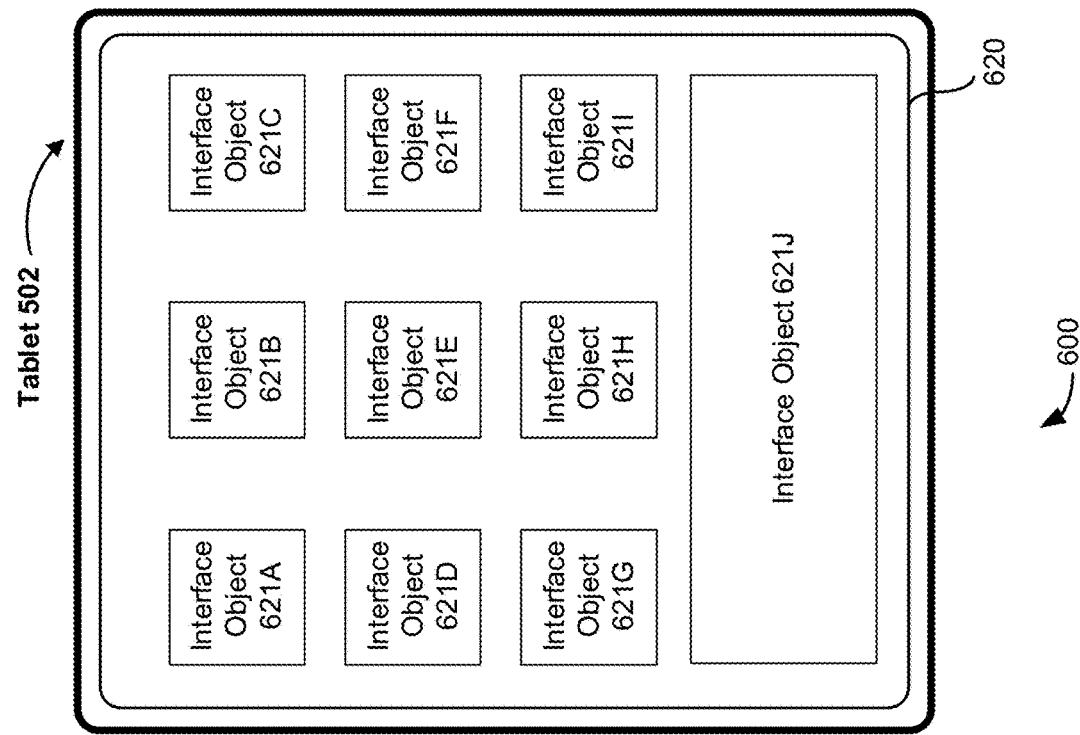
Figure 6A:
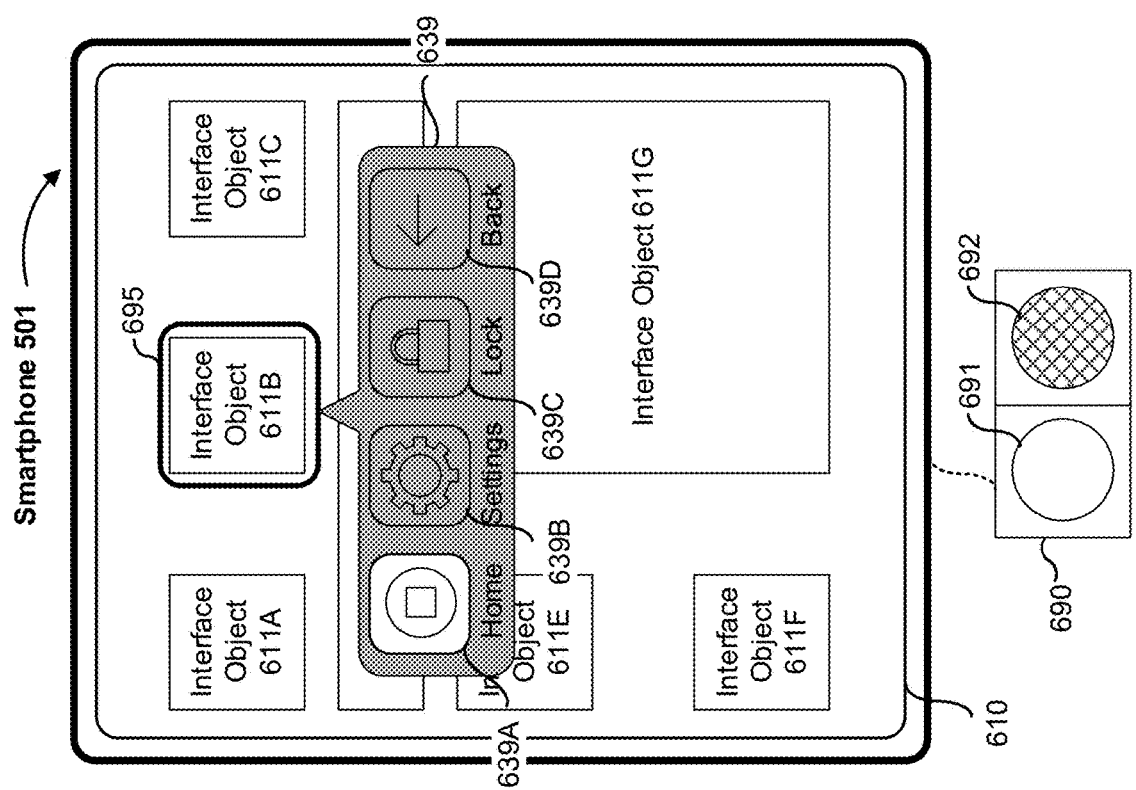
Figure 6A:
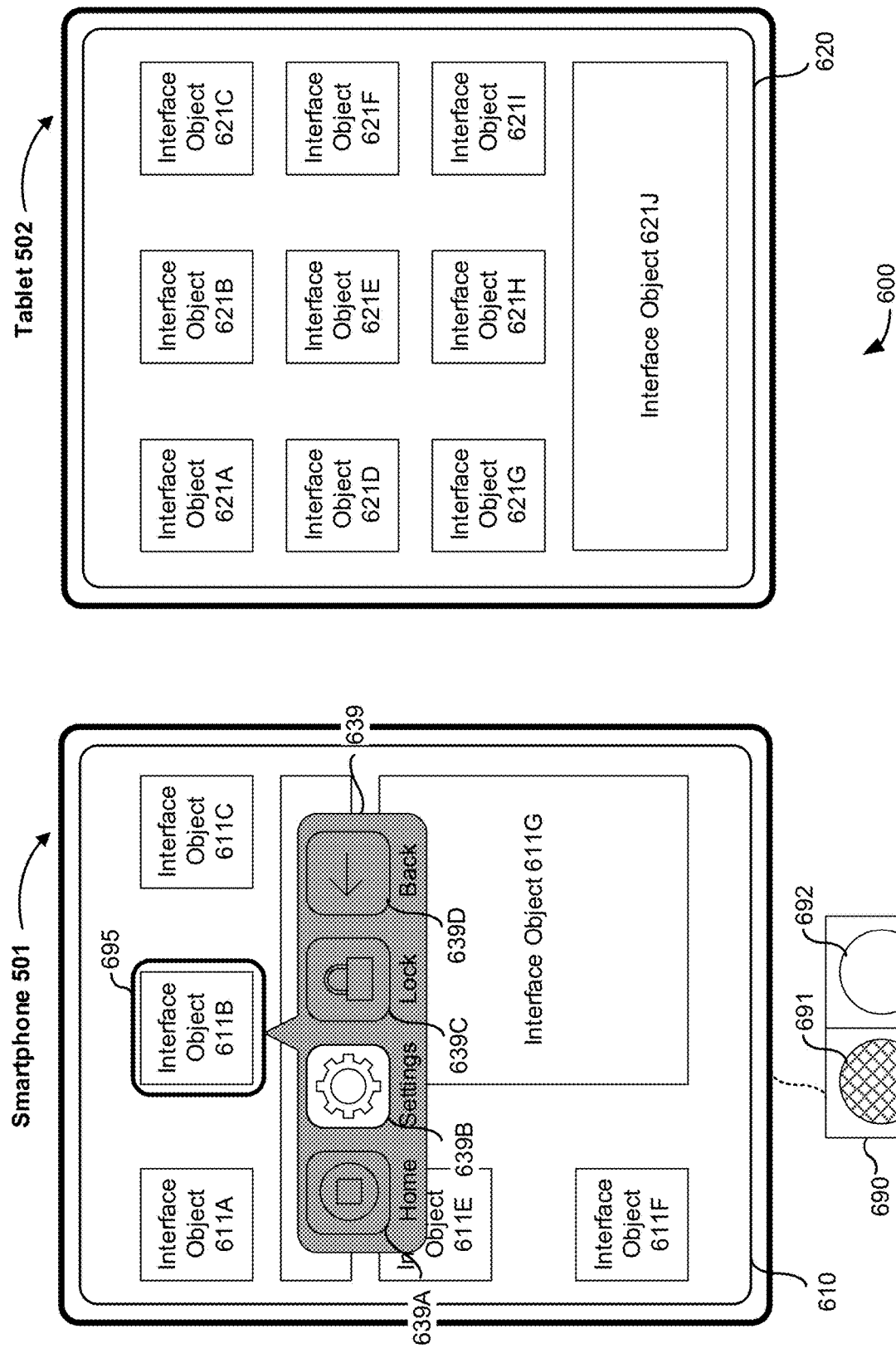
Figure 6A:
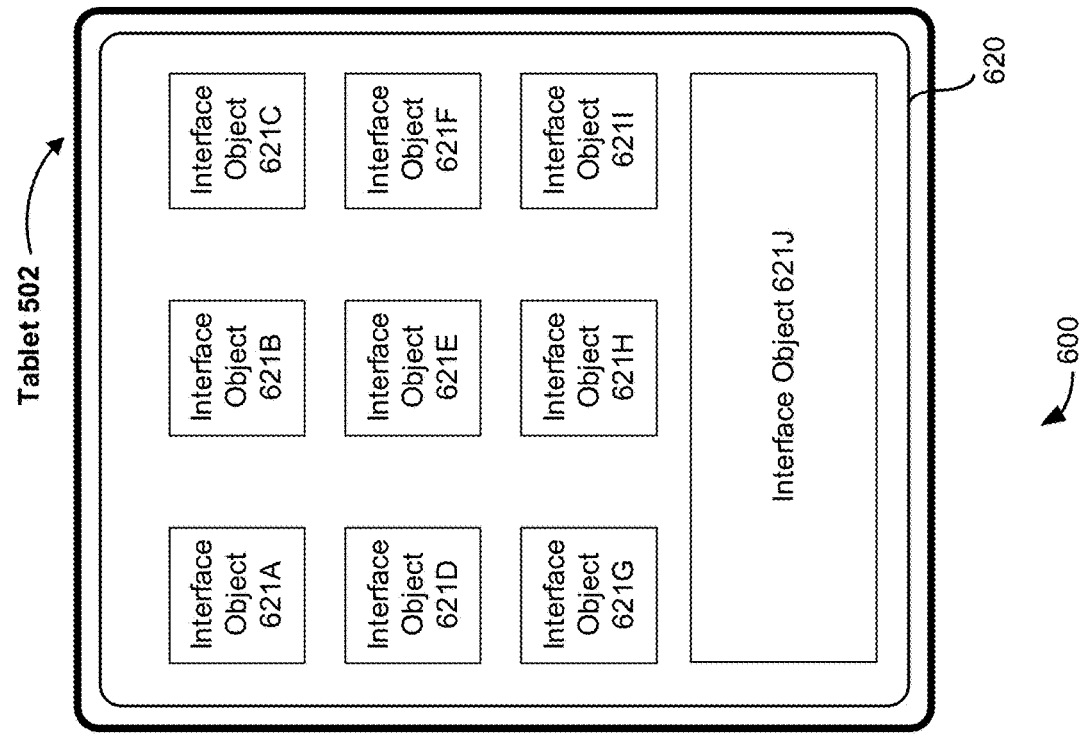
Figure 6A:
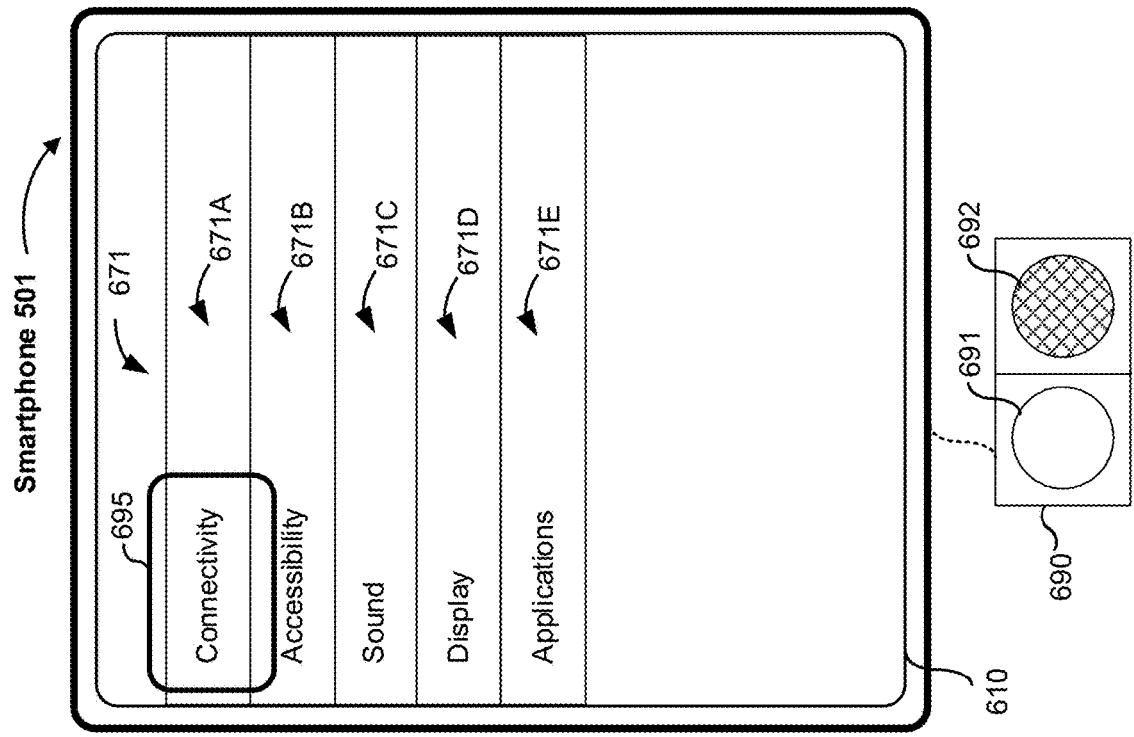
Figure 6A:
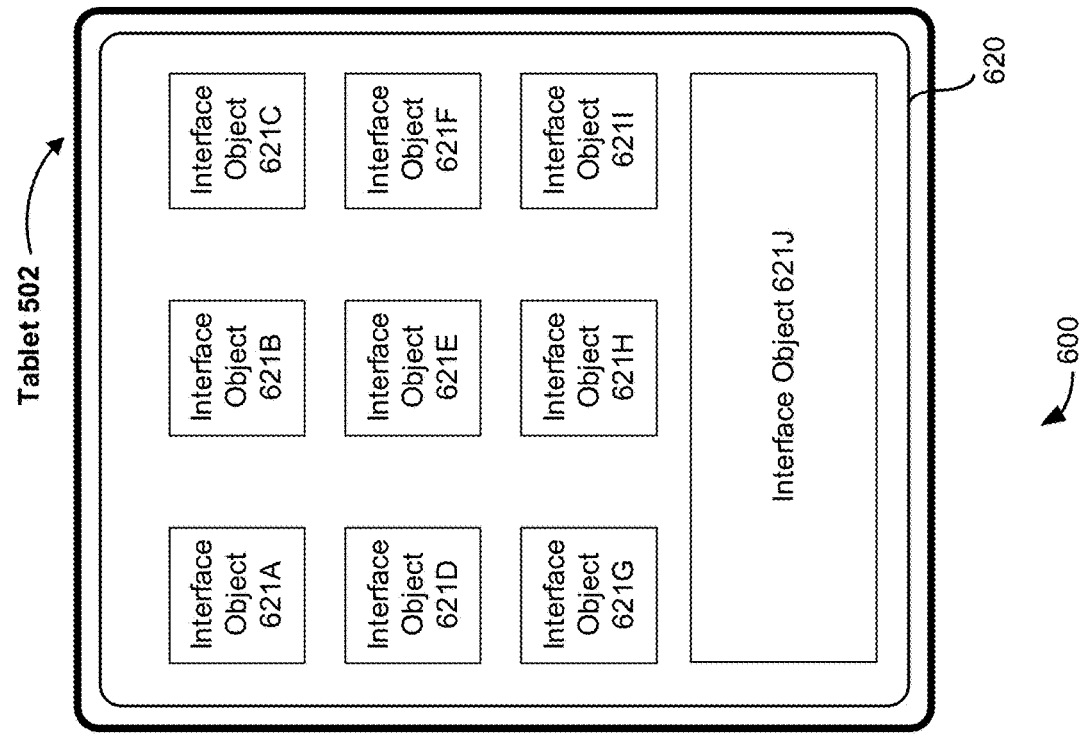
Figure 6A:
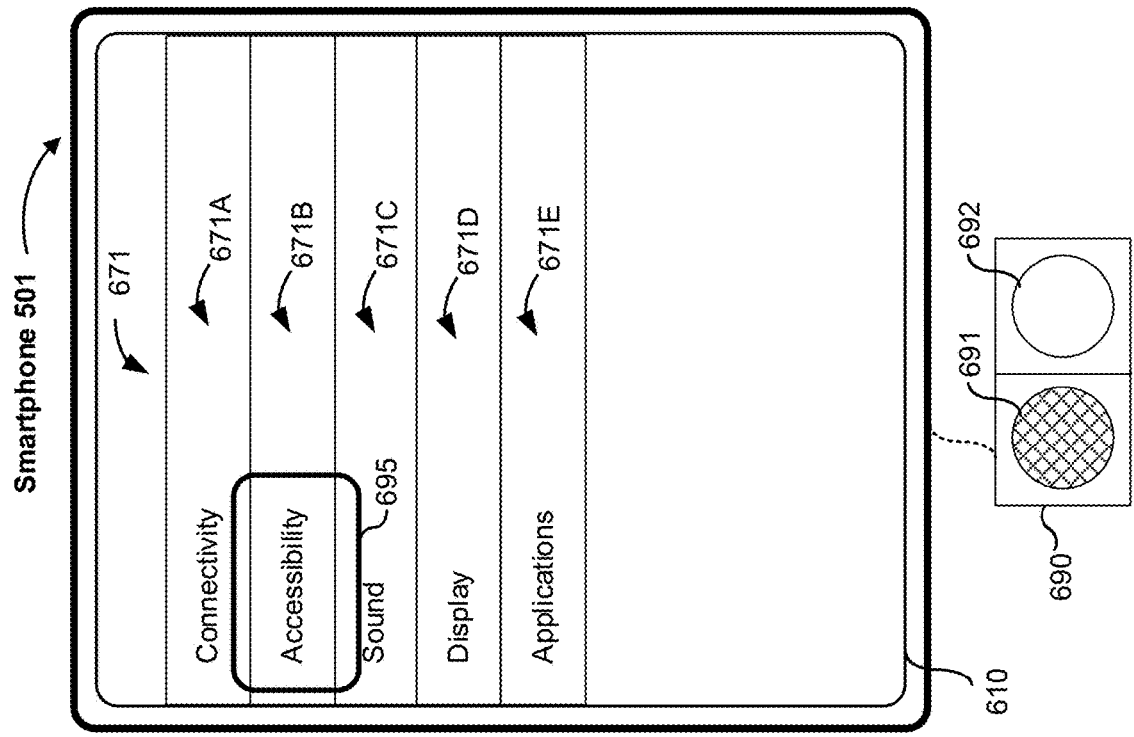
Figure 6A:
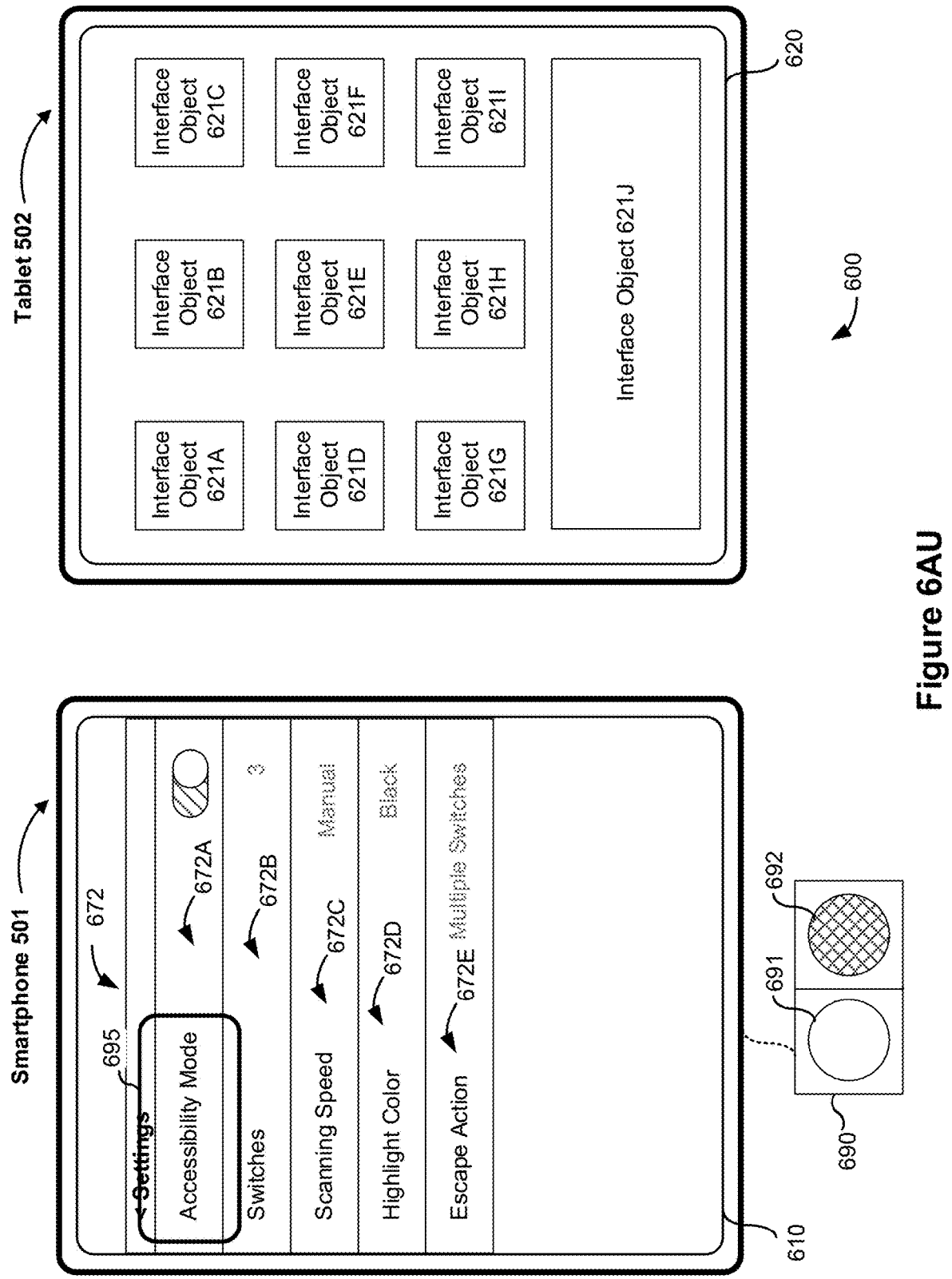
Figure 6A:
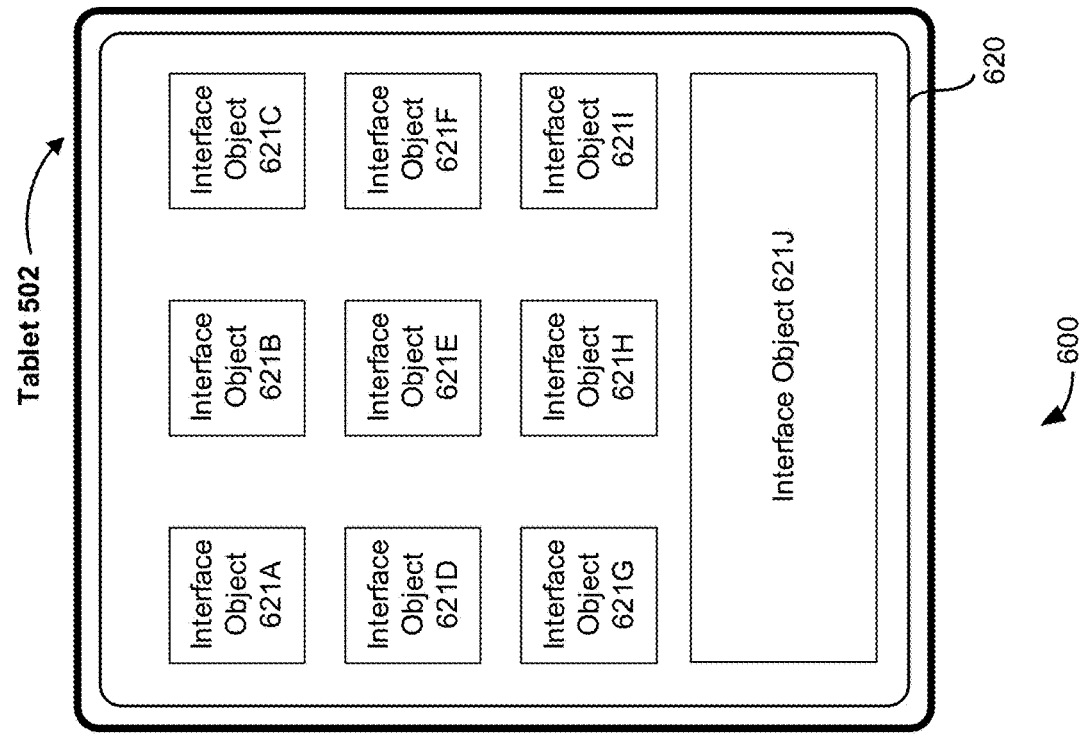
Figure 6A:
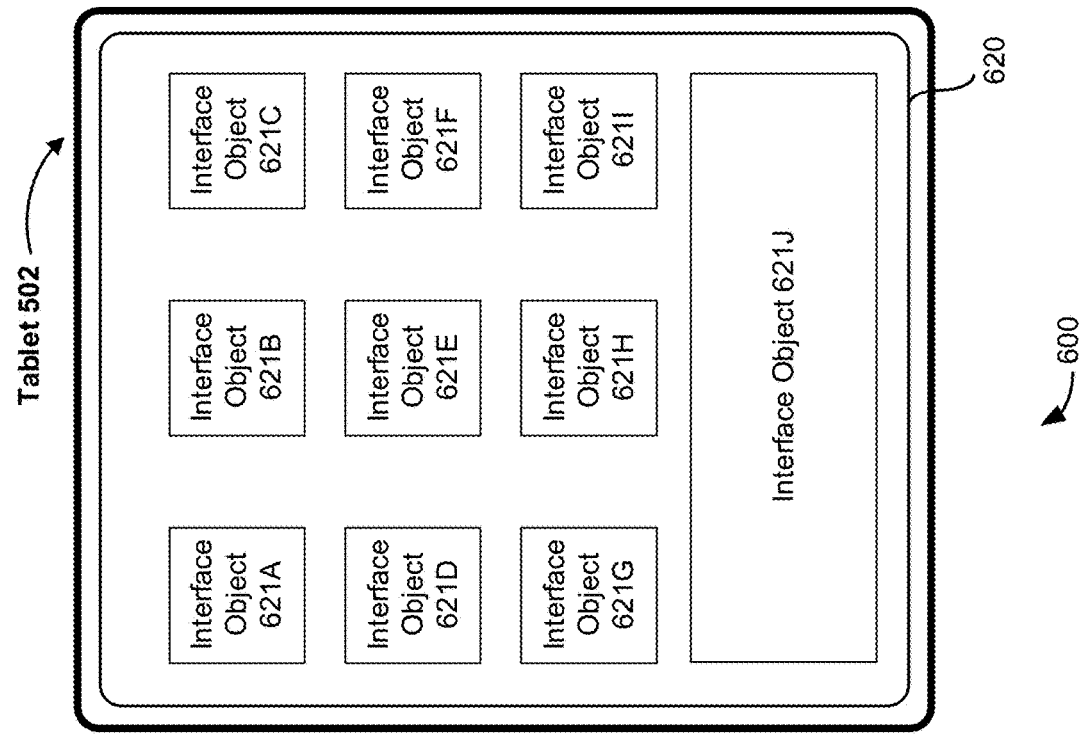
Figure 6A:
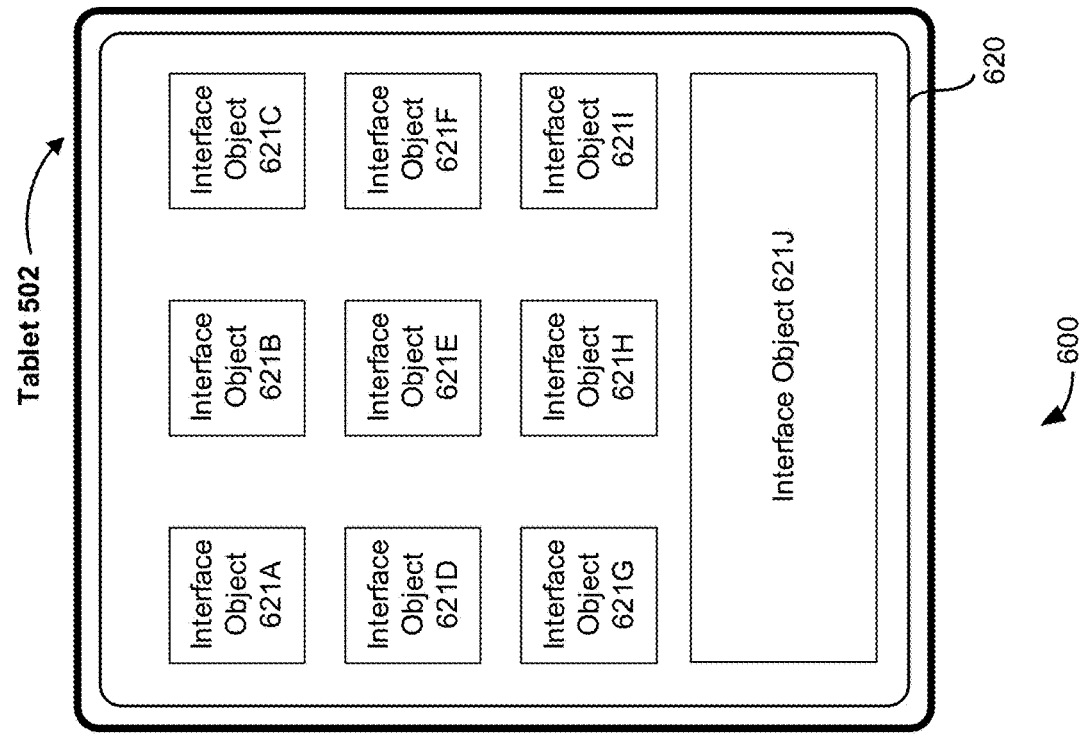
Figure 6A:
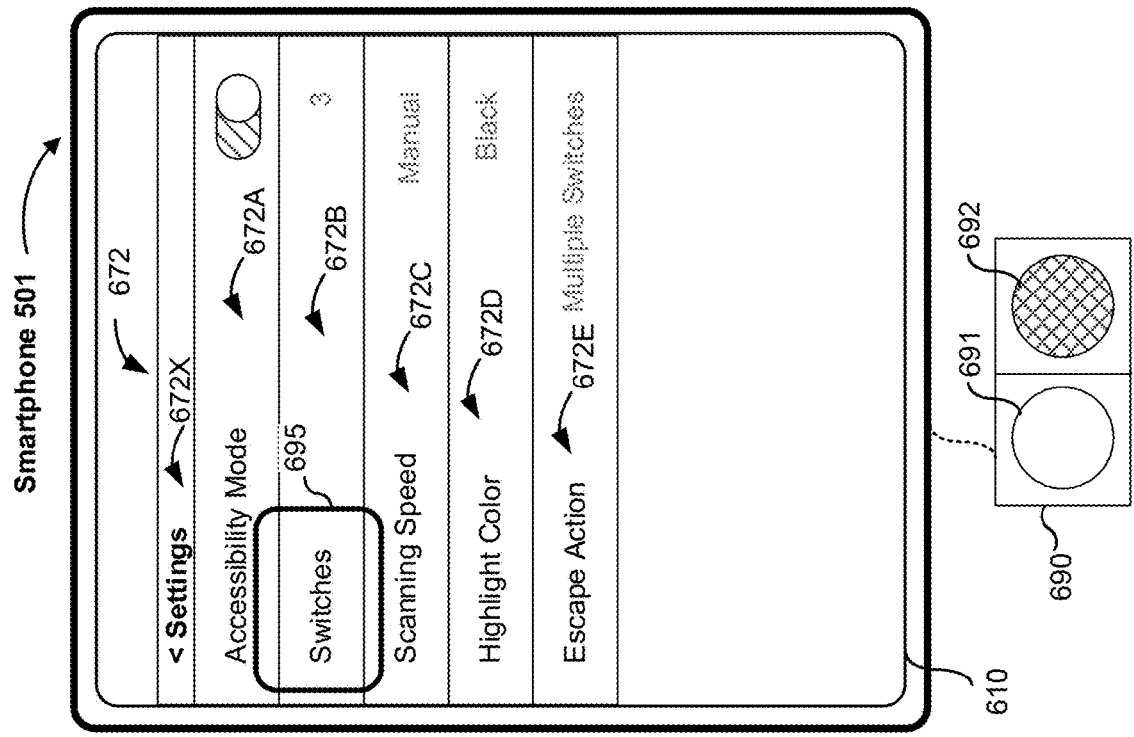
Figure 6A:
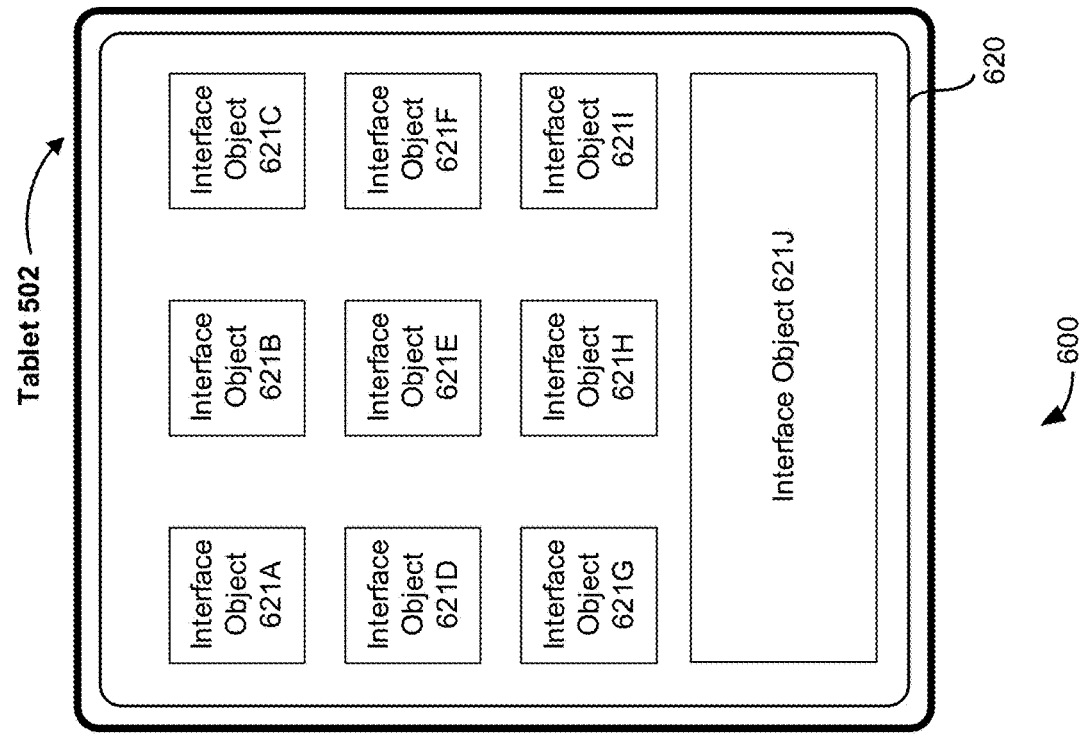
Figure 6A:
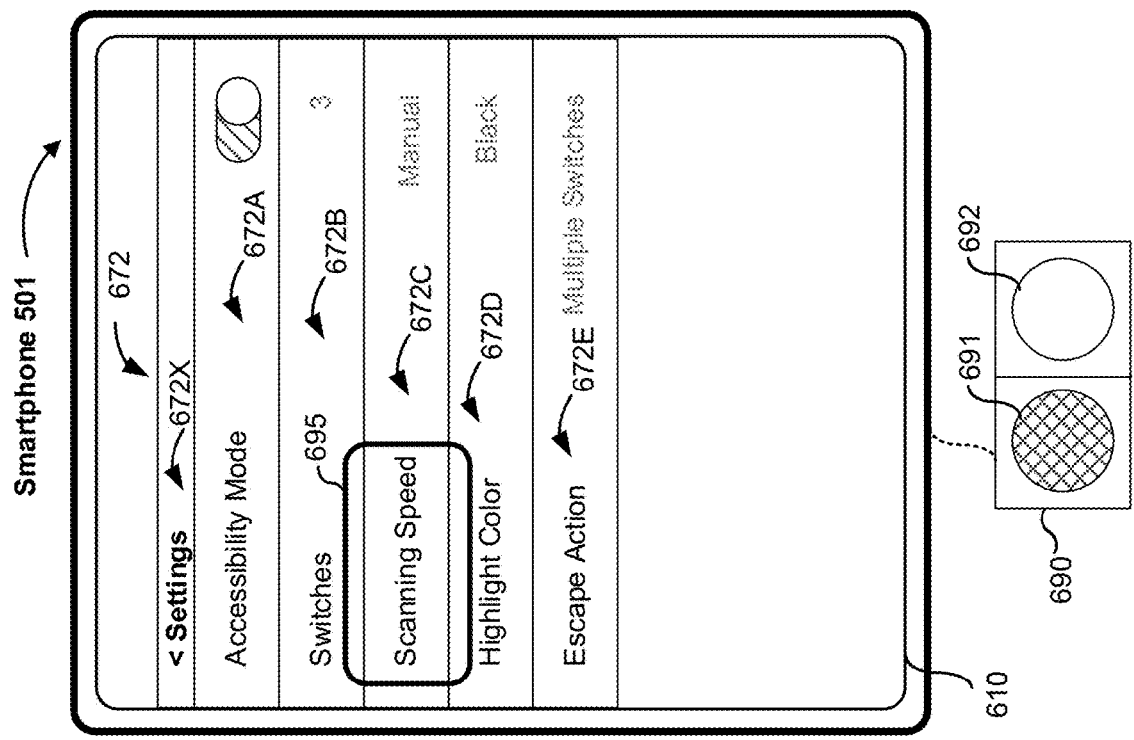
Figure 6A:
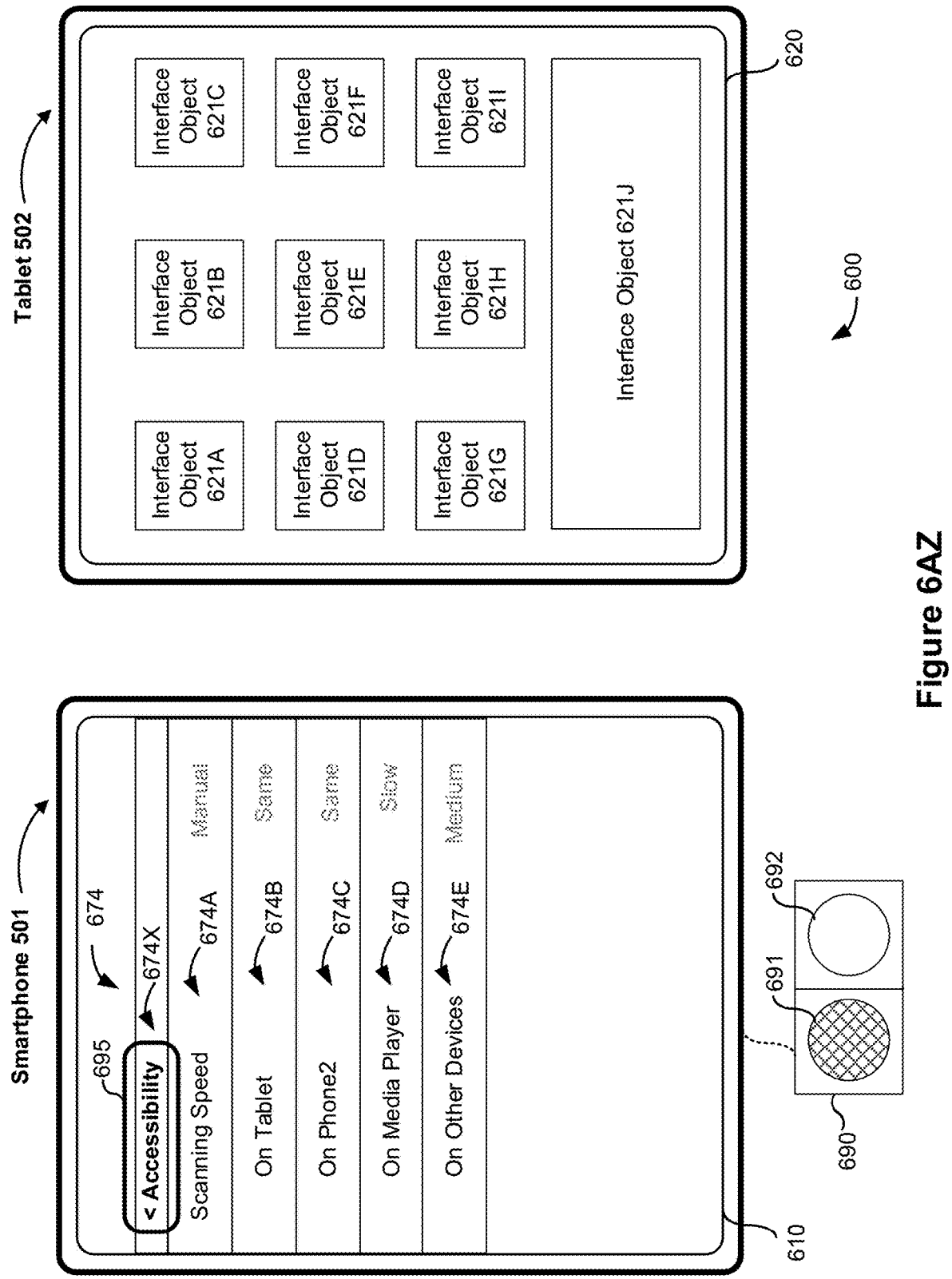
Figure 6B:
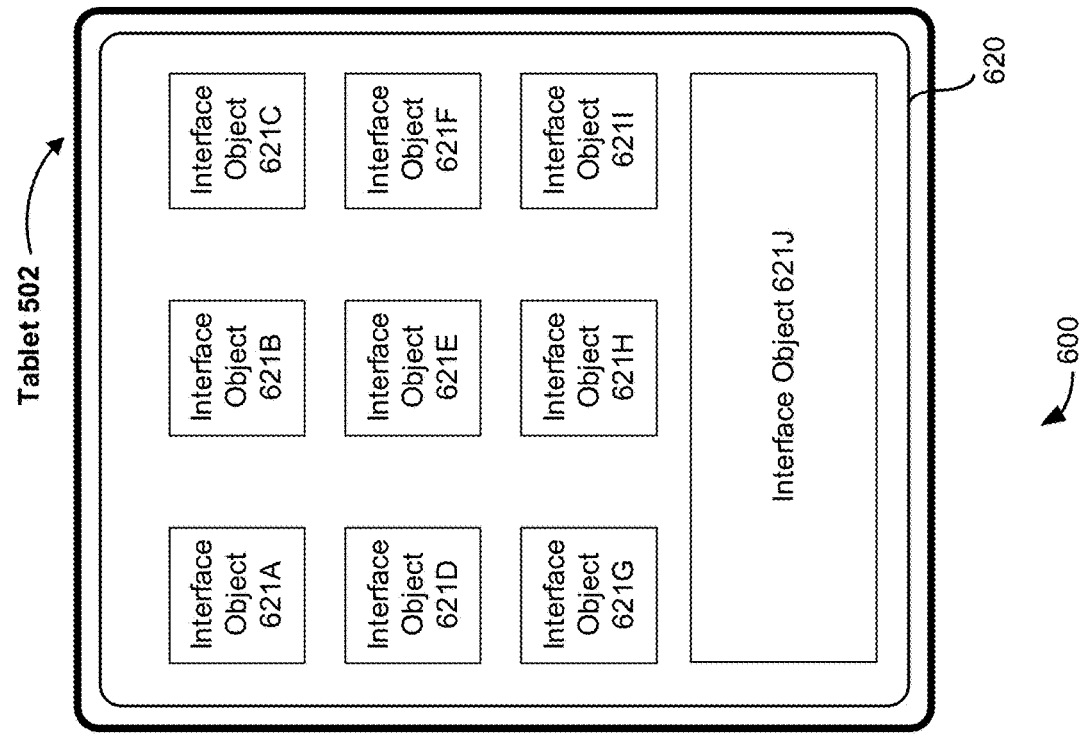
Figure 6B:
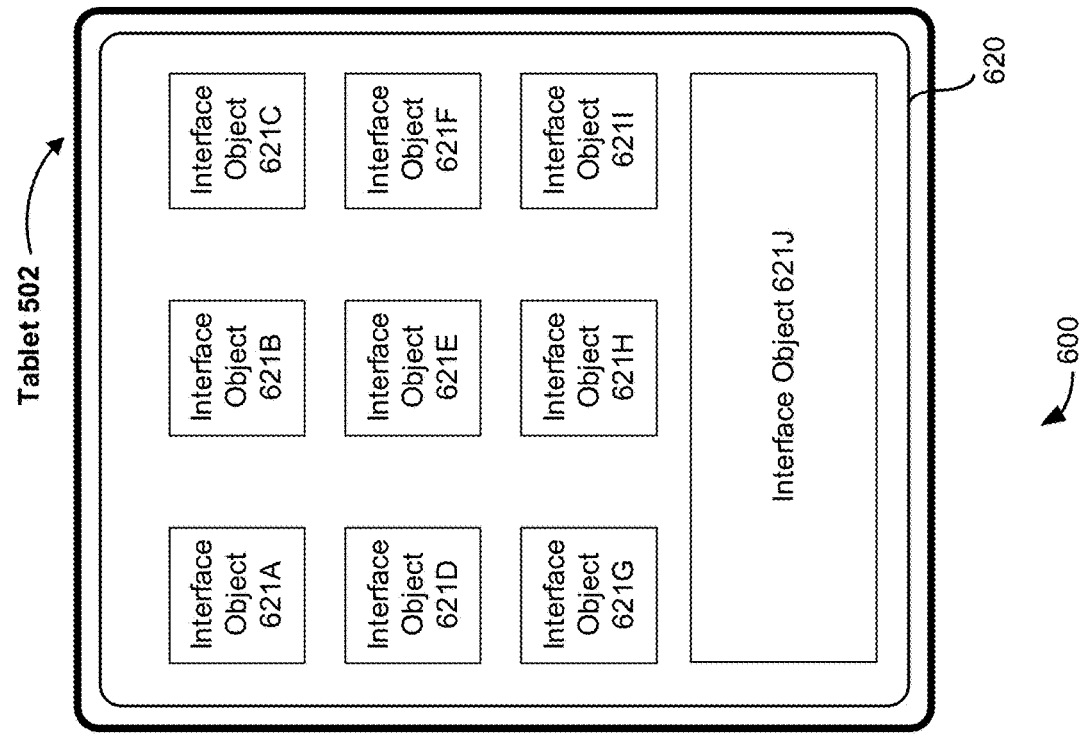
Figure 6B:
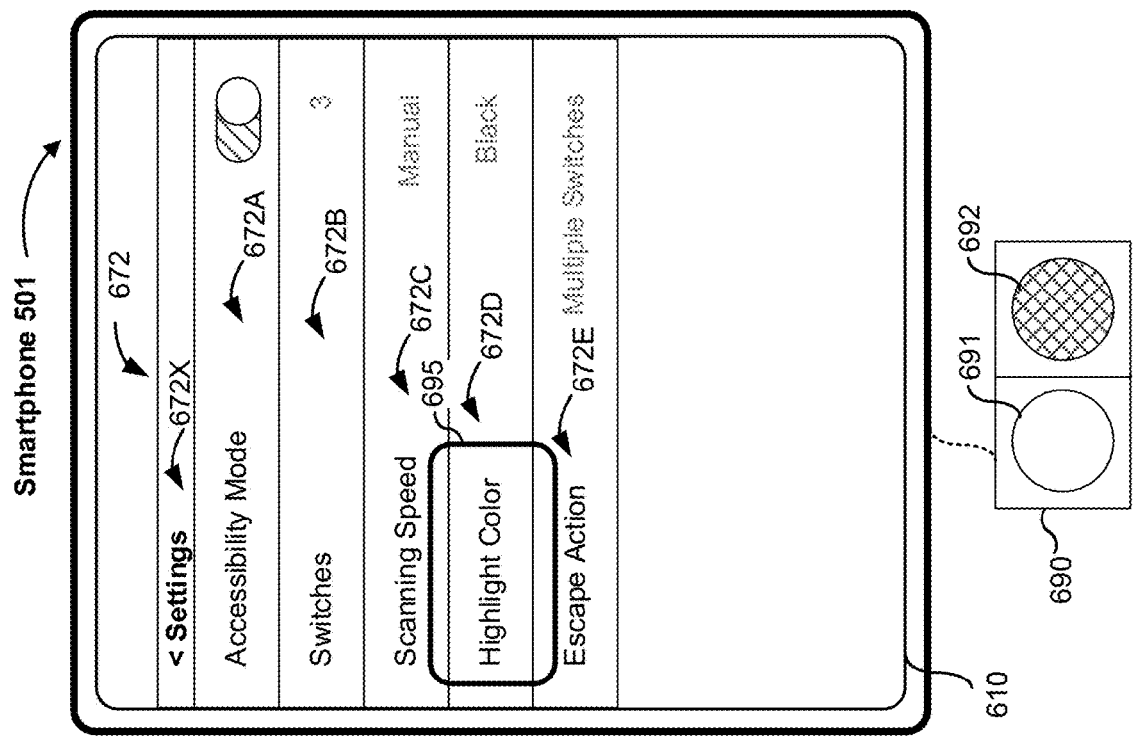
Figure 6B:
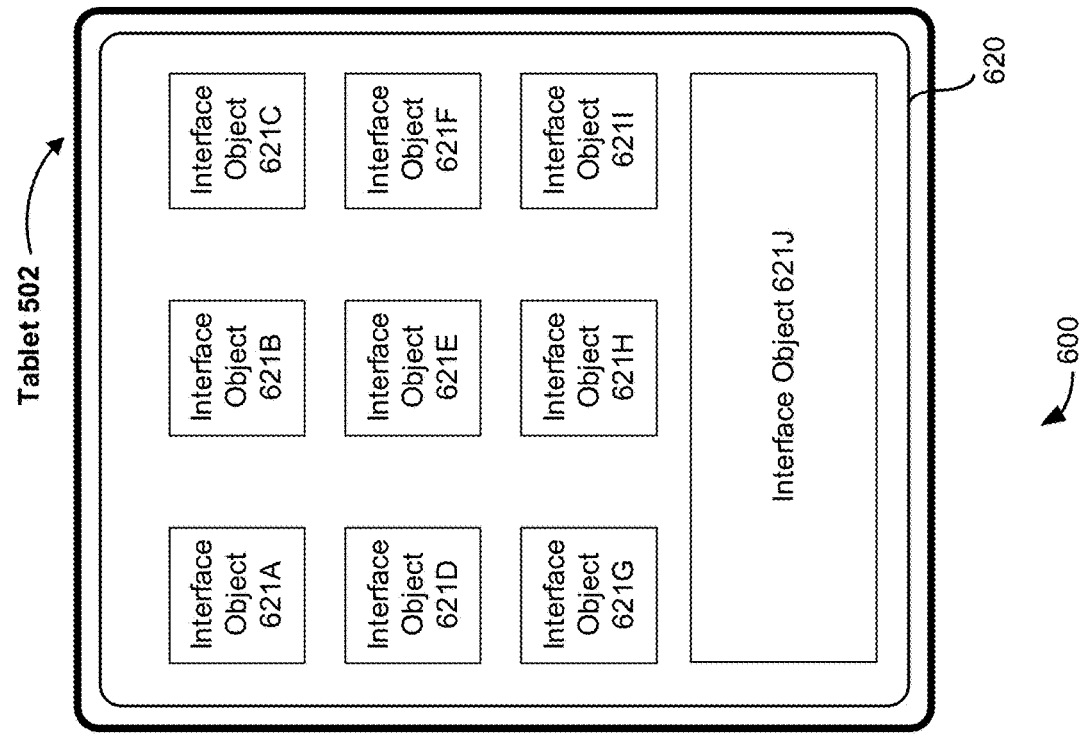
Figure 6B:
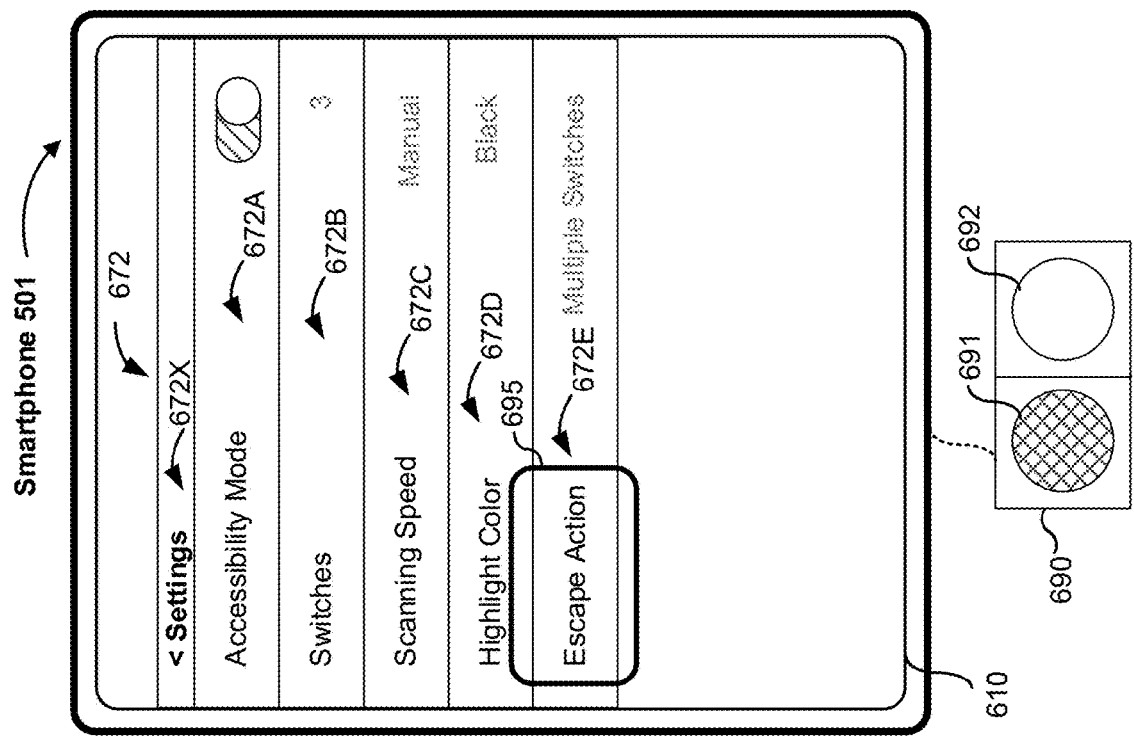
Figure 6B:
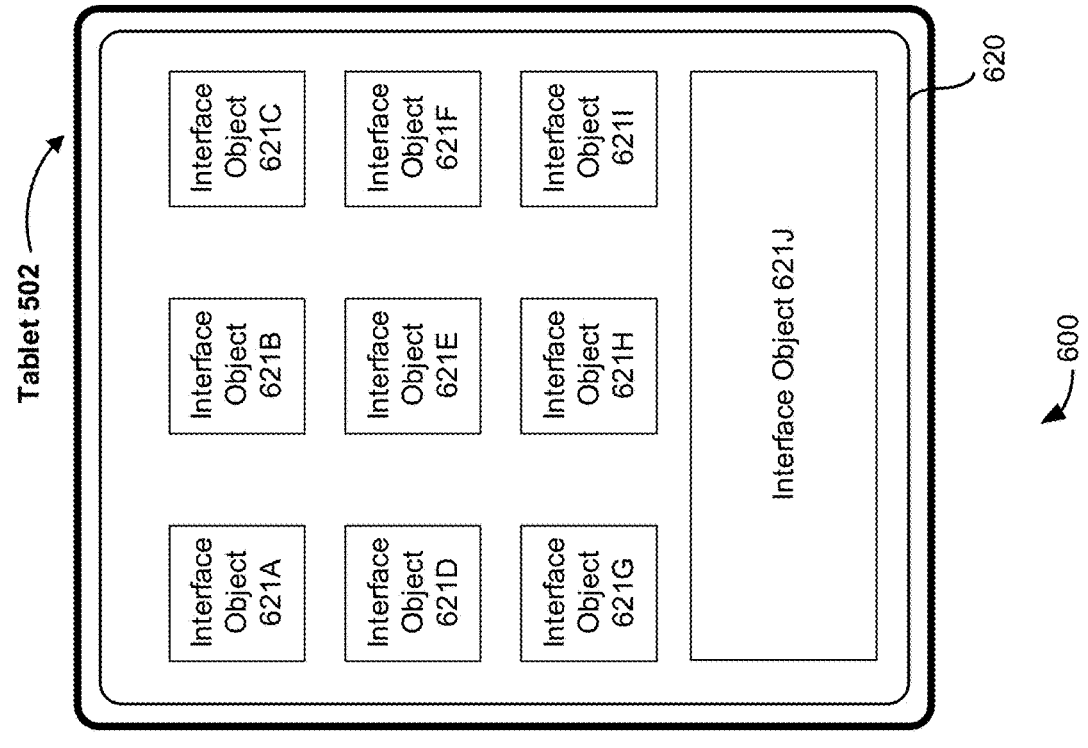
Figure 7C:
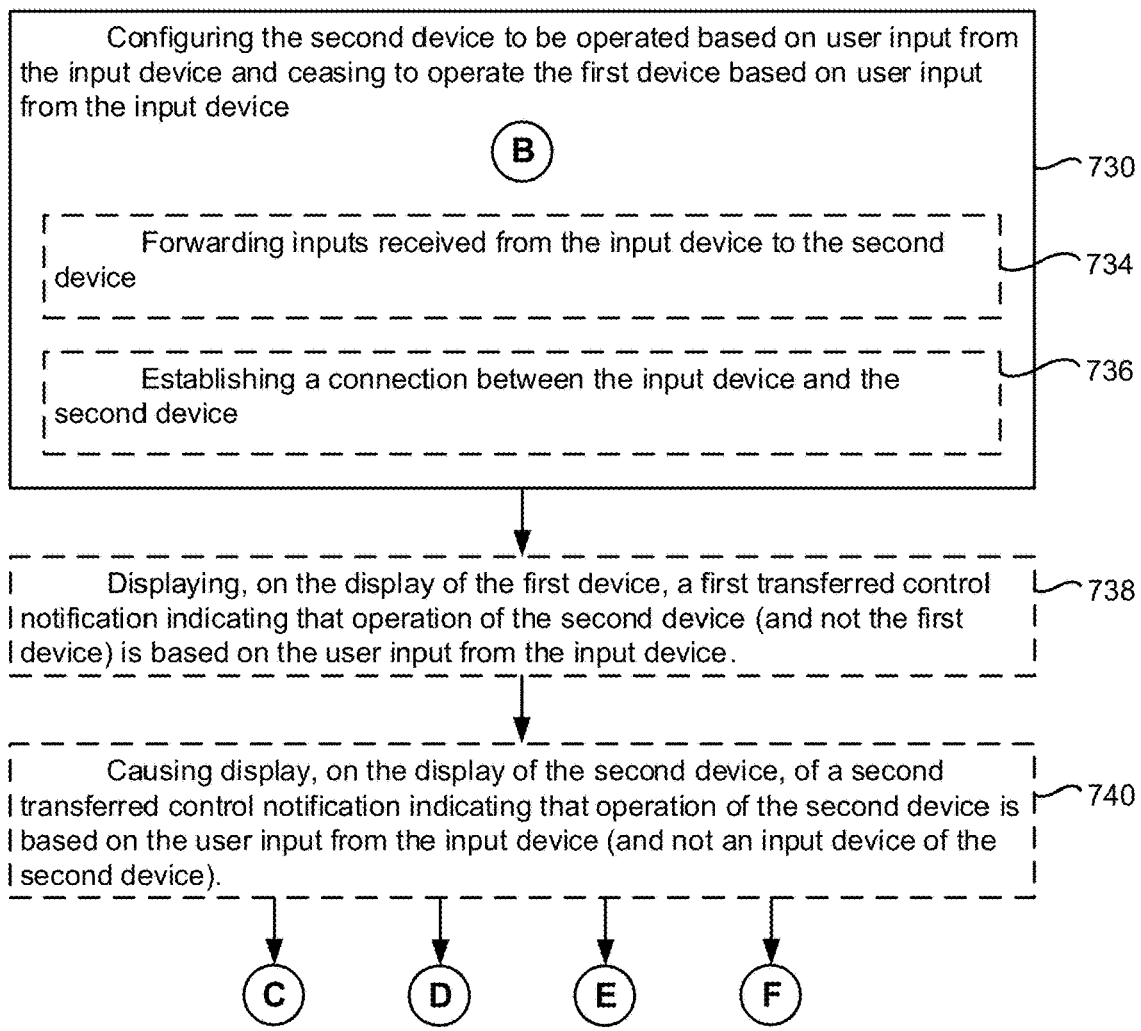
Figure 7E:
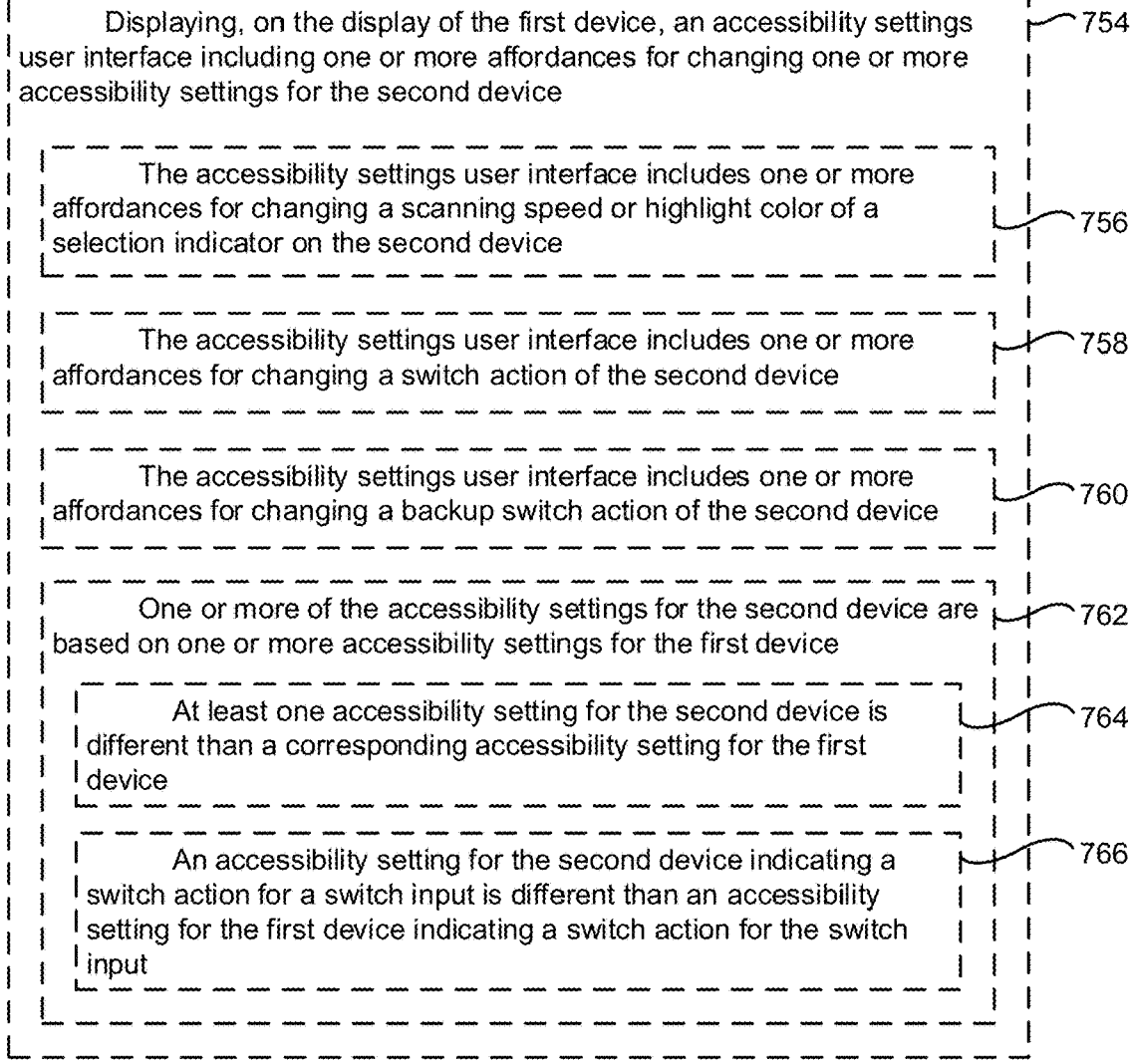
Figure 7F:
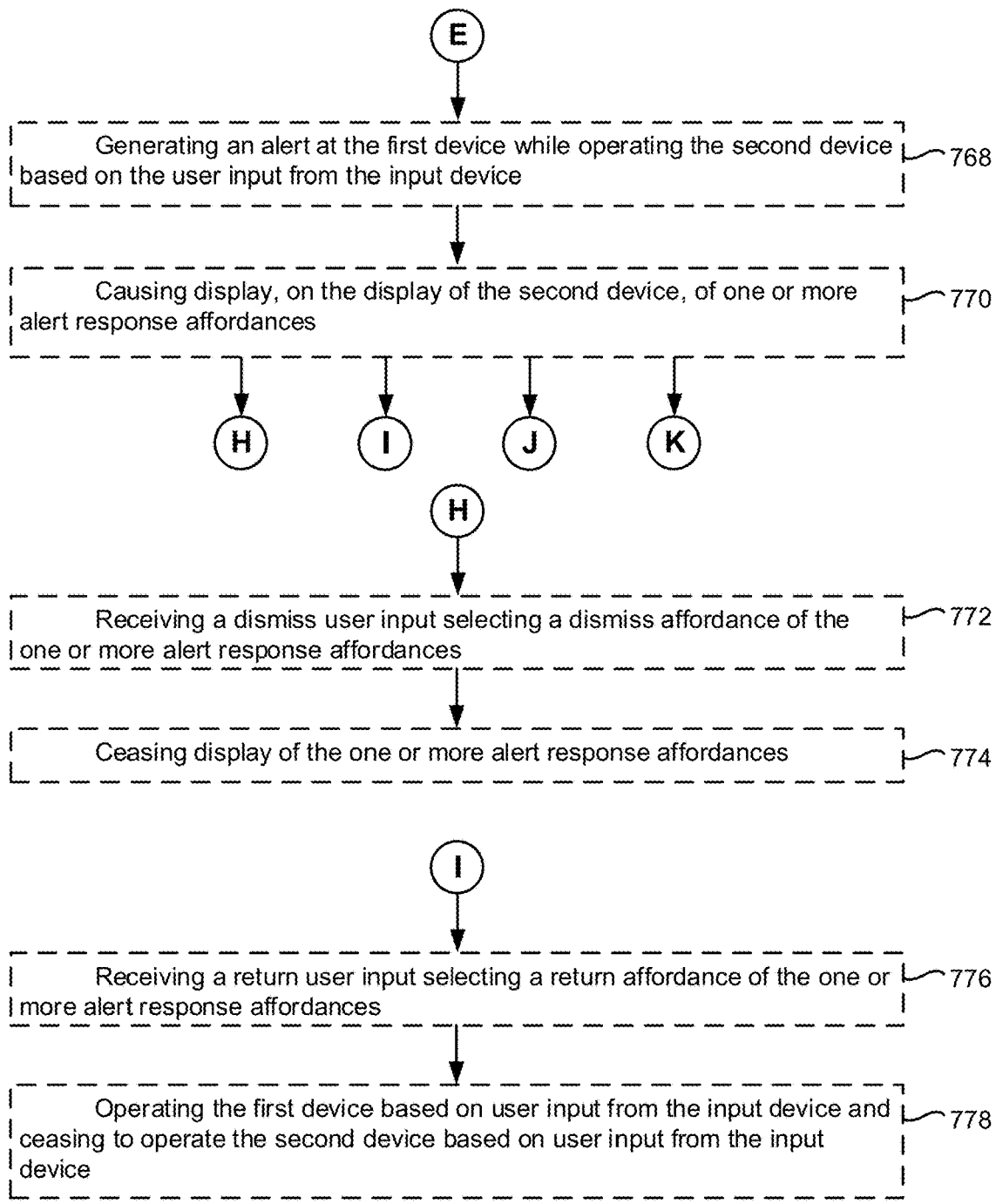

FIG. 6Z illustrates the environment 600 of FIG. 6Y in response to detecting the select input. In FIG. 6Z, the selection indicator 695 is moved to a third user interface 660 of the media player 503, displayed on a display 503A coupled to the media player 503. The third user interface 660 includes a plurality of interface objects 661A-661E with the selection indicator 695 highlighting a first interface object 661A.

The first user interface 610 of the smartphone 501 includes the first transferred control notification 642A indicating that the switch device 690 coupled to the smartphone 501 is interacting with the third user interface 660 of the media player 503 (and not the first user interface 610 of the smartphone 501). The third user interface 660 of the media player 503 includes the second transferred control notification 642B indicating that the third user interface 660 is being controlled by the switch device 690 coupled to the smartphone 501 (and not any other input device of media player 503 or connected to the media player 503).

FIG. 6Z illustrates that the second switch 692 is activated, resulting in a next input detected by the smartphone 501 (and forwarded to the media player 503).

FIG. 6AA illustrates the environment 600 of FIG. 6Z in response to detecting the next input. The third user interface 660 includes the selection indicator 695 moved from the first interface object 661A to the second interface object 661B.

FIG. 6AA illustrates that the first switch 691 is activated, resulting in a select input detected by the smartphone 501 (and forwarded to the media player 503).

FIG. 6AB illustrates the environment 600 of FIG. 6AA in response to detecting the select input. The third user interface 660 includes a media interaction menu 637 including a plurality of media interaction affordances. The media interaction affordances include a select affordance 637A for selecting the highlighted interface object. The media interaction affordances include a scroll affordance 637B for scrolling the third user interface 660. The media interaction affordances include a remote affordance 637C for displaying a virtual remote including a plurality of remote affordances for interacting with the third user interface 660. The media interaction affordances include a more affordance 637D for showing a second media interaction menu with other media interaction affordances.

FIG. 6AC, like FIG. 6N, illustrates the environment of FIG. 6M in response to detecting the next input. Unlike FIG. 6N, FIG. 6V illustrates that the first switch 691 and second switch 692 are activated, resulting in a select input and a next input detected by the smartphone 501 (and forwarded to the tablet 502). Such a combined input can be configured, as described further below, as an escape input to return control to the smartphone 601.

FIG. 6AD illustrates the environment of FIG. 6AC in response to detecting the escape input. In FIG. 6AD, control is returned to the smartphone 501 and the environment is in the same state as in FIG. 6A. Thus, switch inputs received from the switch device 690 will affect the first user interface 610 of the smartphone 501 (as shown, for example, in FIGS. 6B-6K).

Thus, control can be returned to the smartphone 501 in a number of ways. Control can be returned to the smartphone 501 by selecting a return affordance 632A of a transferred control interaction menu 635, as shown in FIG. 6T. Control can be returned to the smartphone 501 by selecting the smartphone select affordance 633E of the transferred control device select menu 636, as shown in FIG. 6X. Control can be returned to the smartphone 501 by inputting the escape input, as shown in FIG. 6AC. The escape input can be particularly useful for users with limited mobility who cannot easily find a device that is not behaving correctly (and unable to effect the other two forms of returning control) and reset it or otherwise correct a problem with the device. Further, if the user mistakenly transfers control to a second device that is not visible, control can be returned to the first device without interacting with the second device.

FIG. 6AE illustrates the environment 600 of FIG. 6AC in response to an alert being generated by the smartphone 501 (without the escape input being provided or detected), e.g., while switch inputs from the switch device 690 control the second user interface 620 of the tablet 502.

The first user interface 610 displays an alert user interface 615 based on the alert. In FIG. 6AE, the alert is generated in response to a received phone call. In various implementations, the alert can be, for example, a text message, a timer expiration, a clock alarm, or an event reminder. The alert user interface 615 includes alert information 616 regarding the alert and one or more affordances for responding to the alert. In FIG. 6AE, the affordances for responding to the alert include a slide affordance 617 for answering the phone call.

The second user interface 610 includes an alert response menu 638 with a plurality of alert response affordances. The alert response affordances include a dismiss affordance 638A for dismissing the alert response menu 638 without any action taken on the smartphone 501. The alert response affordances include a return affordance 638B for returning control to the smartphone 501. The alert response affordances include an answer affordance 638C for answering the phone call. The alert response affordances include an ignore affordance 638D for ignoring the phone call. In FIG. 6AE, the dismiss affordance 638A is highlighted and the other affordances of the alert response menu 638 are not highlighted. In various implementations, the alert response affordances can include affordances for responding to a text message, snoozing a clock alarm, or displaying information regarding an event.

FIG. 6AE illustrates that the first switch 691 is activated, resulting in a select input detected by the smartphone 501 (and forwarded to the tablet 502).

FIG. 6AF illustrates the environment 600 of FIG. 6AE in response to detecting the select input. In FIG. 6AF, the alert response menu 638 is no longer displayed on the second user interface 620 and switch inputs continue to control the second user interface 620. On the first user interface 610, the alert user interface 615 is displayed unchanged and no action is taken with respect to the phone call.

FIG. 6AG, like FIG. 6AE, illustrates the environment of FIG. 6AC in response to the alert being generated by the smartphone. Unlike FIG. 6AE, FIG. 6AG illustrates that the second switch 692 is activated, resulting in a next input detected by the smartphone 501 (and forwarded to the tablet 502).

FIG. 6AH illustrates the environment of FIG. 6AG in response to detecting the next input. In FIG. 6AH, the return affordance 638B is highlighted and the other affordances of the alert response menu 638 are not highlighted.

FIG. 6AH illustrates that the first switch 691 is activated, resulting in a select input detected by the smartphone 501 (and forwarded to the tablet 502).

FIG. 6AI illustrates the environment of FIG. 6AH in response to detecting the select input. In FIG. 6AI, the first transferred control notification 642A and second transferred control notification 642B are not displayed indicating that control has returned to the smartphone 501. The selection indicator 695 highlights the slide affordance 617 and switch inputs from the switch device can be detected to operate the smartphone 501, e.g., to answer the phone call.

FIG. 6AJ, like FIG. 6AH, illustrates the environment of FIG. 6AG in response to detecting the next input. Unlike FIG. 6AH, FIG. 6AJ illustrates that the second switch 692 is activated, resulting in a next input detected by the smartphone 501 (and forwarded to the tablet 502).

FIG. 6AK illustrates the environment 600 of FIG. 6AJ in response to detecting the next input. In FIG. 6AK, the answer affordance 638C is highlighted and the other affordances of the alert response menu 638 are not highlighted.

FIG. 6AK illustrates that the first switch 691 is activated, resulting in a select input detected by the smartphone 501 (and forwarded to the tablet 502).

FIG. 6AL illustrates the environment 600 of FIG. 6AK in response to detecting the select input. In response to detecting the select input, the smartphone 501 answers the phone call, but the switch inputs are still forwarded to the tablet 502. On the first user interface 610, an answered call user interface 615A is displayed including information regarding the phone call and a number of call affordances. On the second user interface 620, an answered call menu 639 is displayed including a plurality of call affordances. The call affordances include a mute affordance 639A for muting the answered phone call. The call affordances include a keypad affordance 639B for displaying a keypad. The call affordances include a hang-up affordance 639C for ending the answered phone call. In FIG. 6AL, the mute affordance 639A is highlighted and the other affordances of the answered call menu 639 are not highlighted.

FIG. 6AM, like FIG. 6AK, illustrates the environment 600 of FIG. 6AJ in response to detecting the next input. Unlike FIG. 6AK, FIG. 6AM illustrates that the second switch 692 is activated, resulting in a next input detected by the smartphone 501 (and forwarded to the tablet 502).

FIG. 6AN illustrates the environment 600 of FIG. 6AM in response to detecting the next input. In FIG. 6AM, the ignore affordance 638D is highlighted and the other affordances of the alert response menu 638 are not highlighted.

FIG. 6AN illustrates that the first switch 691 is activated, resulting in a select input detected by the smartphone 501 (and forwarded to the tablet 502).

FIG. 6AO illustrates the environment 600 of FIG. 6AN in response to detecting the select input. In response to the select input, the smartphone 501 ignores the phone call and the environment 600 is returned to the state of FIG. 6AC (without the escape input being provided or detected), e.g., while switch inputs from the switch device 690 control the second user interface 620 of the tablet 502.

FIG. 6AP, like FIG. 6G, illustrates the environment 600 of FIG. 6F in response to detecting the next input. In FIG. 6G, the device affordance 632B is highlighted and the other interaction affordances are not highlighted. Unlike FIG. 6G, FIG. 6AP illustrates that the first switch 691 is activated, resulting in a select input detected by the smartphone 501.

FIG. 6AQ illustrates the environment 600 of FIG. 6AP in response to detecting the response input. In FIG. 6AQ, the second interaction menu 632 is replaced with a device menu 639 including a plurality of device menu affordances. The device menu affordances include a home affordance 639A for performing a home operation (e.g., returning to a home user interface). The device menu affordances include a settings affordance 639B for accessing a settings user interface. The device menu affordances include a lock affordance 639C for locking the smartphone 501. The device menu affordances include a back affordance 639D for exiting the device menu 639 (and returning to the state of FIG. 6B). In FIG. 6AQ, the home affordance 639A is highlighted and the other affordances of the device menu 639 are not highlighted.

FIG. 6AQ illustrates that the second switch 692 is activated, resulting in a next input detected by the smartphone 501.

FIG. 6AR illustrates the environment 600 of FIG. 6AQ in response to detecting the next input. In FIG. 6AR, the settings affordance 639B is highlighted and the other affordances of the device menu 639 are not highlighted.

FIG. 6AR illustrates that the first switch 691 is activated, resulting in a select input detected by the smartphone 501.

FIG. 6AS illustrates the environment 600 of FIG. 6AR in response to detecting the select input. In FIG. 6AS, the first user interface 610 displays a settings user interface 671. The settings user interface 671 includes a plurality of settings affordances for changing various settings of the smartphone 501. The settings affordances include a connectivity settings affordance 671A for changing connectivity settings of the smartphone 501, e.g., WLAN network connections, turning on and off an airplane mode, configuring the smartphone 501 as a hotspot, etc. The settings affordances include an accessibility settings affordance 671B for changing accessibility settings of the smartphone 501, as described further below. The settings affordances include a sound settings affordance 671C for changing sound settings of the smartphone 501, such as a maximum volume, ringtones, etc. The settings affordances include a display settings affordance 671D for changing display settings of the smartphone 501, such as a brightness, a text size, etc. The settings affordances include an applications settings affordance 671E for changing settings of various applications of the smartphone 501. In FIG. 6AS, the selection indicator 695 highlights the connectivity settings affordance 671A.

FIG. 6AS illustrates that the second switch 692 is activated, resulting in a next input detected by the smartphone 501.

FIG. 6AT illustrates the environment 600 of FIG. 6AS in response to detecting the next input. In FIG. 6AT, the selection indictor 695 highlights the accessibility settings affordance 671B.

FIG. 6AT illustrates that the first switch 691 is activated, resulting in a select input detected by the smartphone 501.

FIG. 6AU illustrates the environment 600 of FIG. 6AT in response to detecting the select input. In FIG. 6AU, the first user interface 610 displays an accessibility settings user interface 672 including a plurality of accessibility settings affordances. The accessibility settings affordances include an accessibility mode toggle affordance 672A for switching in and out of the accessibility mode. The accessibility settings affordances include a switches settings affordance 672B for adding switches and configuring user interface responses to the switches, as described further below. The accessibility settings affordances include a scanning speed affordance 672C for changing a scanning speed of the selection indicator 695. The accessibility settings affordances include a highlight color affordance 672D for changing a color of the selection indicator 695. The accessibility settings affordance include an escape action affordance 672E for changing the action required to form the escape input. In FIG. 6AU, the selection indicator 695 highlights the accessibility mode toggle affordance 672A. The accessibility settings user interface 672 includes a settings affordance 672X for returning to the settings user interface 671.

FIG. 6AU illustrates that the second switch 692 is activated, resulting in a next input detected by the smartphone 501.

FIG. 6AV illustrates the environment 600 of FIG. 6AU in response to detecting the next input. In FIG. 6AV, the selection indicator 695 highlights the switches settings affordance 672B.

FIG. 6AV illustrates that the first switch 691 is activated, resulting in a select input detected by the smartphone 501.

FIG. 6AW illustrates the environment 600 of FIG. 6AV in response to detecting the select input. In FIG. 6AW, the first user interface 610 displays a switches settings user interface 673. The switches settings user interface 673 includes a plurality of switches settings affordances for changing switch settings of the accessibility mode of the smartphone 501.

The switches settings affordances include a switch action affordance 673A for changing an action taken by the first user interface 610 in response to a switch input from the first switch 691. As described with respect to the figures above, the switch input from the first switch 691 is interpreted by the smartphone 501 as a select input. In various implementations, the switch input can be interpreted as a stop/start scanning input that stops or starts scanning of the selection indicator 695, a next input that moves the selection indicator 695 to a next interface object, a previous input that moves the selection indicator 695 to a previous interface object, a tap input that is interpreted as on tap on the touchscreen at the location of the selection indicator 695, a volume input that increases or decreases the volume of the smartphone 501, or as another input.

The switches settings affordances include an other device switch action affordance 673B for changing an action taken by the second user interface 620 (and/or third user interface 660) in response to a switch input from the first switch 691. In some implementations, the action taken by the second user interface 620 is the same as the action taken by the first user interface 620 (as shown in FIG. 6AW). However, in some implementations, the action taken by the second user interface 620 is different from the action taken by the first user interface 610. For example, a user can configure the action taken by the first user interface 610 in response to a switch input from the second switch 692 to be a next action (e.g., moving the selection indicator 695 to a next interface object), but configure the action taken by the second user interface 620 in response to a switch input from the second switch 692 to be a scroll action (e.g., scrolling a set of interface objects). A user may wish to do so when the first device is a smartphone and the second device is a media player in which scrolling is an often performed task.

The switches settings affordances include a backup other device switch action affordance 673C for changing a backup action taken by the second user interface 620 in response to a switch input from the first switch 691 in circumstances in which the second user interface 620 does not support the primary action.

The switches settings affordances include a full screen action affordance 673C for changing an action taken by the first user interface 610 in response to a touch anywhere on the touchscreen of the smartphone 501. Thus, the touchscreen of the smartphone 501 can be configured as a switch device as an alternative to or in addition to the switch device 690.

The switches settings affordances include an add switch device affordance 673E for configuring the smartphone to accept switch inputs from other switch devices (not shown).

The switches settings user interface includes an accessibility settings affordance 673X for returning to the accessibility settings user interface 672. In FIG. 6AW, the selection indicator 695 highlights the accessibility settings affordance 673X.

FIG. 6AW illustrates that the first switch 691 is activated, resulting in a select input detect by the smartphone 501.

FIG. 6AX illustrates the environment 600 of FIG. 6AW in response to detecting the select input. In FIG. 6AX, the first user interface 610 displays the accessibility settings user interface 672 with the selection indicator 695 highlighting the switches settings affordance 672B.

FIG. 6AX illustrates that the second switch 692 is activated, resulting in a next input detected by the smartphone 501.

FIG. 6AY illustrates the environment 600 of FIG. 6AX in response to detecting the next input. In FIG. 6AY, the selection indicator 695 has moved to highlight the scanning speed affordance 672C.

FIG. 6AY illustrates that the first switch 691 is activated, resulting in a select input detected by the smartphone 501.

FIG. 6AZ illustrates the environment 600 of FIG. 6AY in response to detecting the select input. In FIG. 6AZ, the first user interface 610 displays a scanning speed user interface 674 including a plurality of scanning speed setting affordances. The scanning speed setting affordances include a primary scanning speed setting affordance 674A for changing the scanning speed of the selection indicator 695 on the smartphone 501. In FIG. 6AZ, the scanning speed on the smartphone 501 is set to manual. In various implementations, the scanning speed can be set to one of a set of speeds (e.g., slow, medium, and fast) or can be set to a specific scanning period (e.g., half a second, 1 second, or 2 seconds).

The scanning speed setting affordances include device scanning speed setting affordances 674B-674D for changing the scanning speed of the selection indicator on other specific devices, such as the tablet 502, the second smartphone 504, or the media player 503. In FIG. 6AZ, the tablet scanning speed affordance 674B indicates that the scanning speed on the tablet 502 is the same as the scanning speed on the smartphone 501. Thus, the scanning speed on the tablet 502 is also set to manual. In circumstances when the scanning speed is set to one of a set of speeds (e.g., medium), the device scanning speed affordances 674B-674D can also be set to a "same" setting in which the scanning speed on the device is based on, but not necessarily identical to, the scanning speed on the smartphone 501. Thus, although both devices may have a scanning speed setting of "medium", the scanning period of the selection indicator 695 may have different values. In some circumstances, the scanning periods are identical, e.g., when the scanning speed setting is set to specify a specific scanning period.

The scanning speed set affordances include a catchall scanning speed affordance 674E for changing a scanning speed on other devices not displayed in the scanning speed user interface 674.

The scanning speed user interface 674 includes an accessibility settings affordance 674X for returning to the accessibility settings user interface 672. In FIG. 6AZ, the selection indicator 695 highlights the accessibility settings affordance 674X.

FIG. 6AZ illustrates that the first switch 691 is activated, resulting in a select input detected by the smartphone 501.

FIG. 6BA illustrates the environment 600 of FIG. 6AZ in response to detecting the select input. In FIG. 6BA, the first user interface 610 displays the accessibility settings user interface 672 with the selection indicator 695 highlighting the scanning speed affordance 672C.

FIG. 6BA illustrates that the second switch 692 is activated, resulting in a next input detected by the smartphone 501.

FIG. 6BB illustrates the environment 600 of FIG. 6BA in response to detecting the next input. In FIG. 6BB, the selection indicator 695 has moved to highlight the highlight color affordance 672D.

FIG. 6BB illustrates that the second switch 692 is activated, resulting in a next input detected by the smartphone 501.

FIG. 6BC illustrates the environment 600 of FIG. 6BB in response to detecting the next input. In FIG. 6BC, the selection indicator 695 has moved to highlight the escape action affordance 672E.

FIG. 6BC illustrates that the first switch 691 is activated, resulting in a select input detected by the smartphone 501.

FIG. 6BD illustrates the environment 600 of FIG. 6BC in response to detecting the select input. In FIG. 6BD, the first user interface 610 displays an escape action user interface 675 including a plurality of escape action setting affordances. The escape action setting affordances include a hold primary switch affordance 675A for setting the escape action to holding the first switch 691 for at least a threshold amount of time (e.g., 10 seconds, 30 seconds, 1 minute, etc.) The escape action setting affordances include a multiple switches affordance 675B for setting the escape action to pressing multiple switches simultaneously (e.g., the first switch 691 and the second switch 692). In FIG. 6BD, the multiple switches affordance 675B is bolded, indicating that the escape action is to press multiple switches as shown in FIG. 6AC. The escape action setting affordances include a multiple clicks affordance 675C for setting the escape action to at least a threshold number in switch inputs in a time period (e.g., 20 switch inputs in 10 seconds). The escape action setting affordances include a coded sequence affordance 675C for setting the escape action to a coded sequence (e.g., SOS in Morse code). The escape action setting affordances include a custom action affordance 675E for setting the escape action to a custom action.

The escape action user interface includes an accessibility settings affordance 675X for returning to the accessibility settings user interface 672. In FIG. 6BD, the selection indicator 695 highlights the accessibility settings affordance 675X.

FIGS. 7A-7G illustrate a flow diagram of a method 700 of controlling multiple devices in an accessibility mode in accordance with some embodiments. The method 700 is performed at an electronic device (e.g., the portable multifunction device 100 in FIG. 1A, the device 300 in FIG. 3, or any of the device 501-504 of FIG. 5) with one or more processors, non-transitory memory, and a display. In some embodiments, the display is a touch-screen display and a touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to control multiple devices in an accessibility mode. The method reduces the cognitive burden on a user when controlling multiple devices in an accessibility mode, thereby creating a more efficient human-machine interface. For battery-operated electronic devices, enabling a user to control multiple devices in an accessibility mode faster and more efficiently conserves power and increases the time between battery charges.

The first device displays (702) a device control transfer affordance while operating the first device based on user input from an input device that is in communication with the first device. For example, in FIG. 6K, the first device (e.g., the smartphone 501) displays a confirmation affordance 634A that, when selected, transfers control from the first device to the second device (e.g., the tablet 502). In some embodiments, the device control transfer affordance is implemented as the tablet affordance 633B of FIG. 6J and control is transferred with a confirmation. In some embodiments, the device control transfer affordance is implemented as the transfer control affordance 632C of FIG. 6H and control is transferred to a preselected second device without a confirmation.

In some embodiments, operating the first device based on the user input from the input device includes operating (704) the first device in an accessibility mode of operation. For example, in FIG. 6AU, the accessibility mode toggle affordance 672A indicates that an accessibility mode is active throughout FIGS. 6A-6BD. In some embodiments, the accessibility mode of operation is a switch control mode of operation where switch inputs are used to select and/or cycle through selection options.

In some embodiments, user input from the input device includes (706) switch inputs. As described above, switch inputs can be generates as portions of a binary input stream having, at each of a plurality of times, one of two values.

In some embodiments, at least one of the switch inputs is generated (708) by a switch device including one or more switches and designed for use by users who are unable to use the standard input device(s) for the first device (e.g., a touchscreen). For example, in FIG. 6A, the switch device 690 includes a first switch 691 and a second switch 692.

In some embodiments, at least one of the switch inputs is generated (710) by an input device of the first device. For example, at least one of the switch inputs can be generated (712) by a touchscreen of the first device. As another example, at least one of the switch inputs can be generated (714) by a camera of the first device. For example, in FIG. 6AW, the switches settings user interface 673 allows a user to set the full area of the touchscreen of the first device as a switch device to generate switch inputs or set a camera of the first device as a switch device that generates a first switch input when a left head turn is detected and a second switch input when a right head turn is detected.

Thus, in some embodiments, the input device is integrated into the first device, e.g., as a touchscreen, a home button, a volume up/down button, etc.). In some embodiments, the input device is separate from the first device (e.g., as a dedicated switch device). In some embodiments, the first device includes one or more includes one or more integrated input devices that do not need to be used to control the device when a separate input device is being used to control the first device. In some embodiments, the input device is wirelessly paired to the first device. In some embodiments, the input device is connected to the first device with a wire or other physical connection used for transferring data such as input information from the input device to the first device.

In some embodiments, displaying the device control transfer affordance includes displaying (716), on the display, a scan affordance while operating the first device based on the user input from the input device. For example, in FIG. 6H, the first device displays a transfer control affordance 632C. In some embodiments, displaying the device control transfer affordance include receiving (718) a scan user input from the input device selecting the scan affordance. For example, in FIG. 6H, the first switch 691 is activated while the transfer control affordance 632C is highlighted. In some embodiments, displaying the device control transfer affordance includes displaying, on the display, in response to receiving the scan user input, one or more device select affordances while operating the first device, the one or more device select affordances including a second device affordance associated with the second device. For example, in FIG. 6I, the first device displays a device select menu 633 including a plurality of device select affordances, the plurality of device select affordances including a tablet select affordance 633B.

In some embodiments, displaying the device control transfer affordance includes receiving (722) a device select user input from the input device selecting the second device affordance. For example, in FIG. 6J, the first switch 691 is activated while the tablet select affordance 633C is highlighted. In some embodiments, displaying the device control transfer affordance is performed in response to receiving the device select user input for the input device selecting the second device affordance.

In some embodiments, displaying the device control transfer affordance includes displaying (724), on the display of the first device, a first transfer confirmation notification indicating that the input device will be used to operate the second device (and will not be used to operate the first device) upon selection of the device control transfer affordance. Thus, if a user mistakenly selects an unintended device (e.g., a device that is not visible or nearby), the first transfer confirmation notification provide an indication that a mistake has been made preventing the user for transferring control to the unintended device and, thus, requiring addition interaction to return control to the first device and then to the intended device. Requiring less interaction conserves power and increases the time between battery charges for battery-operated devices. Further, less interaction reduces wear-and-tear of the input device.

For example, in FIG. 6K, the first device displays a first transfer confirmation notification 641A indicating that control will be transferred to the second device.

In some embodiments, displaying the device control transfer affordance includes causing display (726), on the display of the second device, of a second transfer confirmation notification indicating that the input device (and not other input devices of the second device) will be used to operate the second device upon selection, on the first device, of the device control transfer affordance. Thus, (like the first transfer confirmation notice) if a user mistakenly selects an unintended device (e.g., a device that is not visible or nearby), the second transfer confirmation notification provide an indication that a mistake has been made preventing the user for transferring control to the unintended device and, thus, requiring addition interaction to return control to the first device and then to the intended device. Requiring less interaction conserves power and increases the time between battery charges for battery-operated devices. Further, less interaction reduces wear-and-tear of the input device. For example, in FIG. 6K, the second device displays a second transfer confirmation notification indicating that control will be transferred to the device upon which it is displayed.

The first device receives (728) a device control transfer user input from the input device selecting the device control transfer affordance that is displayed on the display of the first device. For example, in FIG. 6K, the first switch 691 is activated while the confirmation affordance 634A is highlighted.

The first device configures (730) the second device to be operated based on user input from the input device and ceases to operate the first device based on user input from the input device. Thus, a user can use a single input device to control multiple devices without disconnecting the input device from the first device and connecting the input device to the second device, which may be a time-consuming, if not impossible, process for persons of limited mobility. Using a single input device to control multiple devices reduces costs for the user (as they need not purchase multiple input devices). For example, in FIG. 6L, the first device display a first transferred control notification 642A indicating that the second device is operated based on user input from the input device.

In some embodiments, operating the second device based on the user input from the input device includes operating (732) the second device in the same accessibility mode of operation as the first device. For example, in FIG. 6L, the selection indicator 695 is moved from the first device to the second device and user input from the input device operates the second device, not the first device.

In some embodiments, configuring the second device to be operated based on user input from the input device includes forwarding (734) inputs received from the input device to the second device. In some embodiments, configuring the second device to be operate based on user input from the input device includes establishing (736) a connection between the input device and the second device.

In some embodiments, the the first device displays (738), on the display of the first device, a first transferred control notification indicating that operation of the second device (and not the first device) is based on the user input from the input device. The first transferred control notification provides feedback to a user viewing the first device that the input device is not controlling the first device, preventing a user from attempting to operate the first device with the input device (and reducing frustration of the user in addition to wear-and-tear of the input device). For example, in FIG. 6L, the first device displays a first transferred control notification 642A indicating that the second device is operated based on user input from the input device.

In some embodiments, the first device causes display (740), on the display of the second device, of a second transferred control notification indicating that operation of the second device is based on the user input from the input device (and not an input device of the second device). For example, in FIG. 6L, the second device displays a second transferred control notification 642B indicating that the second device is being controlled by the switch device 690 and not, for example, the touchscreen of the tablet 502.

In some embodiments, the first device causes display (742), on the display of the second device, of a device control return affordance while operating the second device based on user input from the input device. By providing a device control return affordance, a user can just as efficiently transfer control from the second device to the first device as the user can transfer control from the first device to the second device. Such an efficient user interface conserves power and increases the time between battery charges for battery-operated devices. Further, an efficient user interface reduces wear-and-tear of the input device. For example, in FIG. 6T, the second device displays a return affordance 632E. In some embodiments, the first device receives (744) a device control return user input from the input device selecting the device control return affordance. For example, in FIG. 6T, the first switch 691 is activated while the return affordance 632E is highlighted. In some embodiments, the first device operates (746), in response to receiving the device control return user input, the first device based on user input from the input device and ceases to operate the second device based on user input from the input device.

In some embodiments, the first device receives (748) an escape input from the input device matching an escape action. The escape input can be particularly useful for users with limited mobility who cannot easily find a device that is not behaving correctly (and unable to effect the other two forms of returning control) and reset it or otherwise correct a problem with the device. Further, if the user mistakenly transfers control to a second device that is not visible, control can be returned to the first device without interacting with the second device. For example, in FIG. 6AC, both the first switch 691 and second switch 692 are activated. In some implementations, the escape input is holding both switches for at least a threshold amount of time (e.g., 10 seconds). In some embodiments, the first device operates (750), in response to receiving the escape input, the first device based on user input from the input device and ceases to operate the second device based on user input from the input device.

In some embodiments, the first device displays (752), on the display of the first device, an escape settings user interface including one or more affordances for defining the escape action. For example, in FIG. 6BD, the first device displays an escape action user interface 675 including a plurality of escape action setting affordances.

In some embodiments, the first device displays (754), on the display of the first device, an accessibility settings user interface including one or more affordances for changing one or more accessibility settings for the second device. For example, in FIG. 6AU, the first device displays an accessibility settings user interface 672 including a plurality of accessibility settings affordances.

In some embodiments, the accessibility settings user interface includes (756) one or more affordances for changing a scanning speed or highlight color of a selection indicator on the second device. For example, in FIG. 6AU, the first device display a scanning speed affordance 672C and a highlight color affordance 672D. In FIG. 6AZ, the first device displays tablet scanning speed affordance 674B for changing a scanning speed of the second device.

In some embodiments, the accessibility settings user interface includes (758) one or more affordances for changing a switch action of the second device. For example, in FIG. 6AU, the first device displays a switches settings affordance 672B. In FIG. 6AW, the first device displays an other device switch action affordance 673B for changing a switch action of the second device (and/or other devices).

In some embodiments, the accessibility settings user interface include (760) one or more affordances for changing a backup switch action of the second device. For example, in FIG. 6AU, the first device displays a switches settings affordance 672B. In FIG. 6AW, the first device displays a backup other device switch action affordance 673C for changing a backup switch action of the second device (and/or other devices).

In some embodiments, one or more of the accessibility settings for the second device are (762) based on one or more accessibility settings of for the first device. Thus, a user need not duplicatively change settings for multiple devices based on the user's preferences and/or abilities, requiring less interaction with the devices. Less interaction with the user interface conserves power and increases the time between battery charges for battery-operated devices. Further, less interaction with the user interface reduces wear-and-tear of the input device. For example, in FIG. 6AW, the first device displays that the switch action of the first switch for the first device and the switch action of the first switch for the second device are the same. As another example, in FIG. 6AZ, the first device displays that the scanning speed setting for the first device and the scanning speed setting for the second device are the same.

In some embodiments, at least one of the accessibility settings for the second device is (764) different than a corresponding accessibility setting for the first device. For example, in FIG. 6AZ, the first device displays that the scanning speed setting for the first device and the scanning speed setting for another device (e.g., the media player 503) are different.

In some embodiments, an accessibility setting for the second device indicating a switch action for a switch input is (766) different than an accessibility setting for the first device indicating a switch action for the switch input. For example, in FIG. 6AW, the first device displays that the switch action for a full screen touch on the first device is different than the switch action on the second device.

In some embodiments, the first device generates (768) an alert at the first device while operating the second device based on the user input from the input device. Thus, controlling the second device with the input device does not decrease the functionality of first device and alerts (such as phone calls) can continue to be received by the user via the first device. For example, in FIG. 6AE, the first device displays an alert user interface 615 based on a received phone call. In other embodiments, the alert can be, for example, a text message, a timer expiration, a clock alarm, or an event reminder. In some embodiments, the first device displays (770), on the display of the second device, of one or more alert response affordances. For example, in FIG. 6AE, the second device displays an alert response menu 638 with a plurality of alert response affordances 638.

In some embodiments, the first device receives (772) a dismiss user input selecting a dismiss affordance of the one or more alert response affordances. For example, in FIG. 6AE, the first switch 691 is activated while the dismiss affordance 638A is highlighted. In some embodiments, the method 700 includes ceasing (774) display of the one or more alert response affordances in response to receiving the dismiss user input. For example, in FIG. 6AF, the second device ceases displaying the alert response menu 638.

In some embodiments, the first device receives (776) a return user input selecting a return affordance of the one or more alert response affordances. For example, in FIG. 6AH, the first switch 691 is activated while the return affordance 638B is highlighted. In some embodiments, the first device operates (778), in response to receiving the return user input, the first device based on user input from the input device and ceases to operate the second device based on user input from the input device.

In some embodiments, the first device receives (780) a continued action user input selecting a continued action affordance of the one or more alert response affordances. For example, in FIG. 6AK, the first switch 691 is activated while the answer affordance 638C is highlighted. In some embodiments, the first device operates (782) the second device based on user input from the input device to respond to the alert. For example, in FIG. 6AL, the second device displays a menu for continued action with respect to the alert (e.g., further action in association with the answered phone call). In various implementations, the continued action affordance can include, for example, an affordance for responding to a text message, snoozing a clock alarm, or displaying information regarding an event.

In some embodiments, the first device receives (784) a quick action user input selecting a quick action affordance of the one or more alert response affordances. Thus, a user can perform actions with respect to alerts received on the first device without returning control to the first device, reducing the amount of interaction with the user interfaces of the first device and second device. Less interaction with the user interface conserves power and increases the time between battery charges for battery-operated devices. Further, less interaction with the user interface reduces wear-and-tear of the input device. For example, in FIG. 6AN, the first switch 691 is activated while the ignore affordance 638D is highlighted. In some embodiments, the first device dismisses (786) the alert at the first device and continuing to operate the second device based on user input from the input device. For example, in FIG. 6AO, the first device ignores the phone call and the selection indicator 695 remains at the second device. In various implementations, the quick action affordance can include, for example, an affordance for dismissing a clock alarm or dismissing an event reminder.

In some embodiments, the first device causes display (788), on a display of the second device, of a third device control transfer affordance while operating the second device based on user input from the input device. For example, in FIG. 6Y, the second device displays the confirmation affordance 634A. In some embodiments, the first device receives (790) a third device control transfer user input from the input device selecting the third device control transfer affordance. For example, in FIG. 6Y, the first switch 691 is activated while the confirmation affordance 634C is highlighted. In some embodiments, the first device configures (792) a third device to be operated based on user input from the input device and ceasing to operate the second device based on user input from the input device. Thus, a user can use a single input device to control more than two devices without disconnecting the input device from the first device and connecting the input device to the third device, which may be a time-consuming, if not impossible, process for persons of limited mobility. Using a single input device to control multiple devices reduces costs for the user (as they need not purchase multiple input devices). For example, in FIG. 6Z, the first device display a first transferred control notification 642A indicating that a third device (e.g., the media player 503) is operated based on user input from the input device.

It should be understood that the particular order in which the operations in FIGS. 7A-7G have been described is merely example and is not intended to indicate that the described order is the only order in which the operations could be performed. One of ordinary skill in the art would recognize various ways to reorder the operations described herein.

Figure 8:
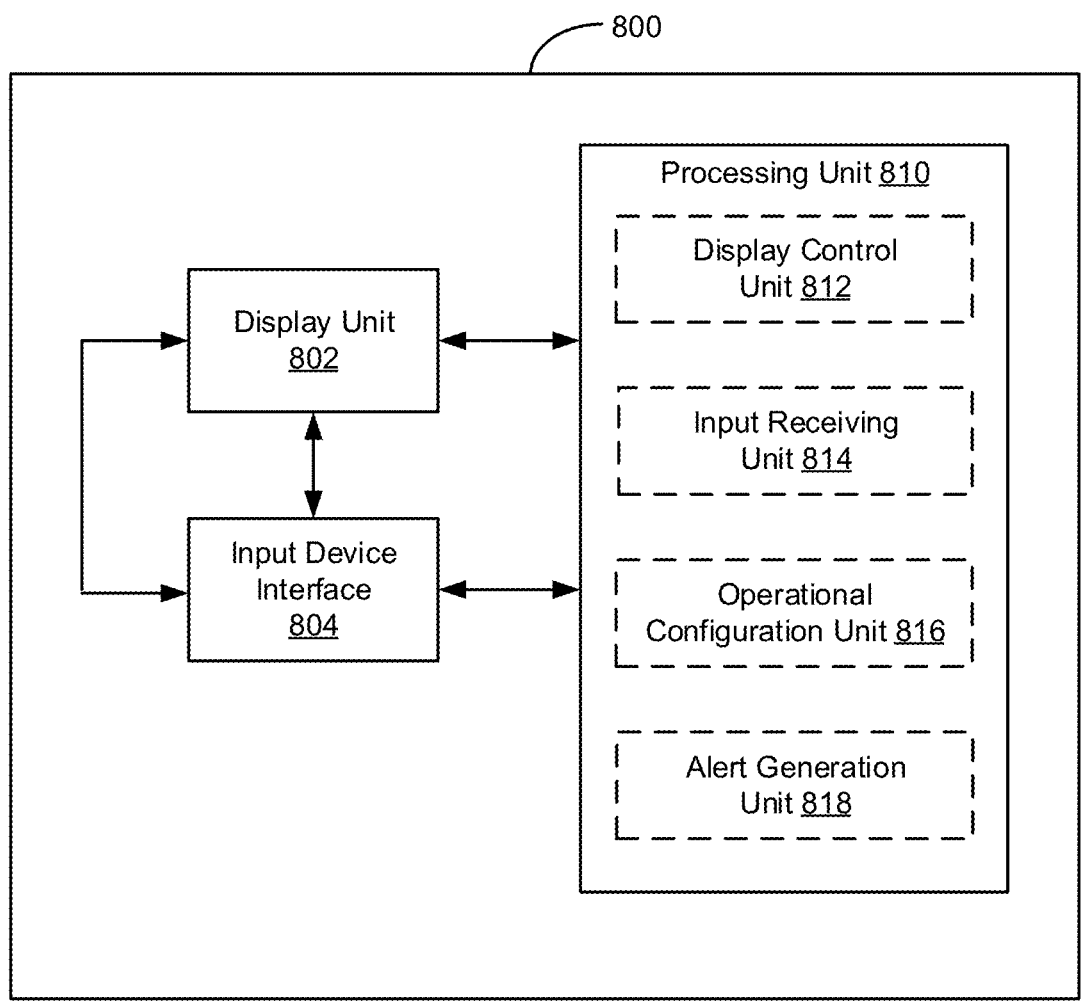
FIG. 8 is a functional block diagram of an electronic device in accordance with some embodiments.

In accordance with some embodiments, FIG. 8 shows a functional block diagram of an electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, a first electronic device 800 includes a display unit 802 configured to display a user interface and an input device interface 804 configured to receive user input, and a processing unit 810 coupled with the display unit 802 and the input device interface 804. In some embodiments, the processing unit 1310 includes: a display control unit 812, an input receiving unit 814, an operational configuration unit 816, and an alert generation unit 818.

The processing unit 810 is configured to display (e.g., with the display control unit 812), on the display unit 802, a device control transfer affordance while operating the first device based on user input from an input device that is in communication with the first device (e.g., via the input device interface 804). The processing unit 810 is configured to receive a device control transfer user input from the input device (e.g., with the input receiving unit 814 via the input device interface 804) selecting the device control transfer affordance that is displayed on the display unit 802 of the first electronic device 800. In response to receiving the device control transfer user input, the processing unit 810 is configured to configure a second electronic device (e.g., with the operational configuration unit 816) to be operated based on user input from the input device and ceasing to operate the first device based on user input from the input device.

In some embodiments, the processing unit 810 is configured to operate the first electronic device based on the user input from the input device (e.g., with the input receiving unit 814) by operating the first device in an accessibility mode of operation.

In some embodiments, user input from the input device (e.g., via the input device interface 804) includes switch inputs. In some embodiments, at least one of the switch inputs is generated by a switch device including one or more switches and designed for use by users who are unable to use the standard input device(s) of the first electronic device 800. In some embodiments, at least one of the switch inputs is generated by an input device of the first electronic device 800 (coupled to the input device interface 804). For example, in some embodiments, at least one of the switch inputs is generated by a touch-sensitive surface of the first electronic device 800 (coupled to the input device interface 804). For example, in some embodiments, at least one of the switch inputs is generated by a camera of the first electronic device 800 (coupled to the input device interface 804).

In some embodiments, the processing unit 810 is configured to display the device control transfer affordance by displaying (e.g., with the display control unit 812), on the display unit 802, a scan affordance while operating the first electronic device based on the user input from the input device. In some embodiments, the processing unit 810 is configured to display the device control transfer affordance by receiving (e.g., with the input receiving unit 814) a scan user input from the input device selecting the scan affordance. In some embodiments, the processing unit 810 is configured to display the device control transfer affordance by displaying (e.g., with the display control unit 812), on the display unit 802, one or more device select affordances while operating the first device, the one or more device select affordances including a second device affordance associated with a second device. In some embodiments, the processing unit 810 is configured to display the device control transfer affordance by receiving (e.g., with the input receiving unit 814) a device select user input from the input device selecting the second device affordance. In some embodiments, the processing unit 810 is configured to display the device control transfer affordance in response to receiving the device select user input.

In some embodiments, the processing unit 810 is configured to display the display control transfer affordance by displaying (e.g., with the display control unit 812), on the display unit 802, a first transfer confirmation notification indicating that the input device will be used to operate the second electronic device upon selection of the device control transfer affordance.

In some embodiments, the processing unit 810 is configured to display the device control transfer affordance by causing display (e.g., with the display control unit 812), on a display unit of the second electronic device, a second transfer confirmation notification indicating that the input device will be used to operate the second electronic device upon selection, on the first electronic device, of the device control transfer affordance.

In some embodiments, the processing unit 810 is configured to configure the second electronic device to be operated based on user input from the input device by configuring the second electronic device (e.g., with the operational configuration unit 816) to operate in the same accessibility mode of operation as the first electronic device.

In some embodiments, the processing unit 810 is configured to configure the second electronic device to be operated based on user input from the input device by forwarding (e.g., with the operational configuration unit 816) inputs from the input device to the second electronic device. In some embodiments, the processing unit 810 is configured to configure the second electronic device to be operated based on user input from the input device by establishing a connection (e.g., with the operational configuration unit 816) between the input device and the second electronic device.

In some embodiments, the processing unit 810 is configured to display (e.g., with the display control unit 812), on the display unit 802, a first transferred control notification indicating that operation of the second device (and not the first device) is based on the user input from the input device. In some embodiments, the processing unit 810 is configured to display (e.g., with the display control unit 812), on a display unit of the second electronic device, a second transferred control notification indicating that operation of the second electronic device is based on the user input from the input device (and not an input device of the second electronic device).

In some embodiments, the processing unit 810 is configured to cause display (e.g., with the display control unit 812), on a display unit of the second electronic device, of a device control return affordance while operating the second electronic device based on user input from the input device, to receive a device control return user input (e.g., with the input receiving unit 814) from the input device selecting the device control return affordance, and operate (e.g., with the operational configuration unit 816) the first electronic device 800 based on user input from the input device and ceasing to operate the second electronic device based on user input from the input device.

In some embodiments, the processing unit 810 is configured to receive (e.g., with the input receiving unit 814) an escape input from the input device matching an escape action and operate (e.g., with the operational configuration unit 816) the first electronic device 800 based on user input from the input device and ceasing to operate the second electronic device based on user input from the input device.

In some embodiments, the processing unit 810 is configured to display (e.g., with the display control unit 812), on the display unit 802, an escape setting user interface including one or more affordances for defining the escape action.

In some embodiments, the processing unit 810 is configured to display (e.g., with the display control unit 812), on the display unit 802, an accessibility settings user interface including one or more affordances for changing one or more accessibility settings for the second electronic device.

In some embodiments, the processing unit 810 is configured to display (e.g., with the display control unit 812), the accessibility settings user interface with one or more affordances for changing a scanning speed or highlight color of a selection indicator on the second electronic device.

In some embodiments, the processing unit 810 is configured to display (e.g., with the display control unit 812), the accessibility settings user interface with one or more affordances for changing a switch action of the second electronic device.

In some embodiments, the processing unit 810 is configured to display (e.g., with the display control unit 812), the accessibility settings user interface with one or more affordances for changing a backup switch action of the second electronic device.

In some embodiments, one or more of the accessibility settings for the second electronic device are based on one or more accessibility settings for the first electronic device 800. In some embodiments, at least one accessibility setting for the second electronic device is different than a corresponding accessibility setting for the first electronic device 800. In some embodiments, an accessibility setting for the second electronic device indicating a switch action for a switch input is different than an accessibility setting for the first electronic device 800 indicating a switch action for the switch input.

In some embodiments, the processing unit 810 is configured to generate an alter (e.g., with the alert generation unit 818), at the first electronic device 800, while operating the second electronic device based on the user input from the input device and cause display (e.g., with the display control unit 812), on the display unit of the second electronic device, of one or more alert response affordances.

In some embodiments, the processing unit 810 is configured to receive a dismiss user input (e.g., with the input receiving unit 814) selecting a dismiss affordance of the one or more alert response affordances and cease display (e.g., with the display control unit 812) of the one or more alert response affordances.

In some embodiments, the processing unit 810 is configured to receive a return user input (e.g., with the input receiving unit 814) selecting a return affordance of the one or more alert response affordances and operate the first electronic device 800 (e.g., with the operational configuration unit 816) based on user input from the input device and cease to operate the second electronic device based on user input from the input device.

In some embodiments, the processing unit 810 is configured to receive a continued action user input (e.g., with the input receiving unit 814) selecting a continued action affordance of the one or more alert response affordances and operated the second electronic device (e.g., with the operational configuration unit 816) based on user input from the input device to respond to the alert.

In some embodiments, the processing unit 810 is configured to receive a quick action user input (e.g., with the input receiving unit 814) selecting a quick action user input selecting a quick action affordance of the one or more alert response affordances and dismiss the alert at the first electronic device 800 and continuing to operate the second electronic device based on user input from the input device.

In some embodiments, the processing unit 810 is configured to cause display (e.g., with the display control unit 812), of on a display unit of the second electronic device, a third device control transfer affordance while operating the second electronic device based on user input from the input device, receive (e.g., with the input receiving unit 814) a third device control transfer user input from the input device selecting the third device control transfer affordance, and configure (e.g., with the operation configuration unit 816) a third electronic device to operate based on user input from the input device and cease to operate the second electronic device based on user input from the input device.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7G are, optionally, implemented by components depicted in FIGS. 1A-1B or FIG. 8. For example, display operation 702, receiving operation 728, and configuration operation 730 are, optionally, implemented by event sorter 170, event recognizer 180, and event handler 190. Event monitor 171 in event sorter 170 receiving a user input from an input device, and event dispatcher module 174 delivers the event information to application 136-1. A respective event recognizer 180 of application 136-1 compares the event information to respective event definitions 186, and determines whether the user input from the input device corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a first device with one or more processors, non-transitory memory, and a display:
displaying, on the display, a device control transfer affordance while operating the first device based on user input from an input device that is in communication with the first device;
receiving a device control transfer user input from the input device selecting the device control transfer affordance that is displayed on the display of the first device; and
in response to receiving the device control transfer user input:
displaying, on the display, a set of device select affordances including a first device select affordance for selecting a second device and a second device select affordance for selecting a third device;
receiving a device select user input from the input device selecting the first device select affordance; and
in response to the device select user input, configuring the second device to be operated based on user input from the input device and ceasing to operate the first device based on user input from the input device, wherein the input device is separate from the first device and the second device.

2. The method of claim 1, wherein operating the first device based on the user input from the input device includes operating the first device in an accessibility mode of operation and operating the second device based on the user input from the input device includes operating the second device in the same accessibility mode of operation.

3. The method of claim 2, wherein operating the second device in the accessibility mode is performed without interaction with an input device of the second device.

4. The method of claim 1, wherein user inputs with the input device are switch inputs.

5. The method of claim 4, wherein at least one of the switch inputs is generated by a dedicated switch device that includes one or more switches.

6. The method of claim 4, wherein at least one of the switch inputs is generated by an input device of first device.

7. The method of claim 6, wherein at least one of the switch inputs is generated by a touchscreen of the first device.

8. The method of claim 4, wherein at least one of the switch inputs is generated by a camera.

9. The method of claim 1, further comprising, in response to receiving the device select user input, displaying, on the display, a first transfer confirmation notification indicating that the input device will be used to operate the second device upon selection of the device control transfer affordance.

10. The method of claim 9, further comprising, in response to receiving the device select user input, causing display, on a display of the second device, a second transfer confirmation notification that indicates that the input device will be used to operate the second device upon confirmation of the selection on the first device.

11. The method of claim 1, further comprising:
displaying, on the display, a scan affordance while operating the first device based on the user input from the input device;
receiving a scan user input from the input device selecting the scan affordance; and
in response to receiving the scan user input, displaying, on the display, the set of device select affordances.

12. The method of claim 1, further comprising, displaying, on the display, a first transferred control notification indicating that operation of the second device is based on the user input from the input device.

13. The method of claim 1, further comprising, causing display, on a display of the second device, a second transferred control notification indicating that operation of the second device is based on the user input from the input device.

14. The method of claim 1, further comprising:
causing display, on a display of the second device, of a device control return affordance while operating the second device based on the user input from the input device;
receiving a device control return user input from the input device selecting the device control return affordance; and
in response to receiving the device control return user input, operating the first device based on user input from the input device and ceasing to operate the second device based on user input from the input device.

15. The method of claim 1, further comprising:
causing display, on a display of the second device, of a third device control transfer affordance while operating the second device based on the user input from the input device;
receiving a third device control transfer user input from the input device selecting the third device control transfer affordance; and
in response to receiving the third device control transfer user input, configuring a third device to be operated based on user input from the input device and ceasing to operate the second device based on user input from the input device.

16. The method of claim 1, further comprising:
receiving an escape input from the input device matching an escape action; and
in response to receiving the escape input, operating the first device based on user input from the input device and ceasing to operate the second device based on user input from the input device.

17. The method of claim 16, further comprising, displaying, on the display, an escape settings user interface including one or more affordances for defining the escape action.

18. The method of claim 1, further comprising:
generating an alert at the first device while operating the second device based on the device control transfer user input from the input device; and
in response to the alert, causing display, at the second device, of one or more alert response affordances.

19. The method of claim 18, further comprising:
receiving a dismiss user input selecting a dismiss affordance of the one or more alert response affordances; and
in response to receiving the dismiss user input, ceasing display of the one or more alert response affordances.

20. The method of claim 18, further comprising:
receiving a return user input selecting a return affordance of the one or more alert response affordances; and in response to receiving the return user input, operating the first device based on user input from the input device and ceasing to operate the second device based on user input from the input device.

21. The method of claim 18, further comprising:
receiving a continued action user input selecting a continued action affordance of the one or more alert response affordances; and
in response to receiving the continued action user input, operating the second device based on user input from the input device to respond to the alert.

22. The method of claim 18, further comprising:
receiving a quick action user input selecting the quick action affordance of the one or more alert response affordances; and
in response to receiving the quick action user input, dismissing the alert and continuing to operate the second device based on user input from the input device.

23. The method of claim 1, wherein operating the second device based on the user input from the input device is based on one or more accessibility settings for the second device, further comprising, displaying, on the display, an accessibility settings user interface including one or more affordances for changing the one or more accessibility settings for the second device.

24. The method of claim 23, wherein the accessibility settings user interface includes one or more affordances for changing a scanning speed or a highlight color of a selection indicator on the second device.

25. The method of claim 23, wherein the accessibility settings user interface includes one or more affordances for changing a switch action of the second device.

26. The method of claim 23, wherein the accessibility settings user interface includes one or more affordances for changing a backup switch action of the second device.

27. The method of claim 23, wherein operating the first device based on the user input from the input device is based on one or more accessibility settings for the first device, wherein one or more of the accessibility settings for the second device are based on one or more of the accessibility settings for the first device.

28. A non-transitory computer readable storage medium storing one or more programs, the one or more programs comprising instructions, which, when executed by a first electronic device with a display, and an input device, cause the first electronic device to:
displaying, on the display, a device control transfer affordance while operating the first electronic device based on user input from an external input device that is in communication with the first electronic device;
receiving a device control transfer user input from the external input device selecting the device control transfer affordance that is displayed on the display of the first electronic device; and
in response to receiving the device control transfer user input:
displaying, on the display, a set of device select affordances including a first device select affordance for selecting a second electronic device and a second device select affordance for selecting a third electronic device;
receiving a device select user input from the external input device selecting the first device select affordance; and
in response to the device select user input, configuring the second electronic device to be operated based on user input from the external input device and ceasing to operate the first electronic device based on user input from the input device, wherein the external input device is separate from the first device and the second device.

29. A first electronic device comprising:
a display unit configured to display a user interface; and
a processing unit coupled with the display unit, the processing unit configured to:
display, on the display unit, a device control transfer affordance while operating the first electronic device based on user input from an input device that is in communication with the first electronic device;
receive a device control transfer user input from the input device selecting the device control transfer affordance that is displayed on the display unit; and
in response to receiving the device control transfer user input:
display, on the display unit, a set of device select affordances including a first device select affordance for selecting a second electronic device and a second device select affordance for selecting a third electronic device;
receiving a device select user input from the input device selecting the first device select affordance; and
in response to the device select user input, configure the second electronic device to be operated based on user input from the input device and ceasing to operate the first electronic device based on user input from the input device, wherein the input device is separate from the first device and the second device.

* * * * *